US00RE44503E

(19) United States
(12) Reissued Patent
Tanaka et al.

(10) Patent Number: US RE44,503 E
(45) Date of Reissued Patent: Sep. 17, 2013

(54) MEMORY DEVICE STORING IDENTIFYING INFORMATION AND MEMORY CARD INCLUDING THE SAME

(75) Inventors: Yoshiyuki Tanaka, Kanagawa (JP); Hiroshi Nakamura, Kanagawa (JP); Hiroshi Sukegawa, Tokyo (JP); Mikito Nakabayashi, Kanagawa (JP); Kazuya Kawamoto, Kanagawa (JP)

(73) Assignee: Kabushiki Kaisha Toshiba, Kawasaki-shi (JP)

(21) Appl. No.: 13/100,835

(22) Filed: May 4, 2011

Related U.S. Patent Documents

Reissue of:
(64) Patent No.: 6,446,177
Issued: Sep. 3, 2002
Appl. No.: 09/407,168
Filed: Sep. 28, 1999

U.S. Applications:
(63) Continuation of application No. 10/931,247, filed on Aug. 31, 2004, now Pat. No. Re. 42,398.

(30) Foreign Application Priority Data

Oct. 5, 1998 (JP) ..... 10-282527
Jul. 19, 1999 (JP) ..... 11-205352

(51) Int. Cl.
*G06F 12/00* (2006.01)

(52) U.S. Cl.
USPC ..... 711/163; 711/100; 711/103; 711/152; 711/154; 711/164; 710/100; 710/200; 726/2; 713/162; 713/165

(58) Field of Classification Search
USPC ..... 711/100, 103, 152, 154, 163–164; 710/100, 200; 726/2; 713/162, 165
See application file for complete search history.

(56) References Cited

U.S. PATENT DOCUMENTS 5,131,091 A * 7/1992 Mizuta ..... 395/725
5,740,358 A 4/1998 Geldman et al.
5,825,875 A 10/1998 Ugon
5,838,613 A 11/1998 Takizawa
5,887,254 A 3/1999 Halonen
5,923,486 A 7/1999 Sugiyama et al.
5,926,624 A 7/1999 Katz et al.
5,930,825 A 7/1999 Nakashima et al.
5,944,821 A * 8/1999 Angelo ..... 713/200
5,946,714 A 8/1999 Miyauchi
5,991,399 A 11/1999 Graunke et al.

(Continued)

FOREIGN PATENT DOCUMENTS

JP 52-127324 10/1977
JP 52127324 A 10/1977

(Continued)

*Primary Examiner* — Jasmine Song
(74) *Attorney, Agent, or Firm* — Oblon, Spivak, McClelland, Maier & Neustadt, L.L.P.

(57) ABSTRACT

In a memory system using a removable recording medium and data stored in the recording medium, identifying information for identifying each recording medium from others is held in the recording medium, and when data stored in the recording medium is used, the identifying information of the recording medium is required. As a result, when a flash memory card, etc. is used, a copyright is reliably protected.

5 Claims, 38 Drawing Sheets

(56) References Cited

U.S. PATENT DOCUMENTS

| | | | | |
|---|---|---|---|---|
| 5,994,821 | A | 11/1999 | Imada et al. | |
| 6,070,799 | A | 6/2000 | Ashe | |
| 6,098,077 | A * | 8/2000 | Sassa | 711/103 |
| 6,249,866 | B1 * | 6/2001 | Brundrett et al. | 713/165 |
| 6,262,915 | B1 | 7/2001 | Kihara et al. | |

FOREIGN PATENT DOCUMENTS

| | | |
|---|---|---|
| JP | 02-293930 | 12/1990 |
| JP | 05-266576 | 10/1993 |
| JP | 07-262001 | 10/1995 |
| JP | 08-263927 | 10/1996 |

* cited by examiner

| | | DT<br>0 255 | RD<br>256 263 |
|---|---|---|---|
| Block 0 | Page 0 | Data Field (256 Byte) | Redundancy Field (8 Byte) |
| | Page 1 | | |
| | : | | |
| | Page 15 | | |
| Block 1 | Page 0 | | |
| | Page 1 | | |
| | : | | |
| | Page 15 | | |
| : | : | : | : |
| Block 511 | Page 0 | | |
| | Page 1 | | |
| | : | | |
| | Page 15 | | |

Data Field : DT

| Byte | 0 Page (Even Page) | 1 Page (Odd Page) |
|---|---|---|
| 0 ~ 255 | DATA Area-1 | DATA Area-2 |

Redundancy Field : RD

| Byte | Even Page | Odd Page |
|---|---|---|
| 256 | Reserved Area | ECC Area-2 |
| 257 | Reserved Area | |
| 258 | Reserved Area | |
| 259 | Reserved Area | Block Address Area-2 |
| 260 | Data Status Area | |
| 261 | Block Status Area | ECC Area-1 |
| 262 | Block Address Area-1 | |
| 263 | | |

FIG.3

| OFFSET | Upper Byte | Lower Byte |
|---|---|---|
| Word0 (LBA=0) | Upper Physical Block Address | Lower Physical Block Address |
| Word1 (LBA=1) | Upper Physical Block Address | Lower Physical Block Address |
| Word2 (LBA=2) | Upper Physical Block Address | Lower Physical Block Address |
| ⋮ | ⋮ | ⋮ |
| Word498 (LBA=497) | Upper Physical Block Address | Lower Physical Block Address |
| Word499 (LBA=498) | Upper Physical Block Address | Lower Physical Block Address |
| Word500 (LBA=499) | Upper Physical Block Address | Lower Physical Block Address |

FIG.4

| | |
|---|---|
| Block 0 | Defective Block |
| Block 1 | CIS |
| Block 2 | Data |
| ⋮ | ⋮ |
| Block 511 | Data |

| | |
|---|---|
| Field A | Fixed Data Field |
| Field B | Arbitrary Data Storage Field |

| FUSE | N1 | N2 |
|---|---|---|
| CUT | "H" | "H" |
| UNCUT | "L" | "L" |

RDBLOCK:REDUNDANCY BLOCK

| | |
|---|---|
| IDENTIFYING INFORMATION | 10101010 |
| COMPLEMENT INFORMATION | 01010101 |

RDBLOCK:REDUNDANCY BLOCK

| | |
|---|---|
| IDENTIFYING INFORMATION | 00101010 |
| COMPLEMENT INFORMATION | 01010101 |

Byte0
Byte1
Byte2
Byte3
Byte4
Page0
Page1
Page2
Page3
Page4
Page14
Page15
(A) 3
(B) 0
(C) 0
0TP BLOCK Byte0
Byte1
Byte2
Byte3
Byte4
Page0
Page1
Page2
Page3
Page4
Page14
Page15
(A) 0
(B) 0
(C) 4
(D) 0
(E) 0
3
0TP BLOCK

MEMORY DEVICE STORING IDENTIFYING INFORMATION AND MEMORY CARD INCLUDING THE SAME

Matter enclosed in heavy brackets [ ] appears in the original patent but forms no part of this reissue specification; matter printed in italics indicates the additions made by reissue.

*The present reissue application is a continuation reissue application of reissue Ser. No. 10/931,247, filed Aug. 31, 2004, which is a reissue application of U.S. Pat. No. 6,446,177, and claims priority from Japanese Patent Application No. 10-282527, filed Oct. 5, 1998, and Japanese Patent Application No. 11-205352, filed Jul. 19, 1999. More than one reissue application has been filed for the reissue of U.S. Pat. No. 6,446,177. The reissue applications are application Ser. No. 10/931,247 and the present application Re. 42,398.*

BACKGROUND OF THE INVENTION

1. Field of the Invention

This invention relates to a memory system using semiconductor memory to be used for the purpose of protecting copyrights. The invention also relates to a control method of electrically erasable and programmable nonvolatile semiconductor memory, especially useful for use to NAND EEPROM (electrically erasable and programmable read-only memory).

2. Description of the Prior Art

A flash memory card FMC as shown in FIG. 1 has become of major interest lately as a recording medium of portable information devices such as digital still cameras, PDA (personal digital assistant), for example. The flash memory card FMC is a thin plastic package having formed a slight recess holding a built-in flash memory device FM with 22-pin planar electrodes. The flash memory card FMC can exchange data with a host system (personal computer) when electrically connected to the host system via a connector. For example, using a PC card adapter, any file on the flash memory card can be readily delivered to the personal computer.

However, since a memory system using the flash memory FM can easily copy any files including copyrighted ones, such as musical data, and infringement of copyrights has been an issue of this system.

Apart from this, electrically rewritable EEPROM is known as a sort of flash memory. Especially, NAND EEPROM using a NAND cell made by serially connecting a plurality of memory cells has attracted attention as being available for high integration. A memory transistor of NAND EEPROM, has a FETMOS structure in which a floating gate (charge storage layer) and a control gate are stacked on a semiconductor substrate via an insulating film. Then, a plurality of memory transistors are serially connected, with a source and a drain commonly used by every two adjacent memory transistors, to form a single-unit NAND cell, and the NAND cell is connected to a bit line. A number of such NAND cells in a matrix arrangement form a memory array.

A memory array of NAND EEPROM is made up of a plurality blocks. If a single NAND cell has 16 stages, then each block includes 16 word lines for selecting the NAND cells and memory cells within a range where these word lines are continuous. This one block is the minimum unit of collective erasure in flash memory configured to erase data collectively. Each range with memory transistors under one word line is normally called one page.

EEPROM flash memory is now being remarked as not only being rewritable like DRAM but also maintaining storage of data by its nonvolatility even after power supply is cut. In applications of EEPROM flash memory, there is the demand for limiting free rewriting in a part of its memory region and for designing it as OTP (one time PROM) permitting data writing only once.

The demand arises, for example, in devices having a flash memory system for intake and transfer of musical data, for example, which are subjects of the serious copyright problem, when duplication of musical data must be limited to a certain extent. More specifically, in a memory system using EEPROM flash memory, it is requested to store a mark data in an OTP region as an irreversible change of state of a chip every time when the EEPROM flash memory is accessed, accompanied by the task of rewriting data thereon, and to permit the irreversible change of state only predetermined times.

SUMMARY OF THE INVENTION

It is therefore an object of the invention to provide a memory system ensuring protection of copyrights when a flash memory card, for example, is used.

Another object of the invention is to provide a control method of nonvolatile semiconductor memory including an OTP in a part of its memory region, which is capable of writing a mark data reliably preventing erroneous writing, etc. in the OTP region and clearly maintaining the boundary between a written region and a non-written region, and hence reliably storing irreversible changes of state.

According to the invention, there is provided a memory system comprising:

a recording medium storing a data file and identifying information for restricting the condition for using the data file; and a system apparatus permitting the recording medium to be removably set therein and requiring the identifying information when reading and using thereon the data file stored in the recording medium.

According to the invention, there is further provided a memory system comprising:

a recording medium storing a data file acquired by download from a distribution center together with identifying information incorporated into the data file for restricting the condition for using the data file; and a system apparatus permitting the recording medium to be removably set therein and requiring the identifying information when reading and using thereon the data file stored in the recording medium.

According to the invention, there is further provided a recording medium which can be set in a system apparatus and can be removed from the system apparatus, comprising:

a data storage field for storing a data file; and an identifying information storage field for storing identifying information for restricting the condition for using the data file, the identifying information required when the system apparatus reads and uses the data file.

According to the invention, there is further provided a system apparatus in which a recording medium is set and used, and the recording medium once set is removed, characterized in:

the recording medium storing a data file and identifying information for restricting the condition for using the data file; and the system apparatus requiring the identifying information when reading and using the data file stored in the recording medium.

According to the invention, there is further provided a system apparatus in which a recording medium is set and used, and the recording medium once set is remove, characterized in:

an identifying information hold portion which holds identifying information for identifying the system apparatus; and a judge portion which approves the use of the data file stored in the recording medium when a predetermined relation is established between identifying information incorporated into the data file stored in the recording medium and identifying information held in the identifying information hold portion, but does not approve the use of the data file when the predetermined relation is not established.

According to the invention, there is further provided a control method for controlling nonvolatile semiconductor memory having a memory cell array made of an arrangement of electrically rewritable nonvolatile memory cells, a part of the memory cell array forming a state change storage field permitting data to be written only once, said state change storage field including a plurality of pages each divided into a plurality of unit areas, comprising:

a first step for detecting that the nonvolatile semiconductor memory experienced a predetermined operation causing a change of state thereof; and a second step for writing a mark data in one of the unit areas in the state change storage field when the predetermined change of state is detected.

According to the invention, there is further provided nonvolatile semiconductor memory having a memory cell array made up of an arrangement of electrically rewritable nonvolatile memory cells, comprising:

an ordinary field made up of a part of the memory cell array to store a data file; and a state change storage field made up of another part of the memory cell array and including a plurality of pages each divided into a plurality of unit areas, the state change storage field permitting data to be rewritten only once, and upon any operation causing a predetermined change of state to the data file, a mark data is written in one of the unit areas.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

FIG. 3 is a diagram showing the structure inside a data region in the 16-Mbit NAND flash memory;

FIG. 4 is a diagram showing the structure of a logical block/physical block conversion table in the 16-Mbit NAND flash memory;

DETAILED DESCRIPTION OF THE PREFERRED EMBODIMENTS

Figures 1, 2:
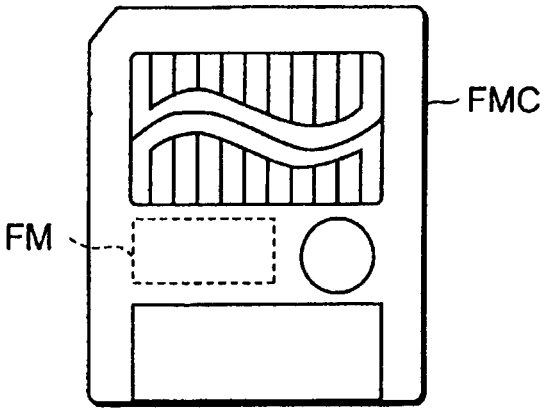
FIG. 1 is a diagram showing an outer aspect of a flash memory card.
FIG. 2 is a diagram showing the structure of a physical block in 16-Mbit NAND flash memory.

A small flash memory car FMC shown in FIG. 1 is explained as an example of storage mediums. This flash memory card FMC is made up of a thin plastic package having a slight recess, and flash memory FM having 22-pin flat electrodes is buried in the recess. In the embodiment shown here, flash memory called NAND EEPROM is used as the flash memory FM mounted in the flash memory card FMC. In flash memory FM of this type, a physical format specification directing a data storage method is determined for ensuring compatibility of data in the market.

As shown in FIG. 2, in case of 16-Mbit NAND flash memory, the flash memory is divided into 512 physical memory blocks Block 0 through Block 511. Each block is the minimum unit for erasure. Each memory block is divided into 16 pages Page 0 through Page 15. Each page is the basic unit for write and read. Each page is made up of 264 bytes. Among them, 256 bytes form a data field DT and the remainder 8 bytes form a redundancy field RD. The data field DT is the area for storing user data, and the redundancy field RD is the area for storing error correction codes, management information, and so forth.

In personal computers, etc., data is typically managed in the unit of each sector (512 bytes). Also in this flash memory, data is basically managed in the unit of 512 bytes. Therefore, two pages including an even page and an odd page are used as one pair.

Internal data arrangements of the data field DT and the redundancy field RD are shown in FIG. 3. In the data field DT and the redundancy field RD, a before-use normal area is set as "FFh". Explained below are meanings of individual bytes.

Data Status Area in the data field DT stores data of first half 0 to 255 bytes in the sector data of 512 bytes. Data Area-2 in the data field DT stores data of second half 256 to 511 bytes in the sector data of 512 bytes.

Data Status Area in the redundancy field RD is the area for storing data indicating whether the data stored in the data field in the common page is normal or not normal. This Data Status Area is set as "FFh" when the data in the data fields of the even page and the odd page forming a pair is normal, but it is set as "00h" when an improper data is written. That is, a single Data Status Area is used for setting of an even page and an odd page paired.

Block Status Area in the redundancy field RD is the area for storing data indicating whether the data stored in the memory block is normal or not normal. This Block Status Area is set as "FFh" when the data in the data fields of the memory block is normal, but it is set as "00h" (initially defective block) or "F0h" (afterward defective block) when an improper data is written. Therefore, if two or more bits exhibit "0" in this Block Status Area, then the memory block can be judged defective. In a common memory block, the same value is written in all Block Status Areas. That is, as shown in FIG. 2, in a common memory block, the same value is set in all Block Status Areas on Page 0 through Page 15.

As shown in FIG. 3, Block Address Area-1 in the redundancy field RD is the area for storing logical block address information about the memory block. In a common memory block, the same value is written in any Block Address Area-1. This results in that, in Block Address Area-2, the same logical block address information as that of Block Address Area-1 is written. For control of the flash memory card FMC used here, an additional write procedure is employed, in which, upon data renewal, renewal data is written in a previously erased memory block area, and previous data is erased from a memory block area where the previous data exists. This means that the physical block address where the data corresponding to a certain logical block address exists is not fixed, but always moves in the memory.

Therefore, as explained above, Block Address Area-1, -2 in the redundancy fields RD of each of memory blocks Block 0 through Block 511 store logical block address information identifying particular logical blocks corresponding to their own storage data. Typically, immediately after the supply of power, by searching Block Address Areas-1 and/or Block Address Areas-2 in all physical blocks Block 0 through Block 511, a conversion table of logical blocks and physical blocks as shown in FIG. 4 is made on a system RAM. Once the conversion table is made, location of a physical block corresponding to a certain logical block can be readily known with reference to the conversion table. Therefore, it is sufficient to conduct the search of all memory blocks only once subsequently to power-ON. Needless to say, if there occurs a change in location of a physical block due to data renewal thereof, then the conversion table shown in FIG. 4 is renewed to be available for a next access.

As shown in FIG. 3, ECC Area-1 in the redundancy field RD is an area for storing ECC (error correction code) of three bytes for the data field DT (256 bytes) on an even page. ECC Area-2 is an area for storing ECC of three bytes for the data field DT (256 bytes) of an odd page. ECC is a code for correcting an error. The system uses ECC for error correction to judge whether a data read out from the data field DT includes an error or not, and if any error exists in the data field DT, it can correct the error.

Figures 5, 6, 7:
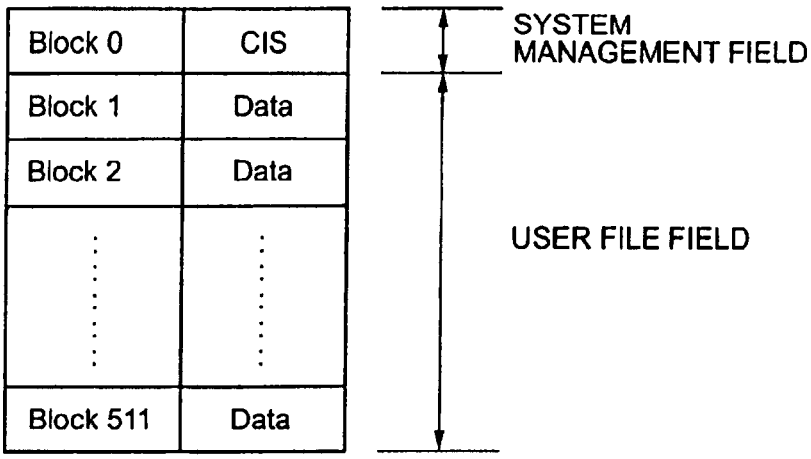
FIG. 5 is a diagram showing the structure of the physical block in the 16-Mbit NAND flash memory (when the leading block is not a defective block)
FIG. 6 is a diagram showing the structure of the physical block in 16-Mbit NAND flash memory (when the leading block is a defective block)
FIG. 7 is a diagram showing the structure of a CIS region shown in and FIG. 5 and FIG. 6.

FIG. 5 is a diagram re-arranging the content of FIG. 2 from another point of view. As shown in FIG. 5, CIS (card information structure) is defined in the leading block among the memory blocks Block 0 through Block 511. As explained above, for the flash memory card FMC, a data storage method is determined for ensuring compatibility in the market. CIS mentioned above is an identifying area for judging whether the flash memory card FMC is in accordance with the predetermined data storage method. CIS is located in the leading block among effective blocks. As shown in FIG. 5, if the first memory block Block 0 is not defective, then CIS is located in the leading memory block Block 0. If the leading memory block Block 0 of the chip is defective, then CIS is located in the second memory block Block 1 as shown in FIG. 6.

As shown in FIG. 7, CIS is divided into two fields A and B. Field A is a fixed data field. Leading 10 bytes of the field A are used to judge consistency or inconsistency with the predetermined data storage method. Upon power-ON, the system reads leading 10 bytes of the CIS block, and if the value coincides with a predetermined value, it considers the flash memory card FMC to be in accord with the predetermined data storage method, and progresses the processing. If the system cannot read predetermined 10 bytes, it considers the flash memory card FMC to be a product of an unknown format, and interrupts the subsequent processing to prevent destruction of data.

The CIS field is an area the system (for example, controller in a PC adapter card) is exclusively allowed to make reference of, and ordinary end users cannot look. For example, when a file is stored in the flash memory card FMC through the PC adapter car, the file is stored, using a site other than the CIS field, involving a file management field (master boot sector, partition boot sector, FAT, directory, etc.) and the file data itself altogether. Therefore, the CIS field is not visible from above the personal computer unless using a special means.

Field B, the other field of CIS, is an area permitting any arbitrary data to be set, but no end user can de such setting or arbitrary data. Upon shipping the flash memory card FMC, and by using a special tool later, data is set in the field B.

Next explained is an embodiment for protecting copyright on a flash memory card having the above-explained regulation.

Literary works include all matters lawfully originating copyrights, such as musical data like classic music and popular music, English or other language text data, character data like literature, magazines and newspapers, audio data of performances, interviews, comical talk entertainment, etc. Other data lawfully originating no copyright but desirable to be protected in some way such as copy protect, for example, may be also treated similarly. In the explanation given below, these are collectively referred to as literary works or contents.

First Embodiment

The first embodiment of the memory system according to the invention is explained below. This embodiment is directed to flash memory for sale after storing literary works.

There are various ways for copyright protection. In this embodiment, identifying information is previously written in the CIS filed (field B in FIG. 7 permitting any arbitrary data to be set) of the flash memory card FMC. Although details will be explained later, the identifying information is one for restricting conditions for enabling the use of a file of a literary work stored in the flash memory FM. This identifying information may be named as identifying code.

Figure 8:
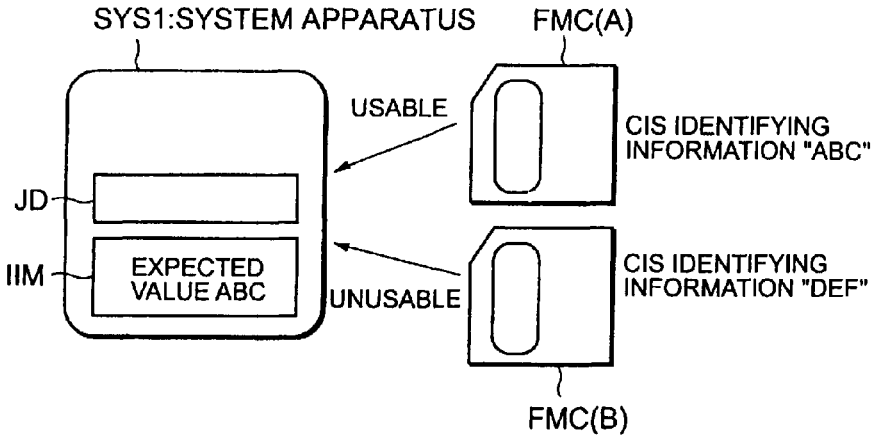
FIG. 8 is a diagram showing a general aspect of the first embodiment of the invention.

As shown in FIG. 8, an end user can listen to music or watch images by setting the flash memory card FMC in the system apparatus SYS1 according to the first embodiment (for example, music reproducing apparatus, image display apparatus, etc.). Additionally, the end user can remove the flash memory card FMC from the system apparatus SYS1 and set another flash memory FM therein.

The system apparatus SYS1 shown here expects the row of letters "ABC" as the identifying information of CIS in the flash memory card FMC. The expected value "ABC" is held in identifying information memory IIM of the system apparatus SYS1.

Here are taken two kinds of flash memory cards FMC, namely, a flash memory card FMC(A) having "ABC" and a flash memory card FMC(B) having "DEF" as the identifying information on CIS. Actually, CIS identifying information is not limited to those of three letters, but its number of letters (including numbers) is preferably many as possible. Furthermore, the CIS identifying information may be created by using random numbers. In the example shown here, the information is made up of three letters for simplicity.

In the case of FIG. 8, since the system apparatus SYS1 expects the rows of letter "ABC" as the CIS identifying information, when the flash memory card FMC(A) is inserted into the system apparatus SYS1, the flash memory card FMC(A) can be used normally. However, since the flash memory card FMC(B) does not have the expected identifying information "ABC", it cannot be used in the system apparatus SYS1. This judgement is executed by a judge means JD in the system apparatus SYS1.

The identifying information is not disclosed generally. In this case, therefore, only flash memory cards FMC sold with "ABC" written as the identifying information can be used in the system apparatus SYS1, and copyright of the literary work in the flash memory card FMC is protected.

Regarding the flash memory card FMC(B) judged non-usable, many levels for rejection of its use are employable. In case of music, for example, in addition to the level completely disabling a user to listen to music, it is possible to employ the level permitting a user to listen to a part of the music. This will be employable, for example, when letting a user to listen to a part thereof for the purpose of promotion.

If the system apparatus SYS1 is an image display apparatus, in addition to the mode of protection absolutely disabling a user to watch, there are many ways of protection, such as giving a part of an image, giving only a scrambled image (like a mosaic image), and giving only a small thumb-nail image, for example. Alternatively, it may be designed to provide very high-fidelity images on the system apparatus SYS1 in case of an original flash memory card FMC(A) while providing only low-fidelity, rough images on the system apparatus SYS1 in case of a copy (unapproved) flash memory card FMC(B).

It is also possible to permit the use of a certain function with the original flash memory card FMC(A) and to reject the use of a certain function otherwise. In case of music, for example, certain limitation may be added to functions of the system apparatus SYS1, such as permitting the use of the queue function similarly to CD players with an original flash memory card FMC (A) but rejecting the same function with other flash memory cards FMC. That is, if any difference exists between the use of the flash memory card FMC(A) having expected proper identifying information and other flash memory cards FMC, the purpose will be accomplished.

In the above-explained method, however, only if the expected identifying information "ABC" is written, all such flash memory cards FMC are regarded as proper flash memory card, and there is the possibility that honesty of the file stored thereon cannot be judged. That is, it may occur that, once a user purchases a flash memory card FMC with identifying information "ABC", he can acquire copy data onto the flash memory card FMC from an unfair WEB site on the Internet and can use it thereafter.

Additionally, when the expected identifying information is definitely determined in the manufacturing process of the system apparatus SYS1 (in case of this embodiment, "ABC"), original flash memory cards FMC having identifying information other than "ABC" cannot be sold. This problem will be overcome by using some means to have the system apparatus SYS1 function to change the expected value or add an additional expected value. For example, software for changing the expected value of the system apparatus SYS1 or adding an additional expected value may be added to original flash memory cards to use it for changing the expected value of the system apparatus SYS 1 or adding an additional expected value. Alternatively, such software may be installed in the system apparatus SYS1 while providing only the changed expected value on such flash memory cards FMC under some engagement. Needless to say, instead of changing the expected value, depending on information on a flash memory card, the system may be designed to change the expected value of the system apparatus SYS1, for example, by changing the system apparatus SYS1 to a personal computer, or the like, via a cable, for example, and by operating the personal computer. That is, the system may be added with the function for changing the expected value of the system apparatus SYS1 or adding an additional expected value by some procedure after shipment of the system apparatus SYS1.

Second Embodiment

Next explained is the second embodiment of the memory system according to the invention. Similarly to the first embodiment, this embodiment is also directed to flash memory for sale after storing literary works.

Figure 9:
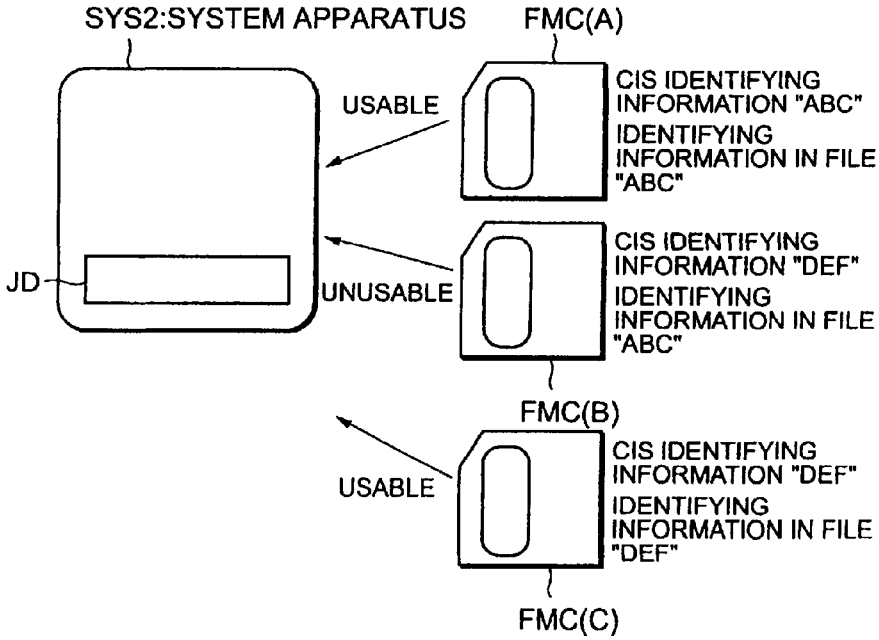
FIG. 9 is a diagram showing a general aspect of the second embodiment of the invention.

A general aspect of the second embodiment is shown in FIG. 9. In this embodiment, identifying information is stored in the field B of CIS (see FIG. 7) in the flash memory card FMC, and simultaneously, information related to the identifying information stored on CIS is taken into the file itself to be stored in the flash memory card FMC.

For example, in the case where the identifying information of CIS in the flash memory card FMC(A) is "ABC" as shown in FIG. 9, information related to the identifying information "ABC" is introduced into the file to be stored in the flash memory card FMC(A). For simplicity, here is shown a case where the row of letters "ABC", in the same form, is taken also as the identifying information in the file.

A system apparatus SYS2 reads identifying information from CIS of the flash memory card FMC(A). In the case of FIG. 9, identifying information "ABC" is read into the system apparatus SYS2. After that, the system apparatus SYS2 reads identifying information from the file stored in the flash memory card FMC. If "ABC is read out as the identifying information from the file, the system apparatus SYS2 acknowledges the file as the original file.

In the case where other information such as "DEF" instead of "ABC" is read out as the identifying information from the predetermined field of the file, like the flash memory card FMC (B), the system apparatus SYS2 prohibits or restricts the use of the flash memory card FMC(B). That is, the system apparatus SYS2 regards the file as copied from another flash memory card FMC through a personal computer, for example, and prohibits or restricts its use on the system apparatus SYS2. Details of the restriction are substantially the same as those explained with the first embodiment.

Judgement on consistency or inconsistency between the CIS identifying information of the flash memory card FMC and the identifying information in the file is executed by a judge means JD in the system apparatus SYS2.

A difference of the second embodiment from the first embodiment lies in enabling the use of a flash memory card FMC(C) in the system apparatus SYS2 when identifying information in CIS coincides with the identifying information in the file even if these pieces of identifying information are unknown when the system apparatus SYS2 is manufactured. For example, in the case where the system apparatus SYS2 is a music player, the identifying information in the CIS field corresponds to the name of a singer or an album. In the embodiment shown here, since the system apparatus SYS2 can reproduce any piece of music which can be stored in the original flash memory card FMC even after a new singer appears or a new album issues, they can be put on sale without problems. That is, any flash memory card FMC in which the identifying information in CIS and the identifying information in the file coincide can be used in the system apparatus SYS2.

The embodiment shown here is not limited to the above-explained method. It is sufficient to establish an appropriate relation between the flash memory card FMC and the literary work. The above example has been explained as taking the row of letters in the CIS field unchanged into the file. However, the embodiment can be modified in various modes within the scope of the invention for example, the row of letters to be taken into the file need not fully coincide with the row of letters stored in the CIS field. For "ABC", the inverted form "CBA" may be stored as well. "BCD" shifted from "ABC" by one alphabetical letter may be stored, or a form shifted by two or more letters may be stored. It is also possible to assign numerals to individual letters in "ABC" in the alphabetical order to store as "123". Only if a relation according to some regulation is established between the identifying information in the CIS field and the identifying information in the file, it meets the concept of the invention. Additionally, it is not necessary that the identifying information in the file coincides with the identifying information in CIS in number of letters. Also when "ABCDEF" or "ABCABC", for example, is stored by changing the number of letters from "ABC", it is acceptable as far as some regularity is established.

For further improvement of the reliability, instead of simply storing identifying information in the file from the CIS field, information relates to the identifying information in the CIS field may be ciphered together with other data in the file, for example. When it is simply stored in the file, there arises the possibility that the storage position of the information related to the identifying information is located by comparing file data of several flash memory cards FMC having other identifying information. To prevent it and improve the reliability, differences among several flash memory cards FMC may be increased by ciphering or other method over a relatively wide area. A cipher key for deciphering the cipher file may be provided in ASIC (application specific integrated circuit), for example, in the system apparatus SYS2. Alternatively, the cipher key itself may be sold together with the literary work. The information related to the identifying information in the CIS field need not exists in each file. Another file related to the content of the literary work (for example, a file storing the title of music) may have the information representatively.

Taking this embodiment into consideration, assume here, for example, that a person having purchased a flash memory card FMC storing a literary work through a proper route once transferred the file of the literary work stored in the flash memory card FMC to a personal computer, and again transferred this file from the personal computer to another blank flash memory card FMC. In this case, the file of the literary work can be transferred normally. However, on the flash memory card FMC to which the file was re-transferred, the identifying information in the CIS field is not regularly related to the identifying information in the transferred file. Therefore, the system apparatus SYS2 can readily judge the file stored in the flash memory card FMC to be an unapproved copy. As a result, the use of the flash memory card FMC with the unapproved copy is restricted.

This is a result of an ingenious use of the mechanism in which, when transferring data to a personal computer by using a general purpose adapter card, for example, the controller in the adapter card makes access to the CIS field to confirm whether it meets the standard format or not, but software on the personal computer, etc. cannot access to the CIS field unless using a special method, and even though the file can be transferred, identical information in the CIS field is never transferred to other flash memory cards FMC.

Figure 10:
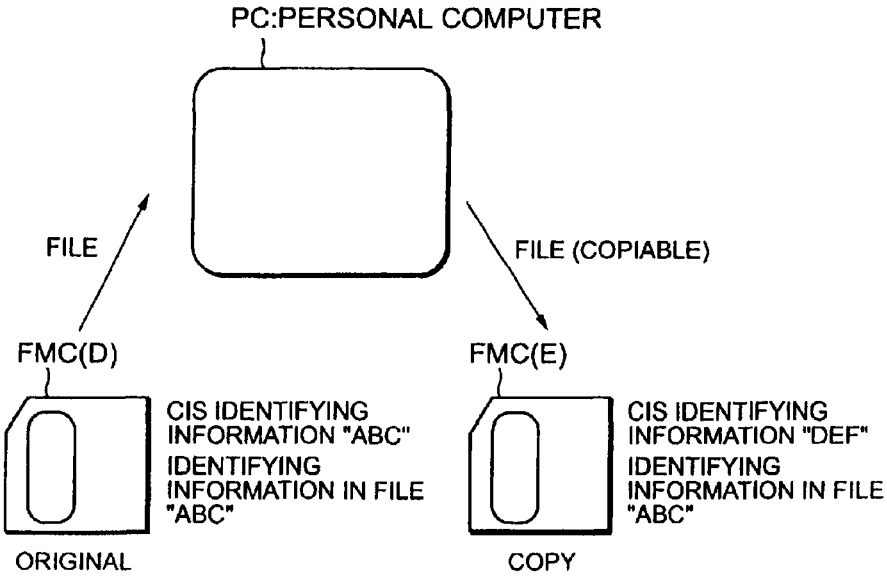
FIG. 10 is a diagram showing a general aspect of the second embodiment of the invention.

A general aspect of this example is shown in FIG. 10. In an original flash memory card FMC(D), "ABC" is stored as identifying information in the CIS field, and "ABC" is stored also as the identifying information in the file. Under the situation, the file of a literary work stored in the flash memory card FMC(D) is once transferred to a personal computer PC. After that, the file of the literary work is transferred from the personal computer PC to another flash memory card FMC (E). In this case, the identifying information in the CIS field of the flash memory card FMC(E) at the destination of the transfer is "DEF", and it does not coincide with the identifying information "ABC" in the transferred file. Therefore, the system apparatus SYS2 can note inconsistency between both pieces of identical information and can judge it as an unapproved copy.

The identifying information in the CIS field may be a code assigned to each literary work, or may be a code exclusive to each flash memory card FMC or exclusive to a certain group. If a single byte is simply assigned as the area for storing identifying information, 256 kinds of information from 00h to FFh can be set. When such identifying information is written sequentially one by one in CIS fields of flash memory cards FMC, different flash memory cards FMC have common identifying information with the probability of one per 256. However, the probability that an ordinary end user finds out another flash memory card FMC having the same identifying information is very small. By increasing the number of bytes as the area for storing identifying information, the probability of finding it out can be made sufficiently close to zero. Also when only one byte is assigned to the CIS field, code of the identifying information may be assigned for each album, for example. Even if another flash memory card FMC having the same identifying information code is found, mutually copiable files are the same files, and both are the literary work properly purchased. Therefore, there is no merit in making a copy.

Figure 9A:
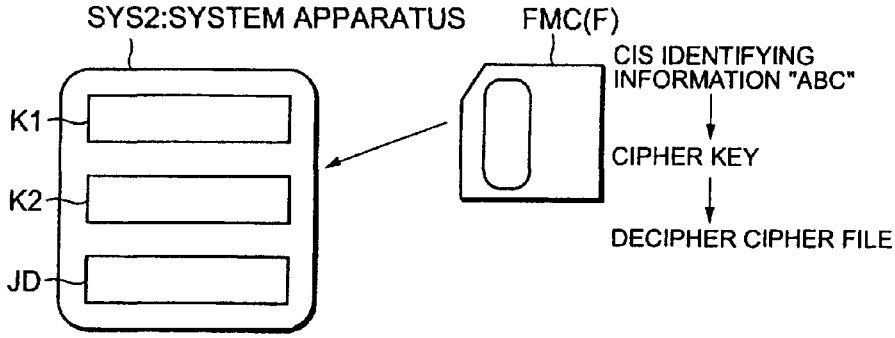
FIG. 9A is a diagram explaining an aspect when composing a cipher key from identifying information and deciphering cipher file by using the cipher key.

It is sufficient for the identifying information in the file to be related to the identifying information in the CIS field in a certain sense. For example, as shown in FIG. 9A, a cipher key may be made on the basis of the identifying information stored in the CIS field so that the cipher file can be deciphered by using the cipher key.

Assume that the identifying information "ABC" is stored in the CIS field of a flash memory card FMC(F). A cipher key generator K1 in the system apparatus SYS2 creates a cipher key from the identifying information "ABC". The flash memory card FMC(F) stores a ciphered file which can be deciphered with the cipher key created on the basis of the identifying information "ABC". A decipher means K2 in the system apparatus SYS2 deciphers the cipher file stored in the flash memory card FMC(F) by using the created cipher key. Thus, if the system apparatus SYS2 can decipher the cipher file, it can use the file. In contrast, if the system apparatus SYS2 cannot decipher the cipher file, it cannot use the file. Judgement on success or failure to decipher the cipher file is executed by the judge means JD in the system apparatus SYS2.

The file stored in the flash memory card FMC may be totally or partly ciphered on the basis of the identifying information "ABC".

That is, in the case where the file of the literary work is illicitly copied, the cipher file cannot be deciphered, and the copyright of the file stored in the flash memory card FMC can be protected in this manner as well.

When the cipher file is deciphered by using the identifying information in the CIS field in this manner, it means that the identifying information in the CIS field coincides with the identifying information in the file. That is, consistency or inconsistency between the identifying information in the CIS field and the information related to the identifying information in the file may be expressed as the cipher file being normally deciphered or not.

As explained above, by establishing a certain relation between the flash memory card FMC itself and the literary work stored in the flash memory card FMC, unapproved copy of the literary work can be prevented.

Third Embodiment

Next explained is the third embodiment of the memory system according to the invention. Although the first and second embodiments take the cases where a flash memory card FMC is put on sale after storing a literary work, the embodiment shown here takes a case where the information of the literary work itself is the subject to be sold, and the literary work is purchased by down-loading it on a flash memory card FMC on sale.

For example, through a download-dedicated terminal DLT settled in a drug store, station or any other convenient place, information of a literary work is downloaded into the flash memory card FMC. The dedicated download terminal DLT is a terminal exclusive to download of literary works, which can freely refer to or rewrite the CIS field of a flash memory card FMC. That is, it is sufficient that the result of writing the file of the literary work on the flash memory card FMC through the dedicated download terminal represents the status on sale of the flash memory card FMC previously storing the literary work as explained in the first and second embodiments.

Figure 10A:
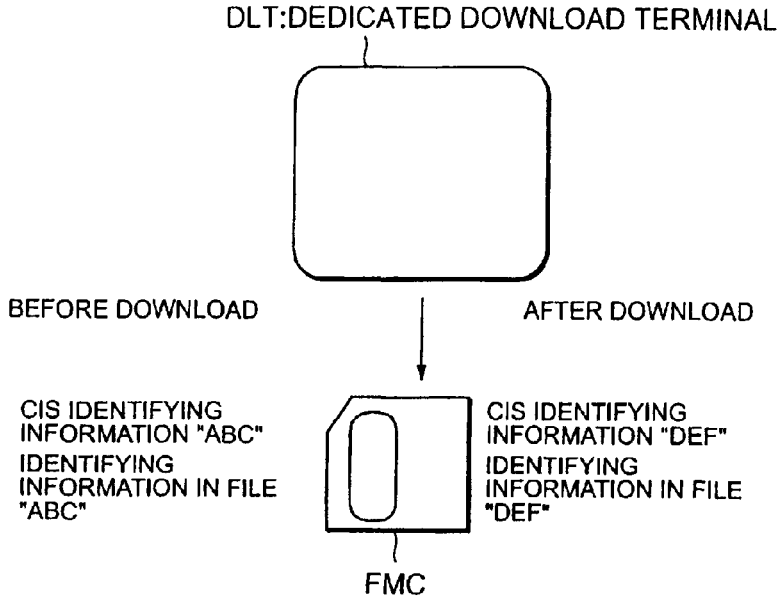
FIG. 10A is a diagram showing a general aspect of the third embodiment of the invention.

For example, as shown in FIG. 10A, prepared is a flash memory card FMC storing "ABC" as the identifying information in the CIS field B before download and storing "ABC" as the identifying information in the file of the literary work. By connecting the flash memory card FMC to the dedicated download terminal DLT, data of a new literary work is downloaded from the dedicated download terminal DLT onto the flash memory card FMC. Since the identifying information in the file of the literary work is "DEF", the identifying information in the file in the flash memory card FMC also changed to "DEF. Additionally, during the download, the dedicated download terminal DLT writes the identifying information "DEF" in the CIS field B of the flash memory card EMC. Therefore, in the flash memory card FMC, the identifying information in the file of the newly downloaded literary work and the identifying information in the CIS field B coincide. As a result, the end user can use the flash memory card FMC in the system apparatus SYS2. Furthermore, the dedicated download terminal DLT may create the identifying information by random numbers.

Figure 10B:
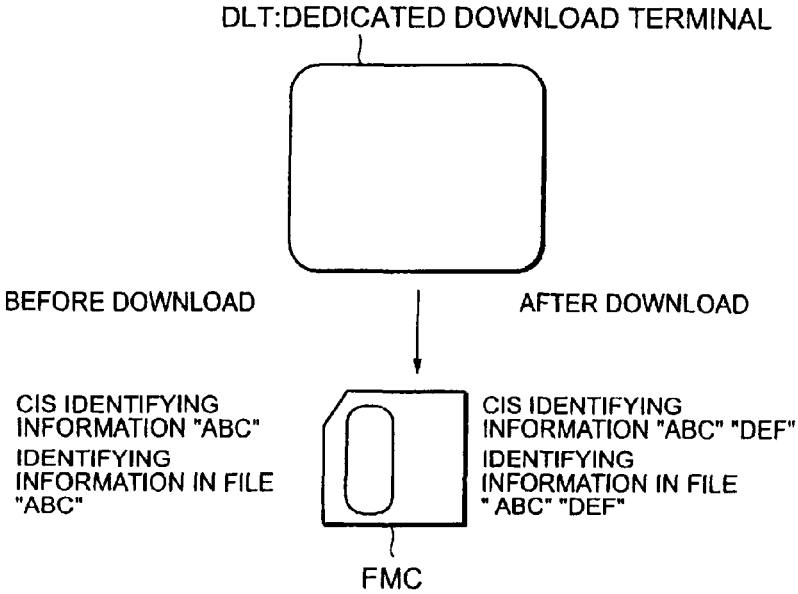
FIG. 10B is a diagram showing a general aspect of a modified version of the third embodiment of the invention.

Simultaneously with rewriting the identifying information in the CIS field, the use of the literary work heretofore stored is disabled. However, as shown in FIG. 10B, if CIS has storage of some kinds of identifying information, the use of the original file already existing upon download need not be interrupted an can be continued even after several occurrences of download.

For example, prepared is a flash memory card FMC storing "ABC" as the identifying information in the CIS field B before download and storing "ABC" as the identifying information in the file of the literary work. By connecting the flash memory card FMC to the dedicated download terminal DLT, data of a new literary work is downloaded from the dedicated download terminal DLT onto the flash memory card FMC. Since the identifying information in the file of the literary work is "DEF", the identifying information in the file in the flash memory card FMC also changed to "DEF. Upon this download, the file of the literary work heretofore stored is also maintained non-erased. Therefore, in the flash memory card FMC, both the file of the literary work having the identifying information "ABC" and the file of the literary work having the identifying information "DEF are stored. Additionally, upon the down load, the down load dedicated terminal DLT write the identifying information "DEF" in addition to the identifying information "ABC" in the CIS field B of the flash memory card FMC. Therefore, both the identifying information "ABC" and the identifying information "DEF" are stored in the CIS field B of the flash memory card FMC. As a result, in the flash memory card FMC, both the file having the identifying information "ABC" and the file having the identifying information "DEF" are enabled to use.

The dedicated download terminal DLT for downloading data is not limited to the above-explained example. Vender machines of juice, for example, widely distributed in the society may be modified to include the function of the dedicated download terminal DLT, and they can be used for download. In this case, literary works for sale may be renewed simultaneously with supplementation of commodities of the vender machine or in any appropriate intervals through wireless transmission like PHS, for example, or through wire transmission.

Public phones are also usable. By providing a public phone, or the like, with a connector for insertion of a flash memory card, a public telephone line may be used to distribute literary works Similar situation will be possible through PHS or portable phones, as well. Satellite broadcastings, CATV, etc. will be also usable for receiving data. Even with personal computers, the same will be realized. A tool having the function of reading out data from the CIS field may be also prepared. By controlling a tool connectable to a USB port, serial port, printer port, ISA bus slot, etc. of a personal computer with special software, the personal computer will function similarly to the dedicated download terminal DLT to enable access to the CIS field for referring the identifying information, for example, or for changing it.

The above explanation has been made on the adapter as using a general purpose adapter, such as PC card ATA interface, having a standard device driver for personal computers. However, it is also possible to use an adapter card not based on the PC card ATA interface but permitting a user to install a device driver and access to the CIS field, or others having similar functions, in combination with special download software.

Figure 10C:
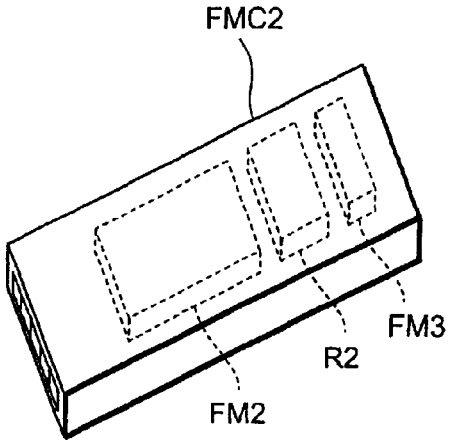
FIG. 10C is a diagram showing a flash memory card in accordance with a PC card ATA interface employing the third embodiment of the invention.

The invention is applicable to various flash memory cards other than that shown in FIG. 1. For example, the invention can be employed also to a flash memory card FMC2 according to the PC card ATA interface as shown in FIG. 10C, for example.

The PC card ATA interface directly uses the protocol of hard discs of IDE specification to a PC card type flash memory card FMC2. Typically, the flash memory card FMC2, which is an ATA card, includes therein a controller or RAM R2 as a buffer, small-type flash memory FM3 for storing firmware (with or without a controller), and so on, in addition to flash memory FM2 for storing data.

There are various methods usable to store information corresponding to the identifying information of the CIS field in the PC card type flash memory card FMC2. For example, an attribute memory space if defined in the PC card, and a host system judges the type of the card (for example, ATA card, modem card, LAN card, etc. by referring to the attribute memory space. The content in the attribute memory space is called tuple, and standardized by PC card standards, etc. In the standardized specification, there is an area permitting a card vender to fix vender information or product information. By using this area, operations pursuant to the intention of the above-explained embodiment are enabled.

In this case, the above-explained CIS identifying information may be stored on nonvolatile memory in the controller, or nonvolatile memory such as flash memory connected to the controller, or in main flash memory for storing files in the card. Similar operations are possible with means other than the attribute memory space. In the ATA protocol, there is a command called Identify Drive (Hex Code ECh). This command is used to give notice on the specified values as the hard disc (for example, numbers of sectors, cylinders and heads) to the host side. In the return value to this command, there is an area for storing the model number, version number of the built-in microcode, and so on. This area may be used to sore information corresponding to the identifying information in the CIS field. As explained above, the place in the ATA card for storing the value may be determined as desired. Alternatively, the value may be in a rewritable form taking account of its general use or in a form prohibiting erasure or rewrite for the purpose of increasing the security.

A new vender unique command may be used as well. By using a command other than those determined by the ATA protocol, a value corresponding to the identifying information in the CIS field in the above-explained embodiment may be output. For example, F3h may be determined as the identifying information read-out command, or it is also acceptable to request several times of command entry, such as F3h-F4h, for example. Regarding the way of output from the card, identifying information may be output from the fist byte, or a certain value (such as AaH) indicating that this command is supported may be output, using the first byte or a predetermined number of bytes. It is also acceptable to prepare another command for judging whether the command is supported or not.

The number of bytes of the identifying information may be determined as desired. For the purpose of ensuring consistency with other commands, a design configured to read out data of one sector (typically, 512 bytes). For example, a Read long command (22h/23h) transfers data including ECC bytes from the drive to the host after transferring the data of 512 bytes. These bytes may include information corresponding to the identifying code. Alternatively, it is possible to design so that data corresponding to the identifying information be output when a certain sector is accessed, or the same information be obtained when a sector other than the supported address space (number of sectors)is accessed. Alternatively, the controller itself may compare the identifying information with the information concerning the identifying information stored in the file to prohibit output of the file when they are different. As explained above, it is sufficient for the entire system to have the function of storing the memory card stores identifying information by any appropriate means while storing information related to the identifying information in the file to enable their comparison.

Application of this embodiment is not limited to the ATA card. Usable as the card are various memory cards having no controller, cards including a controller of a type different from the ATA specification (it need not contain CPU but may be made up of relatively simple SIC, etc.), cards including memory other than flash memory (FRAM, SRAM, MROM, DRAM, etc.), and those combined with various types of memory. Also regarding the flash memory, the embodiment is not limited to the use of the NAND flash memory used in the memory card shown in FIG. 1, may use any flash memory regardless of its type, such as AND type, NOR type and DINOR type. Additionally, it is applicable to any nonvolatile memory other than flash memory of byte-type EEPROM, serial EEPROM, EPROM, and so on. Also for recording mediums other than semiconductor mediums such as CD-ROM, DVD, MD, LD, HDD and FD, the same discussion is applicable. Only when the system includes a recording medium and a file stored in the recording medium, stores an exclusive identifying code in the recording medium and stores information having a certain relation with the identifying code in the file, it satisfies the concept of the invention.

Furthermore, as already explained with reference to FIG. 9A, it is sufficient for the identifying information in the file to be related to the identifying information in the CIS field in any sense. For example, a cipher key may be made on the basis of the identifying information stored in the CIS field so that the cipher file can be deciphered by using the cipher key.

When the cipher file is deciphered by using the identifying information in the CIS field in this manner, it means that the identifying information in the CIS field coincides with the identifying information in the file. That is, consistency or inconsistency between the identifying information in the CIS field and the information related to the identifying information in the file may be expressed as the cipher file being normally deciphered or not.

As to the procedure for holding the identifying code, procedure for comparing both pieces of information and treatment upon inconsistency between them, there is very wide freedom.

Fourth Embodiment

Next explained is the fourth embodiment of the memory system according to the invention. This embodiment intends further improvement of the reliability attained by the first to third embodiment. The embodiment shown here may be used in combination with any of the first to third embodiments, or may be used alone. This embodiment uses the setup of the standard data storing specification (physical format) already explained, and it is characterized in intentionally creating a status partly different from the status properly stored in the standard physical format.

For example, there is a method using the Data Status Area in the redundancy field RD explained with reference to FIG. 3. As explained, stored in the Data Status Area is the information indicating whether the information stored in the data field DT is normal or not therefore, this Data Status Area is normally set in "FFh", but it is set in "00h" when the written data is found not normal. For example, in the case where a user tries to exchange data between a flash memory card FMC and a personal computer by using an adapter card, if a sector with the defective mark "00h" (indicating that the data is not normal) in the Data Status Area of the flash memory card FMC is accessed from the personal computer, Error is returned back. Therefore, the user cannot transfer the file containing an area with the defective mark "00h" in the Data Status Area by means of a personal computer, or the like. Using this nature, unapproved copy can be prevented.

Figure 11:
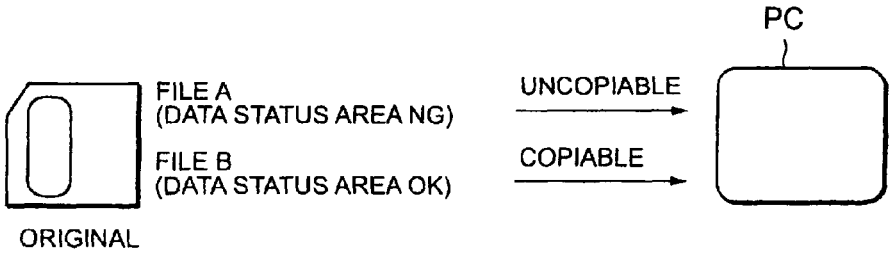
FIG. 11 is a diagram showing a general aspect of the fourth embodiment of the invention.

A general aspect of this embodiment is shown in FIG. 11. A file A has the defective mark in a Data Status Area of the data in the file. That is, in a Data Status Area of at least one memory block among a plurality of memory blocks forming the file A, the defective mark "00h" is attached. In contrast, the Data Status Area of the file B is normal. That is, here is assumed that all Data Status Areas of all memory blocks forming the file B are normal.

For example, taking a case of selling the flash memory card FMC after storing a literary work therein, the file A corresponds to it. In the process of storing the file of the literary work in the flash memory card FMC, the defective mark is attached simultaneously in a Data Status Area. Under the situation, in the case where a user tries to transfer the file of the literary work from the flash memory card FMC onto a personal computer by using a general purpose adapter card, for example, if the memory block field storing the file A is accessed, the controller in the adapter card judges the data stored in the corresponding memory block to be not normal, ad returns Error to the host. In this case, for example, a message "an error found in the drive", or the like, is displayed on the screen of the personal computer, and the transfer of the file is interrupted. In contrast, Data of a file B with no defective mark in any Data Status Area can be freely transferred to the personal computer.

In this manner, by storing the file of the literary work in the flash memory card FMC while intentionally assigning the defective mark indicating that the data is not normal, unapproved file copy of the literary work can be prevented. Needless to say, however, the system apparatus (music player, for example) has to understand that the mark in the Data Status Area has been attached intentionally, and to regard as the proper data being stored. Therefore, when intentionally attaching the defective mark in a Data Status Area, the area for attaching the defective mark should be determined previously.

Regarding the positions for assigning the mark, various ways will be employable. For example, assume here that the mark attached to each file. It is also possible to attach the defective mark in all sectors in the entire file (all memory blocks). Alternatively, the defective mark may be attached to some of the sectors (some memory blocks). For example, it is possible to employ the transaction of previously determining which numbered sector (memory block) in the file should be used for the purpose.

Alternatively, a particular sector (memory block) for attaching the defective mark may be determined previously. For example, by determining all of the data in the first sectors (memory blocks) as FFh, and the defective mark may be attached to the first sectors.

Positions for attaching the defective mark are not limited to those in the file. For example, a DOS file management field may be used. Also, the mark may be attached in a master boot sector field, partition boot sector, FAT field, root directory field, subdirectory field, and so forth. If the mark is attached in the master boot sector field, etc, the personal computer cannot identify it as the drive, transfer of the file is disabled.

The mark in the Data Status Area is effective for read operation. If another instruction for writing the same area is issued, new data is written, and the mark in the Data Status Area disappears. Therefore, also in a card having a copy preventing mechanism according to the invention for the purpose of reproduction of music, if the corresponding file becomes useless, another file may be written, or the card may be re-used in another system.

The embodiment shown here is applicable in various modified forms within the concept of preventing unapproved copy by intentionally creating a status partly different from the original proper status and having the status judged by a general purpose system. In other words, depending on the contents of the management information additionally stored in the body of the data, the system approves or prohibits data reading operation. Although an ATA adapter card is so configured that its built-in controller returns Error, when an adapter card, or the like, having no built-in controller is used, the device driver on the personal computer executes this judgement. Also regarding the way of returning Error, there are various methods. In case of an ATA adapter, occurrence of a non-correctable read-out error may be noticed to the host, or the notice of entry of an unapproved command may be given (command abort), or an error code indicating that the designated sector has not been found may be returned. Any desired way of returning Error may be employed.

Next shown is the way of using the Block Status Area. As set forth, each Block Status Area demonstrates good or bad status of the block. Although it is normally "FFh", in case of a defective block, "00h" (initially defective block) or "F0h" (afterward defective block) is set. If two or more bits exhibit "0", then the memory block are judged defective.

As explained before, the system apparatus is typically configured to search Block Address Areas-1 and/or Block Address Areas-2 in all physical blocks Block 0 through Block 511 immediately after the supply of power, and makes a conversion table of logical blocks and physical blocks as shown in FIG. 4 on a system RAM. Once the conversion table is made, location of a physical block corresponding to a certain logical block can be readily known with reference to the conversion table. Therefore, it is sufficient to conduct the search of all memory blocks only once subsequently to power-ON.

Needless to say, if there occurs any change in location of a physical block due to data renewal thereof, then the conversion table must be renewed to be available for a next access.

Upon making the conversion table shown in FIG. 4, all memory blocks Block through Block 511 are searched, and in this search process, the system apparatus first makes reference to the Block Status Area. If a defective mark is attached to the Block Status Area, the system apparatus judges the memory block as being an electrically defective block and having symptoms disabling erasure or writing, or generating uncorrectable errors. Therefore, the system apparatus interrupts the process of reading Block Address Areas-1, -2, etc. of this memory block and incorporating them into the conversion table, and proceeds to the process of the next memory block. Therefore, the defective block is never accessed by the system apparatus until the next power-ON. As a result, data in the defective block with the defective mark in the Block Status Area cannot be referred to with a general purpose system apparatus.

Explained below a method for protecting a literary work by using this mechanism. This method attaches a defective mark to the Block Status Area in the memory block, and uses this defective mark for copyright protection. For example, as explained in the first to third embodiments, identifying information in the flash memory card FMC, for example, is stored in an apparent defective block. Its general aspect is shown in FIG. 12.

Figure 12:
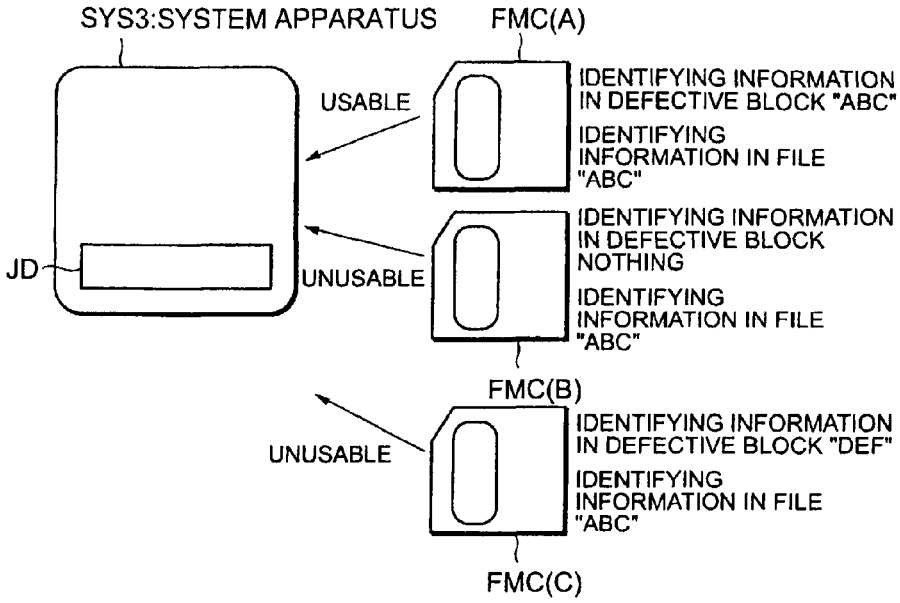
FIG. 12 is a diagram showing a general aspect of the fourth embodiment of the invention.

As shown in FIG. 12, a system apparatus (for example, music player) SYS3 expects consistency of the identifying information stored in the defective block and identifying information buried in the file. In case of the flash memory card FMC (A), identifying information in the defective block is "ABC", identifying information buried in the file is also "ABC", and both coincides. Therefore, the system apparatus SYS3 can judge the literary work stored in the flash memory card FMC(A) as being the original literary work. In contrast, in case of the flash memory card FMC(B) and the flash memory card FMC(C), a difference is found between the identifying information in the defective block and the identifying information buried in the file. Therefore, the system apparatus SYS3 judges the stored literary work as being illicitly acquired, and adds restriction to the process. In this manner, by comparing and reviewing the identifying information in the defective block and the information related to the identifying information buried in the file, the original literary work can be distinguished. This judgement is executed by the judge means JD in the system apparatus SYS3.

Flash memory cards FMC may have inborn or acquired defective blocks. There are various methods for identifying defective blocks storing identifying information. For this purpose, it is sufficient that any data for confirming existence of identifying information in the corresponding block, for example. For instance, data "AAh-55h" is previously written in the initial bytes of the leading page of the block, for example. Alternatively, a plurality of pieces of identifying information (one sector or more sectors) may be written, or the identifying information may be stored together with a result of calculation made by using it (for example, parities or checksum). It is sufficient to provide a procedure minimizing the probability that data occasionally existing in an intrinsic defective block happens to coincide with the method for storing the identifying information. If a rule is determined to use from a block nearer to the leader or the end of a chip, for example, a target block will be found earlier. Information to be stored in an apparent defective block is not limited to the above-mentioned identifying information. For example, in case that the system is a music player, it may be designed to include information related to the file name approved to listen to with this media and to prohibit reproduction of the other pieces of music. The essential matter of the present invention lies in intentionally making an area never accessed by general purpose systems and having means for confirming originality of the literary work with reference to data stored in the area.

The above explanation has been made as using the Data Status Area and the Block Status Area. However, the same transaction is possible even in the other areas shown in FIG. 3. It is possible to use a four-byte area currently reserved for a future use under the same concept or to similarly use the Block Status Area. In the Block Status Area, two identical matters are stored in each sector, and in case of a 16-Mbit (2-megabyte) product, 16 Block Status Areas exist in each block. A typical system apparatus refers only to the Block Address Area in the initial or final sector of each block. Therefore, Block Address Areas in intermediate sectors in each block may be used for the same purpose as explained heretofore. The use of the Reserved Area and the Block Address Area is also from the same concept as the method of using the Block Status Area and the Data Status Area from the viewpoint that it is characterized in intentionally making a status partly different from the normally stored status under a standard physical format.

Among areas shown in FIG. 3, areas including "ECC" in their names have not been explained yet. Needless to say, these areas can be used for the same purpose as that of the above-explained examples, but can be also used from another point of view.

In the flash memory card shown in FIG. 1, ECC (error correction code) is used. Details of the ECC system is not explained here because they are not directly relevant to the concept of the invention, but here is used ECC capable of detecting 2-bit errors and correcting 1-bit errors for each sector (precisely, for every 256 bytes divided into two from 1 sector).

Similarly to the discussion made heretofore, here is taken a case where the flash memory card is sold after storing literary works or data is acquired by download from a dedicated download terminal.

Figure 13:
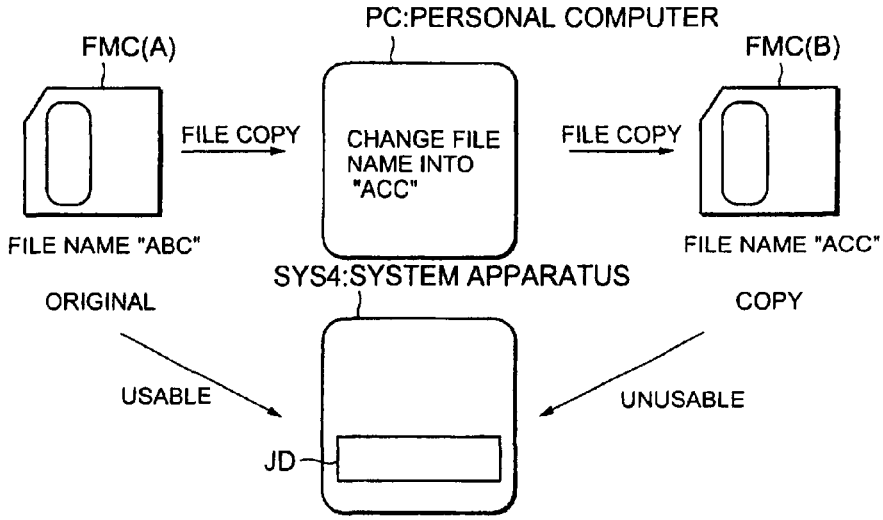
FIG. 13 is a diagram showing a general aspect of the fourth embodiment of the invention.

For example, in a status including an intentionally generated ECC error, a literary work is stored in the f lash memory card FMC. A general aspect of this case if explained with reference to FIG. 13. For simplicity, assume that the status with an ECC error is intentionally produced in the area for storing the file name.

Assume, for example, that the file name stored in the original flash memory card FMC(A) is "ABC". In this case, actual data in the flash memory card FMC(A) is stores as 41h, 42h and 43h. Then, by adjusting the code of ECC in the f lash memory card FMC(A), the status as if including an error in the area storing the file name "ABC" is created. Furthermore, for example, the area storing the file name is adjusted to exhibit "ACC" (41, 43h, 43h) when corrected by the ECC code.

Assume here that the controller, etc. in the system apparatus (music player, for example) already locates the position with intentionally created ECC error. Therefore, the system apparatus considers only the file written with 41h, 42, 43h 43h to be the original literary work. That is, the flash memory card FMC(A) from which "ABC" is read out as the file name is admitted to store the original literary work.

Here, it is possible to transfer the file of the literary work with the file name "ABC" stored in the flash memory card FMC(A) onto the personal computer PC via an adapter card, for example, and also to another flash memory card FMC (B).

In this case, when the file is transferred from the original flash memory card FMC (A) to the personal computer PC, the intentionally created error is automatically corrected by the controller in the adapter card. That is, in this example, the file name changes from "ABC" to "ACC". Therefore, the file name finally transferred to another flash memory card FMC (B) becomes "ACC". When the flash memory card FMC(B) is inserted into the system apparatus SYS4, since the file name is not the expected file name "ABC", the controller in the system apparatus SYS4 can find the file as an unapproved copy.

Judgement of the file name being "ABC" or "ACC is executed by the judge means JD in the system apparatus SYS4.

For simplicity, here is taken the file name as an example. However, since the file name can be readily rewritten by an end user through a personal computer, another area is desirable to use for actual application of the invention if the location with the intentionally created error is previously determined, it is acceptable alternatively, the location for intentionally creating the error is not limited to a single position, but a plurality of positions may be used for this purpose. Location to be marked may be inside the file as well. For example, it may be the DOS file management area, for example. If the file transferred to the personal computer via a general purpose adapter, for example, is copied with any difference from the original file in the start device, the purpose is satisfied.

Although the above example has been explained as intentionally producing a correctable 1-bit error, it may be modified to intentionally generate a correctable error of two or more bits. In this case, if it is attempted to transfer the file to the personal computer by using a general purpose adapter card, etc., the controller in the adapter card detects the non-correctable error, and inform the personal computer of occurrence of the error. Thus, the transfer of the file is interrupted. It results in preventing the file from being copied from the original memory card. Needless to say, location for intentionally generating the 2-bit error as explained above may be chosen as desired. When an error of 3 bits or more is intentionally generated, there arises the possibility that the error is not detected or erroneously corrected. This mechanism may be used.

Fifth Embodiment

Next explained is the fifth embodiment of the memory system according to the invention. In the first to fourth embodiments, consideration has been made, assuming that the flash memory card FMC is stored after storing literary works. In this example, however, it is assumed that the file is acquired by download from the Internet through a personal computer, and the use of existing hardware is essential. Assume a general purpose adapter card, for example. In the case where a file is downloaded onto the hard disc of the personal computer from the Internet and thereafter transferred to the flash memory card FMC via the general purpose adapter, it may occur that the mechanism of copyright protection using the hierarchy of the physical format as employed in the first to fourth embodiments cannot be used. This is because, when the file is transferred to the flash memory card FMC from the personal computer, for example, via the adapter card, the personal computer cannot refer to the CIS field in the flash memory card FMC. Therefore, the operation for acquiring identifying information into the file from the CIS field is disabled.

Figure 14:
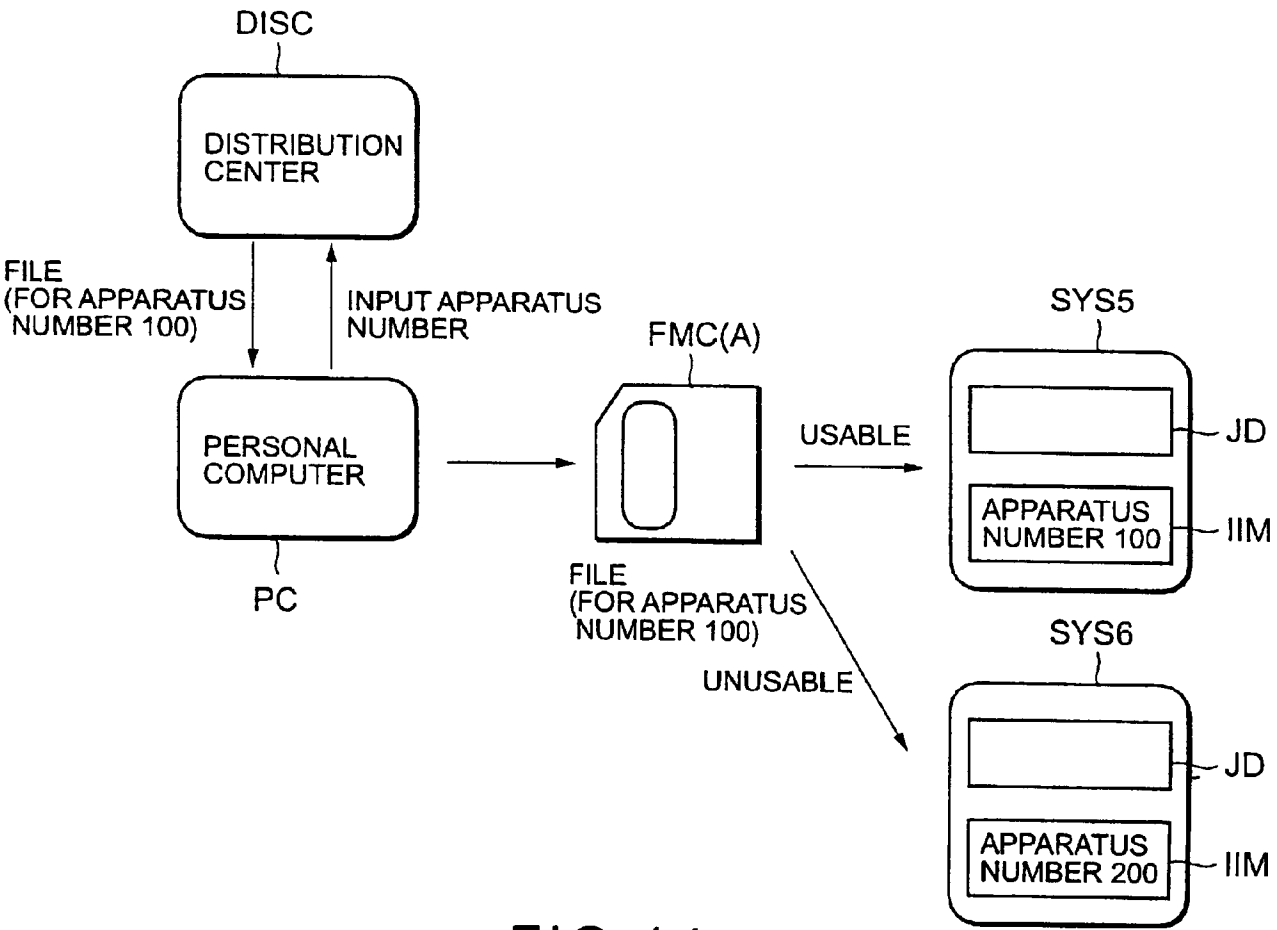
FIG. 14 is a diagram showing a general aspect of the fifth embodiment of the invention.

A general aspect of the mechanism for copyright protection in this download system is shown in FIG. 14. The system apparatuses (for example, musical players) SYS5 and SYS6 are assigned with their information of their own (simply referred to as apparatus number for simplicity in the explanation made below). In the example of FIG. 14, the system apparatus SYS5 is assigned with apparatus number 100 whereas the system apparatus SYS6 is assigned with apparatus number 200.

The apparatus number is preferably identifiable absolutely one by one. However, it is acceptable to decrease the possibility what two system apparatuses have a common apparatus number. And, both serial numbers and random numbers are acceptable, and they may be incorporated into maker's production numbers, for example. There are various ways for assigning apparatus numbers. A method attaching metal plates onto outer shells of system apparatuses or onto their interior portions (for example, portions for loading batteries). Alternatively, they may be displayed on displays of the system apparatuses, guided by voices, or written on their manuals or guarantee documents. That is, it is sufficient to provide any mechanism enabling end users to get aware of the apparatus numbers of their system apparatuses.

The apparatus numbers are also stored in identifying information storage means IIM of the system apparatuses SYS5 and SYS6, and the controllers inside the system apparatuses can freely refer to these identifying information storage means IIM for example, they may be stored on nonvolatile memory inside the controllers, or other nonvolatile memory connected to the controllers via buses. If their backup is held by batteries, then they may be stored on memory such as SRAM, DRAM, etc. Alternatively, they may be stored by mechanical means such as dip switches, etc. It is sufficient for any means corresponding to a controller to refer to through electrical means.

A download method from Internet is explained below using a specific example. As shown in FIG. 14, a web site (WEB) distributing musical pieces forms a distribution center DISC. An end user selects a piece of music he desired to download from the distribution center DISC by operating a personal computer PC, and enters the apparatus number of his own system apparatus (music player). In this example, the apparatus number 100 is entered. After that, the selected piece of music is downloaded onto the hard disc, for example, in his personal computer PC from the distribution center DISC. Upon this download, the apparatus number, or some information closely related to the apparatus number, is also acquired into the file. Needless to say, the service is appropriately charged to the end user by entry of his credit card number, for example.

In the example of FIG. 14, the file with the information related to the apparatus number 100 of the system apparatus SYS5 of the end user's own results in remaining on the hard disc. The end user transfers the file for the apparatus number 100 to the flash memory card FMC(A) by using the general purpose adapter card, for example.

When the flash memory card FMC(A) is inserted into the system apparatus, the system apparatus refers to the storage area of the information related to the apparatus number in the file. If coincidence is confirmed between the apparatus number of the system apparatus and the information related to the apparatus number in the file, the system apparatus considers the file number to be the original file and approves reproduction of the piece of music. If coincidence is not confirmed, it considers it to be an illicitly acquired file, and prohibits reproduction of the piece of music. This judgement is executed in the judge means JD in the system apparatuses SYS5 and SYS6.

In the example of FIG. 14, the file stored in the flash memory card FMC(A) is the file for the apparatus number 100. Therefore, when the flash memory card FMC(A) is inserted into the system apparatus SYS5, the file can be used. However, if the flash memory card FMC(A) is inserted into the system apparatus SYS6 having the apparatus number 200, this file cannot be used.

Therefore, according to the embodiment shown here, a file obtained through the Internet can be used solely in a specific system apparatus. When the above-mentioned flash memory card is inserted in another system apparatus, it cannot be used because its apparatus number does not meet the information in the file. Therefore, distribution of data results in being executed toward a specific system apparatus and not to a specific flash memory card FMC.

Assume here that the file remaining on the hard disc of the personal computer PC to another flash memory card FMC. In this case, the file on the hard disc can be copied in its complete form to other flash memory cards FMC endlessly. However, in the file copied and transferred to the flash memory card FMC, the apparatus number 100 of the original system is introduced to indicate the system in which the file should operate. Therefore, although the file can be copied to flash memory cards FMC without limitation, the use of the flash memory cards FMC is limited to a specific system apparatus. Therefore, this method is also useful to protect copyrights.

In the above-explained embodiment, a certain file can be used solely in a specific system apparatus. However, it may be modified to permit it to be used in a plurality of system apparatuses. Upon the download from the Internet, the above embodiment permits only one apparatus number to be entered. However, at least two apparatus numbers may be allowed to enter. This is useful, considering that a single person may have a plurality of apparatuses.

It is also possible to provide a means, such as management flag, enabling storage of not only apparatus numbers of usable system apparatuses but also apparatus numbers of those prohibited to use. For example, in the case where two system apparatuses are previously registered, but one of them thereafter abandons the right to use the file, procedures to cancel the registration of the system apparatus is enabled.

As means for increasing the number of system apparatuses to be registered as usable ones, a file increasing the number of registered system apparatuses may be transferred from the Internet, or software enabling additional registration of system apparatuses may be solely transferred from the Internet. That is, in a system in which, under the presence of an apparatus number exclusively assigned to a system apparatus and a file to be acquired in a form including information related to the apparatus number, the system apparatus is configured to confirm coincidence of both data to approve or prohibit operations, if the system includes any means permitting changes in number of registered apparatuses, such as addition or cancellation of apparatus numbers, for example, the purpose of the invention is attained.

The above-explained embodiment copes with any change in number of system apparatuses using the file by renewal of system apparatus numbers stored in the file. However, it may be modified to change the apparatus number on the part of the system apparatus. Taking the example of FIG. 14, assume that the end user owns the system apparatus SYS5 having the apparatus number 100 and the system apparatus SYS6 having the apparatus number 200, and he has a number of files obtained by a certain method (for example, from the Internet)

to use them in the system apparatus SYS5 with the apparatus number 100. If the end user want to use these file in the system apparatus SYS6 with the apparatus number 200, a lot of tasks may be required, depending on the number of the files, if it is dealt with by renewal of the apparatus number in these files as explained in the above embodiment.

Such situation can be improved by providing a means capable of changing the apparatus number 200 of the system apparatus SYS6 to the apparatus number 100. That is, when the apparatus numbers of two system apparatuses SYS5 and SYS6 is unified to 100, the files can be commonly used in two system apparatuses.

Various methods are usable as means for changing apparatus numbers of system apparatuses. For example, it may b e realized by operation through input keys of a system apparatus. Alternatively, it is also acceptable to distribute software for changing apparatus numbers from the Internet, then transfer it onto a flash memory card FMC, and execute the software on the system apparatus.

On the other hand, since it is undesirable to permit changes of apparatus numbers without limitation, the software for changing apparatus numbers may be distributed, specifying the original number and the new number of the system apparatus to be changed. It is also possible to not only simply permit changes of apparatus numbers but also permit a single system apparatus to have a plurality of apparatus numbers. For example, in the example of FIG. 14, if the system apparatus SYS5 having the apparatus number 100 is authorized to have the apparatus number 200 as well, it will use the files heretofore usable solely in the system apparatus SYS6 having the apparatus number 200 in addition to the files heretofore usable in the system apparatus numbered 100.

In this manner, the subject matter of the embodiment shown here lies in enabling renewal of apparatus number information, etc. exclusive to a system apparatus together by changing it, adding another or deleting it, for example. Further, it is another feature of the embodiment that a single system apparatus may have a plurality of apparatus numbers instead of being fixed to only one apparatus number. Change of the apparatus number may be done in the manufacturing process of the system apparatus or on the market for sale. For example, a new system apparatus is to be purchased to replace a malfunctioning system apparatus heretofore owned, it is useful to provide a system with which a user may send the old system apparatus to the manufacturer or seller side and purchase a new system apparatus having the same apparatus number. Also when a new system apparatus is additionally purchased, the system may provide a means for evidencing that the old system is currently owned, and enable the user to purchase the new system apparatus with the same apparatus number as that of the old system apparatus.

Furthermore, as already explained with reference to FIG. 9A, it is sufficient for the apparatus number in the file to be related to the apparatus number in the CIS field in any sense. For example, a cipher key may be made on the basis of the apparatus number stored in the CIS field so that the cipher file can be deciphered by using the cipher key.

When the cipher file is deciphered by using the apparatus number in the CIS field in this manner, it means that the apparatus number in the CIS field coincides with the apparatus number in the file. That is, consistency or inconsistency between the apparatus number in the CIS field and the information related to the apparatus number in the file may be expressed as the cipher file being normally deciphered or not.

Sixth Embodiment

Next explained is the sixth embodiment of the memory system according to the invention. The first to fifth embodiments are configured to individually distinguish flash memory cards FMC and system apparatuses. This embodiment, however, is configured to distinguish individual users.

For simplicity, taking birth days of individuals as an example for explanation. Personal identifying information for identifying individuals is not limited to birth days. It may be any of names, arbitrarily selected passwords, credit card numbers, social security numbers, and so forth, and information need not be different by 100% among different individuals. It is sufficient for information of an individual to be different from those of other individuals with a certain probability. Here is taken a case where an end user having purchased a system apparatus (here is taken a music player as an example) buys a musical file from the Internet.

Figure 14A:
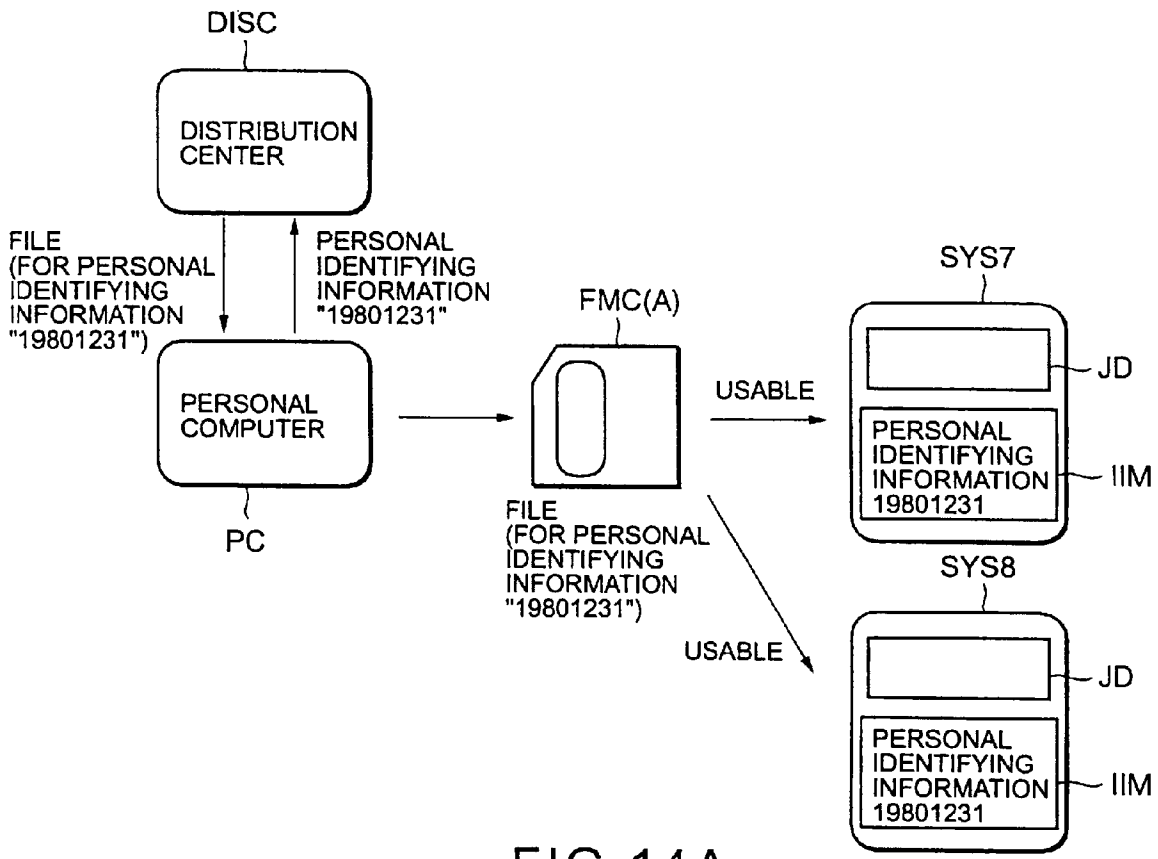
FIG. 14A is a diagram showing a general aspect of the sixth embodiment of the invention.

As shown in FIG. 14A, the identifying information storage means IIM of the system apparatus SYS7 has the personal identifying information therein. If the birth day of the end user is Dec. 31, 1980, the personal identifying information is "19801231". The personal identifying information may be acquired in any desired way. When the end user buys the system apparatus in a shop, the seller may set it, or the end user may set it after the purchase.

When the end user purchases a file from the Internet, he gives his designated personal identifying information. That is, the end user transmits his personal identifying information "19801231" from his personal computer PC to the distribution center DISC on the Internet. The distribution center DISC transmits information concerning a musical literary work adding the personal identifying information "19801231" or other information related to it to the personal computer PC. As a result, a file for the individual is downloaded in the hard disc of the personal computer PC.

The end user transfers the file on the hard disc to the flash memory card FMC(A). As a result, a personal file for music including the personal identifying information "19801231" is stored in the flash memory card FMC(A).

If the flash memory card FMC (A) is inserted into the system apparatus SYS7, the system apparatus SYS7 compares the personal identifying information "19801231" held on the system apparatus SYS7 with the personal identifying information introduced into file, and only upon confirmation their consistency, reproduction of the music in the file is approved. This judgement is executed by the judge means JD in the system apparatus SYS7.

A feature of the embodiment lies in that, by acquiring personal identifying information into files, an end user having a plurality of system apparatuses, for example, can commonly use a single file in all his apparatuses. In the example of FIG. 14A, the flash memory card FMC(A) storing a file for the personal identifying information "19801231? can be used commonly in both the system apparatus SYS7 and the system apparatus SYS8.

The embodiment shown here is very convenient, when considering the case where the end user purchases an additional system apparatus, or one of some apparatuses of his own malfunctions. The same also applies to the case where personal names are used instead of birth days. Files can be freely copied from a hard disc to a plurality of flash memory cards FMC. However, their reproduction is not possible in system apparatuses other than those of the individual who purchased the files. If another individual has the identical birth day or name, he can use them, but its probability is very low. Needless to say, the probability is actually reduced to zero if different kinds of personal identifying information are combined (birthday and name), and the copyright can be protected more reliably. Personal identifying information on an apparatus and that in a file are preferably allowed to be added, changed and deleted. Thus, an individual changed in name by marriage, for example, can continue to be use them, or an assignee of the right can use them subsequently.

Furthermore, as already explained with reference to FIG. 9A, it is sufficient for the personal identifying information in the file to be related to the personal identifying information in the CIS field in any sense. For example, a cipher key may be made on the basis of the personal identifying information stored in the CIS field so that the cipher file can be deciphered by using the cipher key.

When the cipher file is deciphered by using the personal identifying information in the CIS field in this manner, it means that the personal identifying information in the CIS field coincides with the personal identifying information in the file. That is, consistency or inconsistency between the personal identifying information in the CIS field and the information related to the personal identifying information in the file may be expressed as the cipher file being normally deciphered or not.

Seventh Embodiment

Next explained is the seventh embodiment of the memory system according to the invention as a method for further increasing the security. The foregoing embodiments are directed to methods for copyright protection, taking ordinary end users as the target. The embodiment shown here, however, is in the standpoint of preventing a mala fide third party from executing malpractice.

For example, electric interface specifications of flash memory cards FMC are opened to public via information on the Internet, for example. Therefore, it is not technically impossible to create a special tool for making a faithful dead copy of data in a certain flash memory card onto another flash memory card FMC in the unit of byte as an assembly of binary data instead of copying data in the flash memory card FMC in the unit of file. In this case, a flash memory card FMC having absolutely the same series of data as that of an original flash memory card can be made, and it is difficult for the system apparatus to distinguish them. This embodiment has been made in view of this problem, and proposes a countermeasure against such dead-copy operations.

The subject matter of this embodiment lies in putting identifying information for identifying individual flash memory cards FMC in a special field impossible to access with publicly opened information, or a special field impossible to freely rewrite data therein even if accessed, in the field of each flash memory card FMC, and also putting similar identifying information in files or introducing information related to such identifying information, and having a system apparatus confirm consistency or inconsistency between them.

Figure 14B:
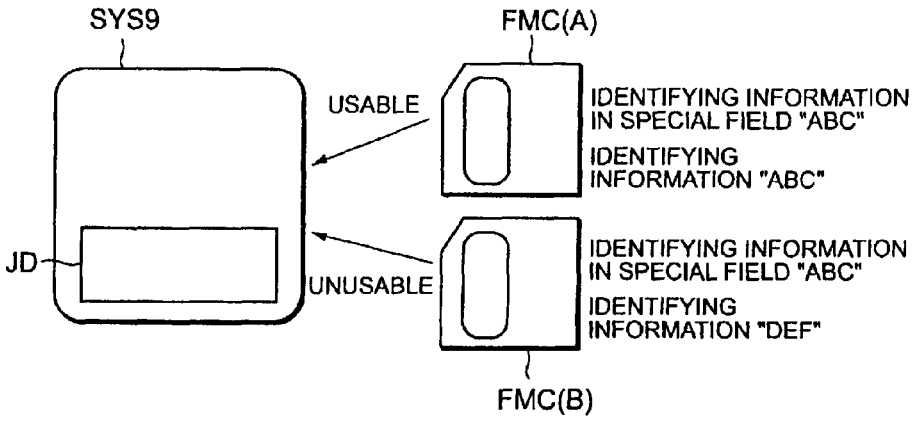
FIG. 14B is a diagram showing a general aspect of the seventh embodiment of the invention.

With reference to FIG. 14B, an example is explained. Identifying information "ABC" is stored in a special field impossible for the end user of the flash memory card FMC(A) to access or to rewrite data freely therein. In a file stored in an ordinary field of the flash memory card FMC (A), "ABC" is stored as identifying information of the file. The system apparatus SYS9 to which the flash memory card FMC(A) is inserted reads the identifying information "ABC" in the special field and the identifying information "ABC" in the file. Since they coincide, the system apparatus SYS9 approves the use of the file.

In contrast, in a special field impossible for the end user of the flash memory card FMC(B) to access or impossible to rewrite data freely therein, identifying information "ABC" is stored. In a file stored in an ordinary field of the flash memory card FMC(B), "DEF" is stored as identifying information of the file. The system apparatus SYS9 to which the flash memory card FMC(A) is inserted reads the identifying information "ABC" in the special field and the identifying information "DEF" in the file. Since they do not coincide, the system apparatus SYS9 does not approve the use of the file.

Judgement of consistency or inconsistency between the identifying information stored in the special field of he flash memory card FMC and the identifying information in the file is executed by the judge means JD in the system apparatus SYS9.

Next explained is an example of the special field in the flash memory card FMC, which is impossible for an end user to access or impossible to freely rewrite data therein. For example, nonvolatile semiconductor memory devices involving the flash memory card FMC shown in FIG. 1 have an operation mode usually called ID read this mode is the mode for externally notifying the manufacturer, type, capacity, electrical specification, etc. of the memory. In the flash memory card FMC shown in FIG. 1, for example, ID read is executed in the process shown in FIG. 15.

Figure 15:
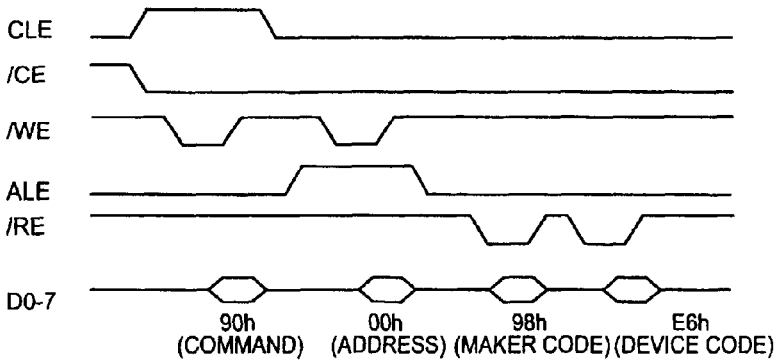
FIG. 15 is a diagram showing signal waveforms appearing in an ID read mode of a conventional flash memory card.

As shown in FIG. 15, an ID read command (90h here) and an address (00h here) are entered into the flash memory card FMC. Then, a code indicating its manufacturer (maker code) and a device code indicating the type of the memory are output sequentially from the flash memory card FMC.

In case of a 64-Mbit flash memory card manufactured by Toshiba, for example, "JEDIC ID 98h" is output as the first byte, and the device code E6h indicating the product being NAND flash memory of 64 megabits for the operation power 3.3V is output as the second byte. If the memory is one for 64 megabits but mask ROM instead flash memory, D6h is output as the device code. The system apparatus reads these pieces of information and performs control appropriate for the device specification.

Figure 16:
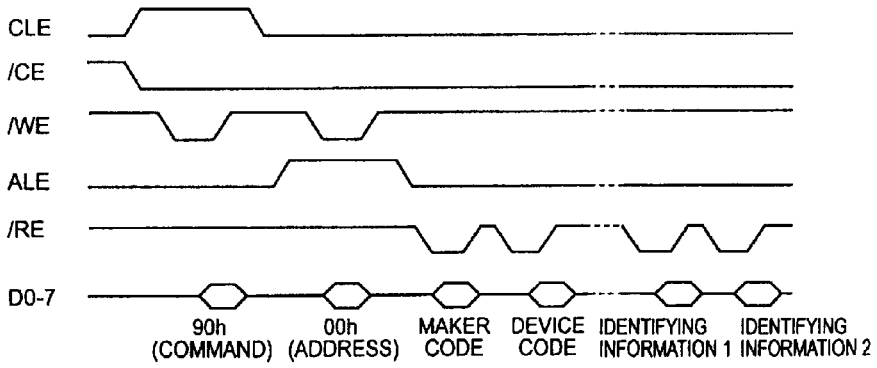
FIG. 16 is a diagram showing signal waveforms appearing in an ID read mode of a c flash memory card according to the seventh embodiment of the invention.

In the present invention, this ID read operation is extended. That is, as shown in FIG. 16, identifying information exclusively assigned to the flash memory card FMC is output subsequently to outputs necessary for the conventional ID read operation. It may be freely selected from which byte the output of the identifying information starts and to which byte it continues.

In order to reliably distinguish flash memory card products supporting this function from conventional flash memory card products, any material indicating that the product has such support may be output (data such as AAh having a slight probability of occasional existence of the same data on the bus) prior to the output of identifying information.

As already explained, the identifying information need not be unique to each of all flash memory cards FMC (needless to say, preferably unique). For example, if the identifying information is made up of one byte, there are 256 possible values from 00h to FFh. Therefore, flash memory cards can be classified into 256 groups. In this case as well, the probability that two different end users have flash memory cards FMC having common identifying information is considered sufficiently low.

Figure 17:
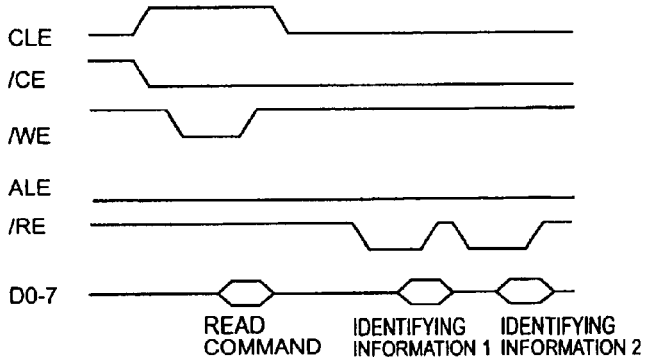
FIG. 17 is a diagram showing signal waveforms appearing in an ID read mode of a c flash memory card according to the seventh embodiment of the invention.

In the embodiment explained above, the existing ID read command is utilized. However, a new identifying information read command may be determined independently. This provides higher security than the use of the ID read command the method to access to which is disclosed. A general aspect of this scheme is shown in FIG. 17. Here is shown the case where the command of one cycle is set as the identifying information read command. However, it may be modified to request entry of the command of a plurality of cycles.

There are various ways of determining the identifying information. First shown is a method which determines it in the manufacturing process of the flash memory card FMC. The preset value may be determined to substantially fully identifying all cards one by one such as through numbers, or by generating random numbers. Additionally, it may be determined for each wafer or each chip. If the value is determined to ensure a memory card to have different identifying information from other memory cards with a certain probability, any mode of determination of such values fully meets the subject matter of the invention. It may be determined by a maker of a literary work who sells the flash memory card FMC with storage of the literary work, for example, instead of the manufacturer of the flash memory card FMC itself.

Figure 18:
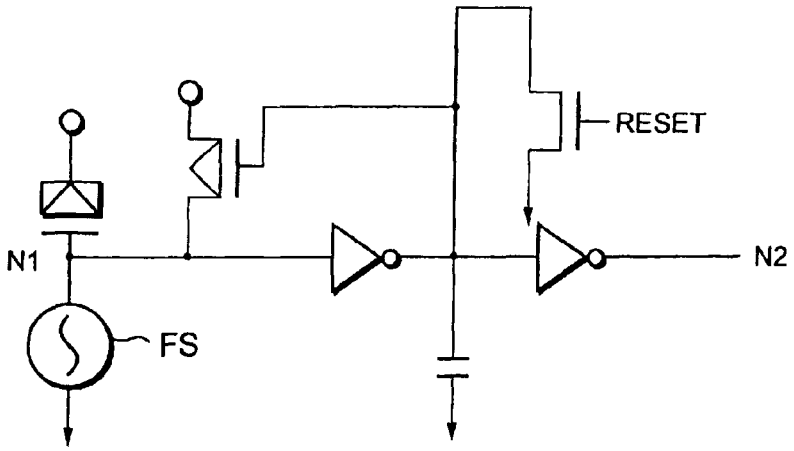
FIG. 18 is a circuit diagram showing a fuse circuit mounted into a flash memory card.

Additionally, there are various modes of writing identifying information. First shown is a method which writes it in the process of the flash memory card FMC. As shown in FIG. 18, for example, there is the method using a fuse FS. FIG. 18 is a diagram showing an arrangement of a state holding circuit.

In the state holding circuit, there is a difference in value held upon power-ON between the state with the fuse FS cut and the state maintaining it uncut. By preparing at least one state holding circuit, it is determined to cut the fuse FS or not, depending upon the preset identifying information. For example, when an identifying information read command is entered, the value held in the state holding circuit is externally output through an output buffer.

There are various means usable as the fuse FS, such as those burned and cut by a laser, electric wiring thermally cut by supplying a current, those made up of nonvolatile memory like EEPROM and functioning similarly to electric fuses, and so on. It is also possible to provide a chip as a bonding option in the assembling process. By preparing a pad for connecting a metal wire on a chip, the holding value may be changed, depending upon whether the pad is electrically connected to VCC or GRD.

Alternatively, the change of the holding value may be attained by selectively using masks of a wiring layer used in the manufacturing process. For example, if different kinds of masks are selectively used in a process close to the final manufacturing process for making an aluminum wiring layer, a certain variety of identifying information can be set.

Alternatively, the purpose is attained by setting mechanically to a certain extent to bury a small-type dip switch. It is also possible to provide another nonvolatile memory holding identifying information in addition to the flash memory card so that the value of the identifying information be obtained by the additional nonvolatile memory. That is, some IC or part to be used for protecting the copyright may be mounted inside the flash memory card simultaneously with the flash memory. The purpose is attained only if individual identifying information in each memory card by some means in the manufacturing process.

The identifying information may be set to permit rewrite thereof later by cutting the electrical fuse, for example, or may be configured to permit rewrite thereof later by using EEPROM, for example instead of a fuse. In the case permitting rewrite thereof, by providing a means disabling rewrite thereof after a certain point of time, such as a mode disabling rewrite thereof after the electric fuse is cut, for example, a wider compatibility is ensured.

Furthermore, as already explained with reference to FIG. 9A, it is sufficient for the identifying information in the file to be related to the identifying information in a special field in any sense. For example, a cipher key may be made on the basis of the identifying information stored in the special field of the flash memory card FMC so that the cipher file can be deciphered by using the cipher key.

When the cipher file is deciphered by using the identifying information in the special field in this manner, it means that the identifying information in the special field coincides with the identifying information in the file. That is, consistency or inconsistency between the identifying information in the special field and the information related to the identifying information in the file may be expressed as the cipher file being normally deciphered or not.

Eighth Embodiment

As an embodiment derived from the seventh embodiment, the eight embodiment of the memory system according to the invention is explained below. Unlike the seventh embodiment, the subject matter of the eighth embodiment lies in preparing a memory space in the flash memory separately from the field used by the user, and storing individual identical information of the flash memory card in the memory space.

In case of 64-Mbit memory, for example, the memory space of 64 megabits is reserved for use by the user. However, by providing another memory space in addition to the 64-Mbit memory space, and identifying information is held therein. Needless to say, the redundant memory space can be accessed to by a method different from the method for accessing to the ordinary memory space of 64 megabits.

Figure 19:
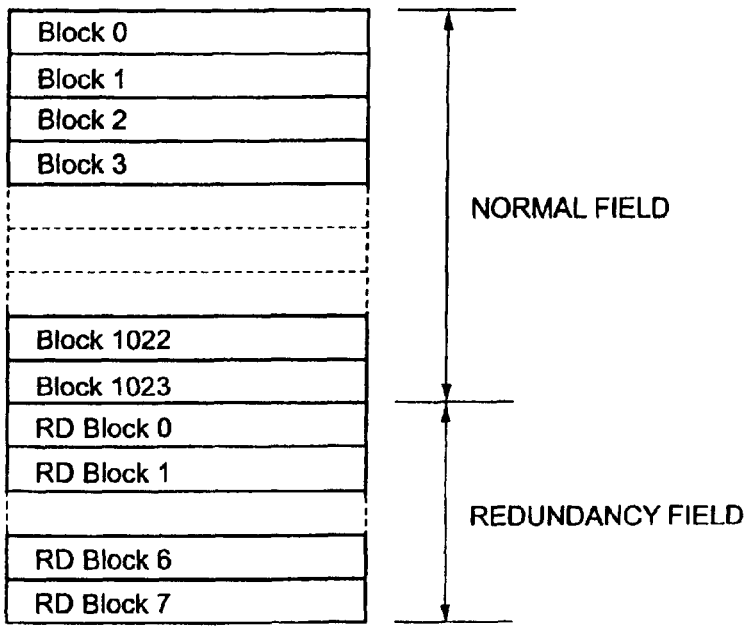
FIG. 19 is a diagram showing the structure of a physical block of a flash memory card according to the eighth embodiment of the invention.

FIG. 19 shows a general aspect of physical memory blocks of the flash memory card FMC. In case of 64-megabit flash memory, for example, the memory cell array is divided into 1024 memory blocks (unit of erasure) Block 0 through Block 1023 each of 64 kilobits. In addition to these 1024 blocks, eight redundancy blocks RDBlock 0 through RDBlock 7, for example, are prepared. These redundancy blocks RDBlock 0 through RDBlock 7 may be prepared by commonly using blocks prepared for exchange of blocks when any defective block is found in the manufacturing process as already known, or may be prepared separately.

A special command for accessing to these redundancy blocks RDBlock 0 through RDBlock 7 (hereinafter called redundancy block access command) is prepared. In these redundancy blocks RDBlock 0 through RDBlock 7, identifying information for identifying individual flash memory cards FMC is written. As explained in the embodiment 7, there is room for free choice regarding which stage is selected for writing the identifying information.

For example, let a case be taken where identifying information is written in any of the redundancy blocks RDBlock 0 through RDBlock 7 in the manufacturing process, and the flash memory card FMC is sold after storing a literary work. When the literary work is written into the flash memory card FM, a write tool read out the identifying information from the redundancy block RDBlock by the redundancy block access command.

After that, the read-out identifying information or information related to the identifying information is taken into the file of the literary work, and written as a file in the flash memory card FMC. The system apparatus compares the identifying information of the flash memory card FMC written in the redundancy block RDBlock with the identifying information taken into the file, and approves the use on the system apparatus when predetermined conditions are satisfied.

Under the situation where the file is transferred from a certain flash memory card FMC to another flash memory card FMC, if a user tries to activate it on another system apparatus, since the identifying information written in the redundancy block RDBlock of the flash memory card FMC as the destination of the copy file does not coincide with the identifying information of the flash memory card FMC taken into the copied file, it cannot be used. Thus, the copyright of the literary work can be protected.

There are various modes of identifying information of the flash memory card FMC written into the redundancy blocks RDBlock 0 through RDBlock 7 as already explained in the foregoing embodiments. The identifying information of the flash memory card FMC may be simply stored, or a plurality of pieces thereof may be stored so that they are compared when actually used. Alternatively, additional information may be attached for use to judge adequacy of the identifying information. For example, it is possible to store it together with a result of calculation of parities, or to store it together with a code for error correction to enable error correction when any error occurs. Alternatively, the identifying information may be stored together with its complement (for example, complement 55h in case of identifying information AAh).

Moreover, it is also acceptable to enable direct application of the ECC system used for storing an actual file in the flash memory card FMC shown in FIG. 1. If one block is made up of 16 pages for example, in the flash memory card FMC shown in FIG. 1, then the identifying information may be stored in a plurality of pages, or it may be stored in a plurality of blocks.

Furthermore, the identifying information may be stored together with information for confirming storage of identifying information in the redundancy block RDBlock (for example, a row of one or more predetermined letters) and/or management data such as flags which indicate whether the corresponding redundancy blocks RDBlock are electrically normal or include a defective block. For example, if two-block space is prepared as the field for storing the identifying information (priority may be provided), even if one of them is defective, the production yield is not reduced. In this case, the system apparatus judges from the state of management flag whether they are normal redundancy blocks RDBlock, and thereafter, while judging from the presence of absence of the predetermined row of letters whether the identifying information is stored or not, it acquires the identifying information. If the first accessed redundancy block RDBlock is defective, the next redundancy block RDBlock is accessed of course. Although there are other various methods, as set forth in the seventh embodiment, only if unique identifying information of an individual flash memory card FMC is stored in a field difficult for a user to access, it meets the subject matter of the invention.

Furthermore, as already explained with reference to FIG. 9A, it is sufficient for the identifying information in the file to be related to the identifying information in a redundancy block RDBlock in any sense. For example, a cipher key may be made on the basis of the identifying information stored in the redundancy block RDBlock of the flash memory card FMC so that the cipher file can be deciphered by using the cipher key.

When the cipher file is deciphered by using the identifying information in the redundancy block RDBlock in this manner, it means that the identifying information in the redundancy block RDBlock coincides with the identifying information in the file. That is, consistency or inconsistency between the identifying information in the redundancy block RDBlock and the information related to the identifying information in the file may be expressed as the cipher file being normally deciphered or not.

Ninth Embodiment

Next explained is the ninth embodiment of the memory system according to the invention, based on and reinforced from the eighth embodiment. In the eighth embodiment, since no method for prohibiting rewrite of the identifying information is explicitly shown, there is the possibility that an illicit tool for rewriting data of the field is made if by any possibility the method for accessing to the redundancy block leaks out. The embodiment shown here adds a transaction for prohibiting rewrite of the identifying information to the method disclosed as the eighth embodiment.

Figures 20A, 20B:
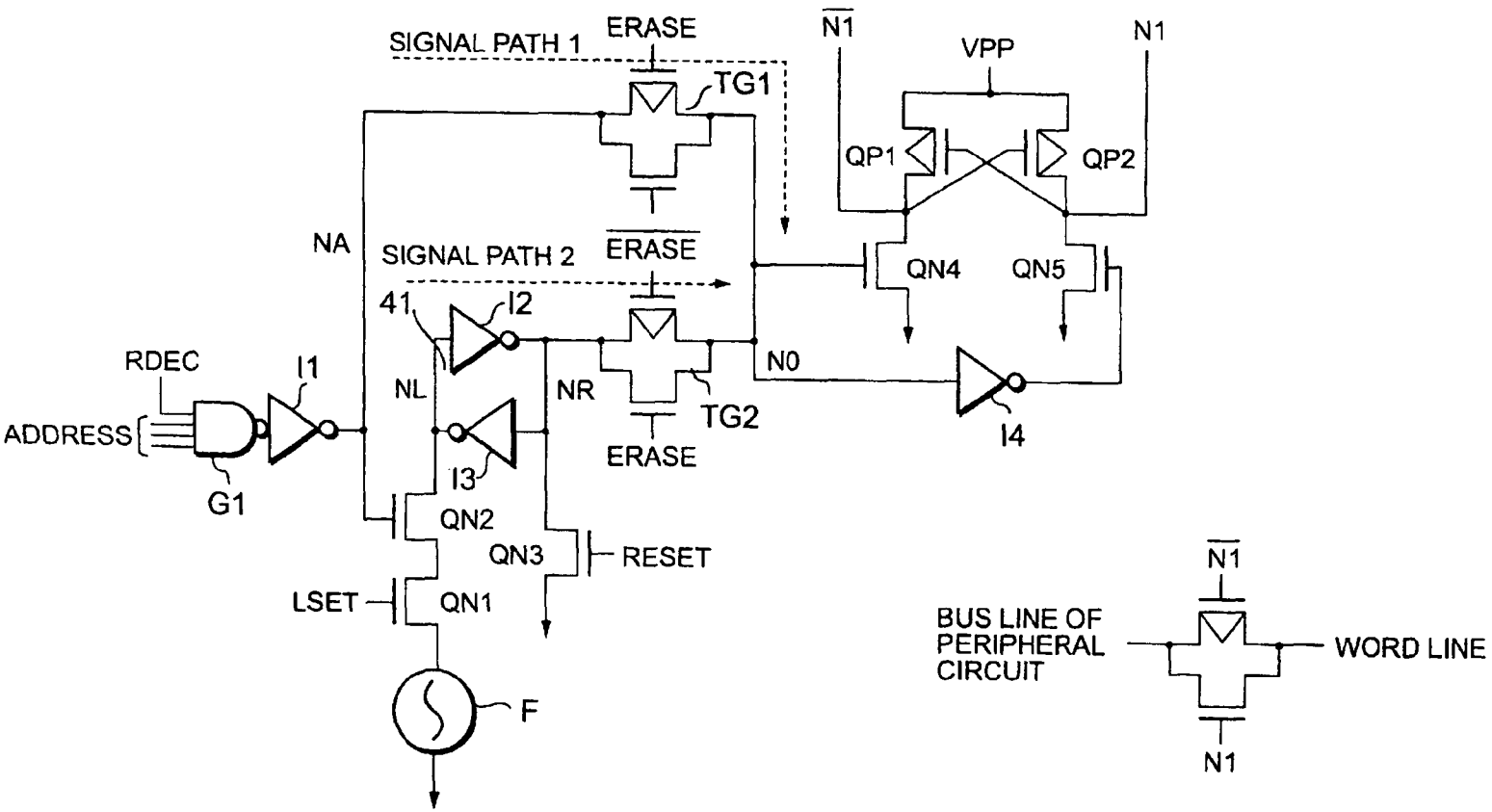
FIG. 20A is a diagram showing a row decoder circuit of flash memory according to the invention.
FIG. 20B is a diagram showing a transfer gate circuit connecting a bus line of peripheral circuits and a word line.

Referring again to FIG. 19, a specific example is explained. In case of 64-Mbit flash memory card FMC, for example, its memory cell array is divided into 1024 blocks (unit of erasure) Block 0 through Block 1023 each of 64 kilobits. In addition to these 1024 blocks, eight redundancy blocks RDBlock 0 through RDBlock 7, for example, are prepared. In each of these redundancy blocks RDBlock 0 through RDBlock 7, a row decoder circuit as shown in FIG. 20A is provided. Explanation is made on functions of the row decoder circuit.

The row decoder circuit takes the role of selecting a block according to an address input into the chip and transferring a voltage generated in the peripheral circuit to a word line, for example. These operations are typically performed in any of data write, data erasure and data read operations. Next explained are operations of the row decoder circuit with reference to FIG. 20A.

Signal RDEC is the start signal of the row decoder circuit, and becomes "H" for write, erase and read operations. Signal ADDRESS is a block address. Solely in a block whose address is selected, all of a plurality of address signals become "H", and nodes NA also become "H".

For write operation and read operation, signal ERASE becomes "L", signal /ERASE becomes "H", and a signal is transmitted to node NO through "signal path 2". That is, node NO becomes "H" in the selected block, but becomes "L" in the other blocks. Then, in the selected block, node N1=VPP (high voltage for realizing write, erase and read operations, for example), and node /N1=0V. As a result, the voltage on the bus line of the peripheral circuit shown in FIG. 20B travels to the word line, and data write or read operation is executed.

On the other hand, in any unselected block, node N1=0V, node /N1=VPP, and the bus line of the peripheral circuit shown in FIG. 20B and the work line are disconnected.

Next explained are detailed operations during erase operation. Before erase operation is started, since signal RESET is in the "H" level, nodes N1 and Nr are in the "H" and "L" levels, respectively. When erase operation is started, signal RESET changes to "H", address signal ADDRESS is set according to the address input to the chip, and signal LEST becomes "H" for a certain period of time. In the selected block, since node NA is "H", if the fuse F is in the connected status, node NL is connected to 0V via the fuse F, and nodes NL and NR become "L" and "H", respectively. In a block with the fuse F in the disconnected status, regardless of the block being selected or not, nodes NL and NR maintains "J" and "L", respectively. Subsequently, signal ERASE becomes "H", signal /ERASE becomes "L", and the signal travels to node NO through "signal path 2". That is, the voltage of the node NR propagates to the node NO, and erase of data is executed only in blocks where the node NR is in the "H" level.

As apparent from the foregoing explanation, the row decoder circuit in FIG. 20A does select or not select blocks for data write or read operation by directly using the address signal, and does select or not select blocks for data erase operation by using a latch circuit 41 in the row decoder circuit. That is, it uses the latch circuit 41 made up of inverters I1 and I2. Therefore, by using the circuit in FIG. 20A, in blocks with the fuse F being cut, data write and read operations are enabled, and data erase operation is disabled.

When the row decoder is used, control operations are executed as follows. For example, a command for accessing to a redundancy block RDBlock is prepared. Then, identifying information exclusive to the flash memory card FMC is written in the redundancy block RDBlock. It has already been explained in the eighth embodiment, etc. that various methods are usable regarding the format for writing identifying information. In this example, the fuse F is cut after the identifying information is written. As already set forth, the fuse F may be a lasercut fuse, electric fuse, EEPROM, etc. Once the fuse F is cut, write and read operations are enabled, but erase operation is prohibited, as explained before. Therefore, even if the method for accessing to the corresponding redundancy block RDBlock leaks, information stored in the corresponding redundancy block RDBlock cannot be rewritten freely.

However, this embodiment does not prohibit write operation to the redundancy block RDBlock. Therefore, additional write operation is possible. Although the flash memory in the instant embodiment can be rewritten from data "1" to "0" without erase operation, rewrite of data "0" to "1" is not possible. Therefore, when the identifying information is stored in the flash memory card FMC, its complement may be written simultaneously in addition to the identifying information so that the identifying information in the redundancy block cannot be changed to other identifying information even when the method for access is known.

Figures 21A, 21B, 22:
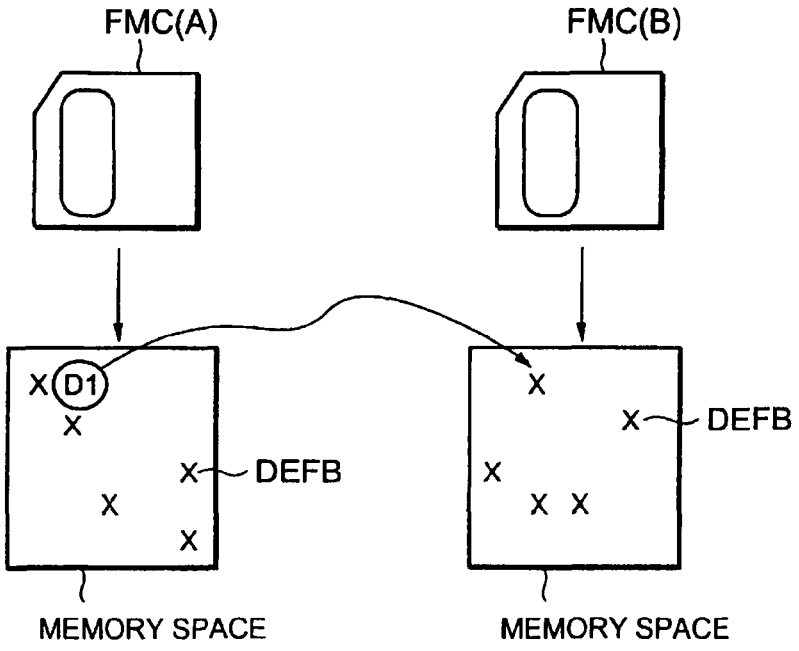
FIG. 21A is a diagram showing identifying information and complement information in a redundancy block in the ninth embodiment of the invention (before being changed)
FIG. 21B is a diagram showing identifying information and complement information in a redundancy block in the ninth embodiment of the invention (after being changed)
FIG. 22 is a diagram showing a memory space of flash memory with defective bits randomly generated, in the tenth embodiment of the invention.

That is, if "AAh=10101010" has been stored as the identifying information in the redundancy block RDBlock, for example, as shown in FIG. 21A, "55h=01010101" is also stored as complement information of the identifying information. As shown in FIG. 21B, it is possible to change "1" to "0" by illicit operation. Therefore, it is possible to change the identifying information to "2Ah=00101010", for example, by rewriting "1" of the most significant bit to "0". However, the complement information of the identifying information stored in the redundancy block RDBlock cannot be corrected properly. That is, although the complement information of the identifying information is "55H=01010101", it cannot be changed to "D5=11010101" because "0" cannot be changed "1" in the redundancy block RDBlock as explained above. That is, even if anyone could rewrite the identifying information to "2Ah=00101010" by additionally rewriting the most significant bit of AAh in the identifying information written in the redundancy block RDBlock, he cannot rewrite the field for storing its complement information to D5h=11010101".

By storing identifying information and its complement information together in the redundancy block RDBlock in this manner, illicit additional writing is disabled, and even if the method for accessing to the corresponding redundancy block RDBlock and the method for additional writing are known, meaningful data rewrite operation to the corresponding redundancy block RDBlock field is not possible.

Therefore, in the system apparatus configured to restrict operations of the file on the system by comparing identifying information written in the redundancy block RDBlock for identifying individual flash memory cards with the identifying information or its related information acquired in the file, even if someone could copy the file onto another flash memory card FMC, since the flash memory card FMC as the destination of the transfer also has the field for similarly storing identifying information and rewrite of the identifying information is similarly restricted, the identifying information does not coincides with the information in the file. Therefore, he cannot use the file on the system apparatus, and the copyright of the literary work is protected.

In the case where the identifying information is written in the field of a redundancy block RDBlock when a manufacture stores a literary work after shipment of the flash memory card FMC, after the identifying information is stored in the redundancy block RDBlock, the fuse F is electrically cut, if an electrical fuse, to prohibit later illicit rewrite of the identifying information.

Although only erase operation is prohibited here, write operation itself of the field may be prohibited by similar means. Means for prohibiting erasure and writing is not limited to a fuse near the row decoder. It is acceptable to employ means for prohibiting operations of a circuit for generating a high voltage required for write and erase operations when the field is accessed. Any such means may be employable as desired.

Only if one or both of erase operation and write operation of the field is prohibited by some means after storage of the identifying information, it will satisfy the subject matter of the invention. It is also acceptable to provide a means again enabling erase and write operations through a complicated procedure after these erase or write operation is once prohibited.

The embodiment explained above is configured to store the identifying information of the flash memory card FMC in the redundancy block RDBlock. However, the invention is not limited thereto. It may be stored in an ordinary memory space field other than the redundancy blocks RDBlock. In the flash memory card FMC, registration of any defective block in unit of each block is possible as explained before the system may be configured to prevent illicit rewrite of identifying information by cutting a fuse or by other appropriate means, after defining a certain block as the block for storing the identifying information and then actually writing the identifying information there. In order to prevent an ordinary system from trying to use this block as the ordinary data storage field, in addition to storage of information related to the identifying information, Block Status Area of the block may be marked to register it as a defective block. As already explained, also in these cases, information enabling to confirm that the identifying information is certainly stored may be also stored together.

When using this method, since dead copy of data from a certain flash memory card FMC to other media should be prevented, by writing the identifying information on all flash memory cards FMC upon shipment and also cutting the fuse, later erase operation, write operation or both may be prohibited. Therefore, only if the identifying information is stored in an ordinary memory space, and some means is provided to prohibit later erase operation, write operation or these both of this field, it will satisfy the subject matter of the invention.

For simplicity, the foregoing first to ninth embodiment have been simply explained as the identifying information of the flash memory card FMC being its identifying number. However, it is not limited only to the identifying number of the flash memory card FMC, but may be any information directly identifying the literary work (for example, in case of a musical file, such as seller, singer, composer, songwriter, manufacturer, recor[0084] maker, album name, music title, etc. which need not be directly related to distinctiveness of the memory card itself).

Furthermore, as already explained with reference to FIG. 9A, it is sufficient for the identifying information in the file to be related to the identifying information in a redundancy block RDBlock in any sense. For example, a cipher key may be made on the basis of the identifying information stored in the redundancy block RDBlock of the flash memory card FMC so that the cipher file can be deciphered by using the cipher key.

When the cipher file is deciphered by using the identifying information in the redundancy block RDBlock in this manner, it means that the identifying information in the redundancy block RDBlock coincides with the identifying information in the file. That is, consistency or inconsistency between the identifying information in the redundancy block RDBlock and the information related to the identifying information in the file may be expressed as the cipher file being normally deciphered or not.

Tenth Embodiment

Next explained is the tenth embodiment of the memory system according to the invention. This embodiment is directed to a defending function against a tool for making a dead copy of data between a plurality of flash memory cards FMC.

Here are made defective bits inside the flash memory FM of the flash memory card FMC in a randomly appropriate frequency. That is, each flash memory has a defective bit different from others. In the example of FIG. 22, the position of the defective bit DEFB in the memory space in the flash memory FM in the flash memory card FMC(A) and the position of the defective bit DEFB in the memory space in the flash memory FM of the flash memory card FMC(B) are different. In this manner, among a plurality of flash memory cards FMC, their defective bits are different in location.

Even if anyone having such a flash memory card FMC tries to read out data from the original flash memory card FMC and make a dead copy onto the destination flash memory card FMC in order to copy the content of the nonvolatile flash memory FM as a recording medium, because the defective bit exists in the flash memory FM in the destination flash memory card FMC, the data is not written properly there. That is, in the example of FIG. 22, if he tries to make a dead copy of the bit data D1 of the flash memory card FMC(A) onto the flash memory card FMC(B), since the bit position of the memory space is the defective bit DEFB, he cannot copy it. Therefore, he cannot make the dead copy properly, and the illicit data copy results in a failure.

Any of an inborn defective bit and an intentionally located defective bit may be used as the defective bit DEFB, and both promise the same effect. Further, the defect need not be a bit effect, and the same effect is expected with nonvolatile memory having inborn or intentionally created row defects, column defects, block defects or their combination.

As means for intentionally creating defective bits, row defects, column defects or block defects, cell transistors, row decoders, column decoders or block decoders may be broken by laser irradiation. It is also possible to provide a poly silicon fuse or an electric fuse between a cell, row, column or block and its decoder and to fuse it by a laser or an overcurrent. Furthermore, by providing cells in nonvolatile memory such as one time PROM and by writing some material in the cells, any one of the above-mentioned defects or any combination of them may be created intentionally. Thus, such defects can be intentionally made by various ways not departing from the concept of the invention.

By using the technique explained in the eighth or ninth embodiment, one or both of erase operation and write operation may be prohibited. When erase operation is prohibited solely, if "0" data is written previously in the field, data cannot be copied, and the same effects are obtained. If the system has some means which makes an attempt to make a dead copy of data be compelled to result in a failure, it will meet the concept of the invention.

Eleventh Embodiment

Next explained is the eleventh embodiment of the memory system according to the invention.

Although various modes of contrivance for protecting copyrights have been explained in the first to tenth embodiments, it is also possible to enable discrimination between memory cards including the function of copyright protection and other cards having no such function. There are various modes of discrimination. For example, written notice or logo applied onto an outer surface of a memory card to demonstrate that it has a function of copyright protection is also usable for this purpose. Alternatively, by making some rule on colors or patterns, they may be used to demonstrate that it has the function of copyright protection. Also, such notice may given by the product name or the model number of the product. It is also acceptable to give message on a display, for example, when the system apparatus is inserted. Additionally, although already explained, a specific operation (such as special command outputting whether it supports the function of copyright protection) may be used to distinguish a portion corresponding to the controller in the system apparatus.

It is also possible to design so that discrimination of the presence or absence of the above-mentioned copyright protection can be made for each file or each directory. Additionally, taking account of literary works not requiring protection, such as private musical works or promotion-purpose musical pieces, means for discriminating those requiring protection from those not requiring protection may be provided. By proving a flag, for example, in a predetermined field in a file, the flag may be used to enable the use of a file on a system apparatus even when conditions about copy right protection explained heretofore are not satisfied, if the file is judged to require no copyright protection.

Although the first to eleventh embodiments have been explained taking flash memory cards FMC as an example, the invention is not limited to flash memory cards or semiconductor memory. The entire of a card may be a mask ROM (MROM) (in this case, identifying information, etc. explained in the first to eleventh embodiments may be configured as MROM), or flash memory capable of data write or setting identifying information, OTP (one time PROM), fuse, etc. may be attached together with MROM in order to add the functions as explained in the first to eleventh embodiments.

Furthermore, the invention is not limited to the foregoing embodiments, but it can be modified in various modes without departing from its concept. Additionally, protection of copyrights need not be used in a mode shown in the first to eleventh embodiment or combining them, but electric transparency techniques and cipher techniques may be combined to these embodiments or their combinations.

Twelfth Embodiment

The twelfth embodiment of the invention is directed to a specific control method of a state change storage field permitting data write only once in the flash memory card FMC.

Figure 23:
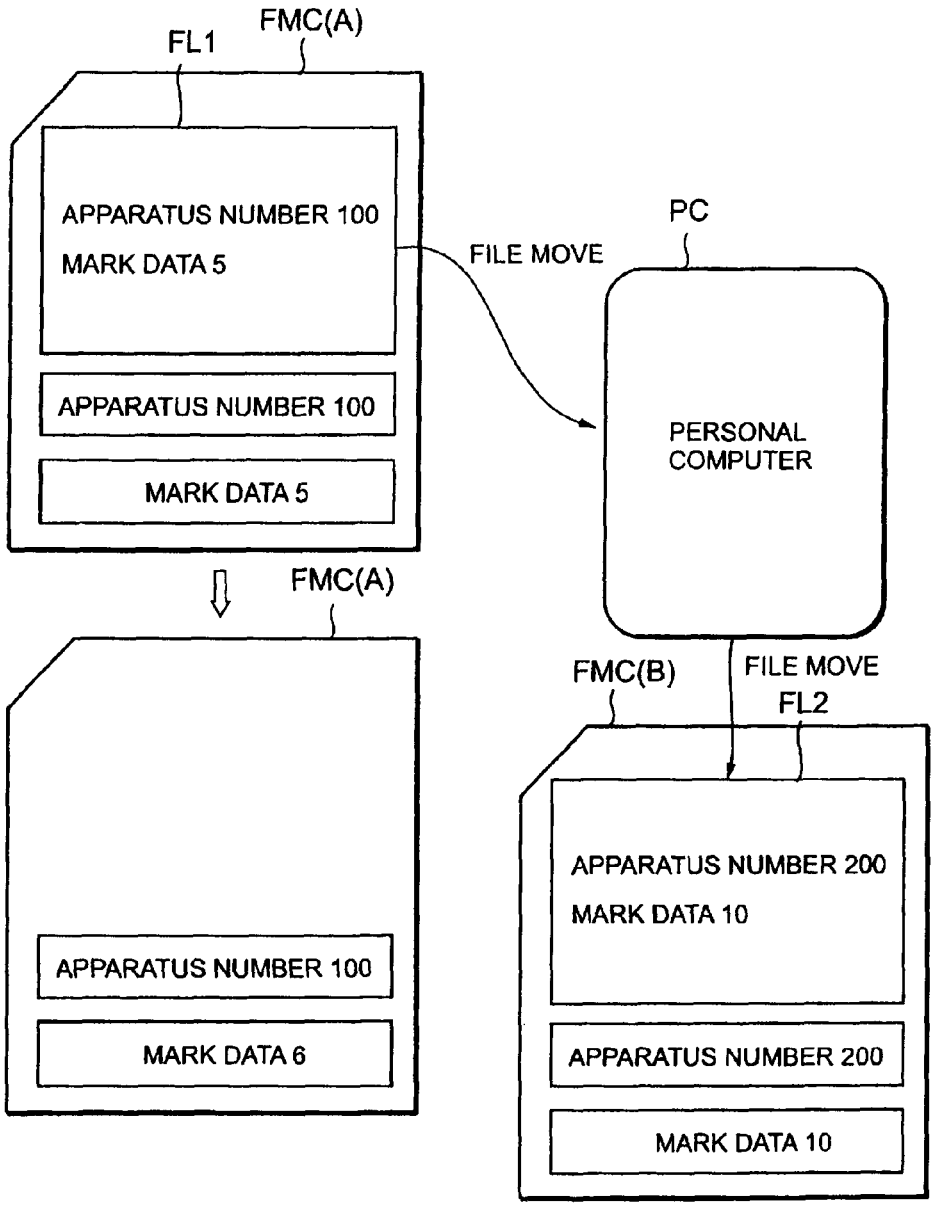
FIG. 23 is a diagram explaining a setup for copyright protection in the twelfth embodiment of the invention (when moving an approved file of a literary work)
Figure 24:
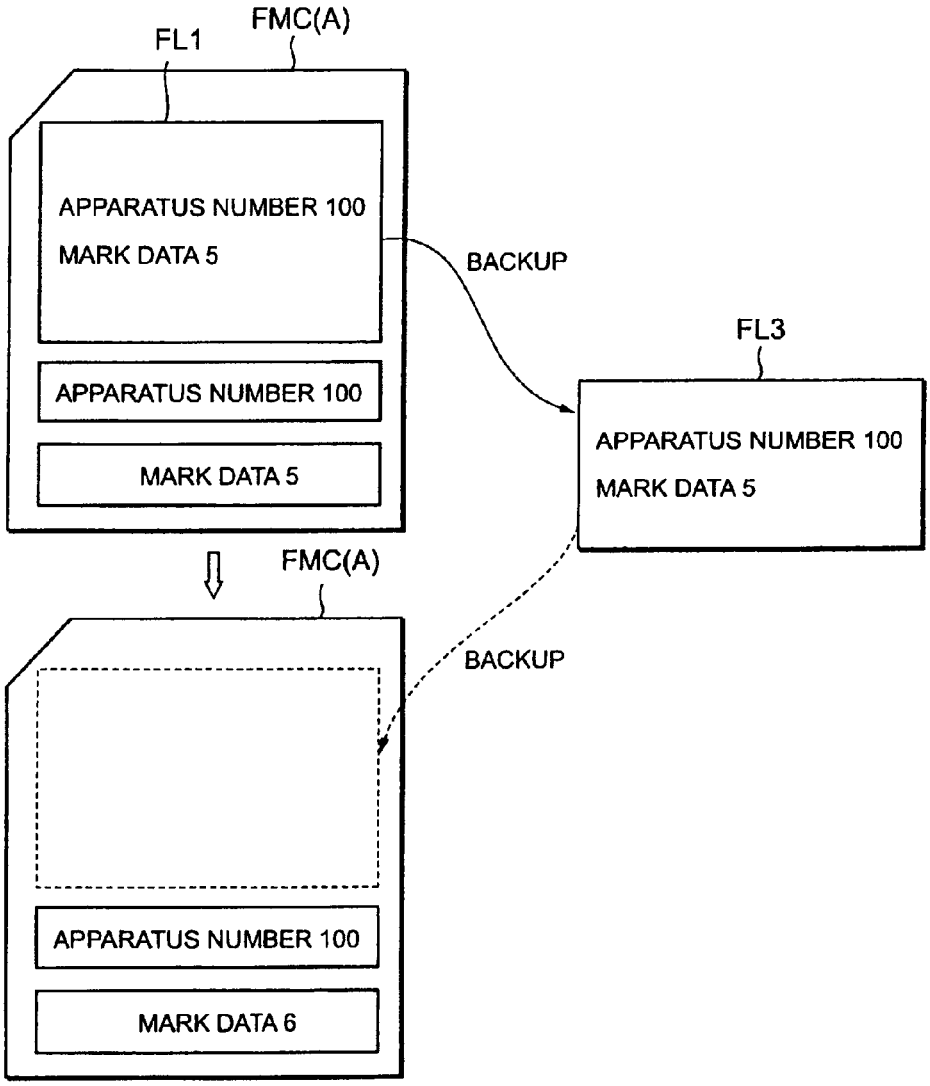
FIG. 24 is a diagram explaining a setup for copyright protection in the twelfth embodiment of the invention (when unapproved copy of the file of the copyright work is attempted)

First explained is the mechanism of copyright protection employed in this embodiment with reference to FIGS. 23 and 24. FIG. 23 is a diagram explaining a setup for copyright protection in case of moving an approved file. FIG. 24 is a diagram explaining a setup for copyright protection when unapproved file copy is attempted).

As shown in FIG. 23, the flash memory card FMC(A) is for use in the system apparatus having apparatus number 100. The mark data of the flash memory card FMC (A) is 5. The flash memory card FMC(A) stores an approved literary work file FL1. In the file FL!, the apparatus number 100 is installed as the identifying information, and information indicating that the mark data is 5 is also installed.

Assume here that the file FL1 of the literary work stored in the flash memory card FMC (A) is licitly moved to another flash memory card FMC(B).

In this case, the end user first moves the file FL1 from the flash memory card FMC(A) to the hard disc, for example, of a personal computer. The term "move" is used that the original file FI1 heretofore stored in the flash memory card FMC (A) is erased therefrom and simultaneously copied to the personal computer PC. Therefore, by moving the file FL1 to the personal computer PC, the file is lost in the flash memory card FMC(A). When the file FL1 is moved, the mark data is counted up from 5 to 6. The mark data is controlled on the hardware not to count down. That is, the mark data having changed from 5 to 6 cannot be no longer returned to 5.

Subsequently, the end user moves the file FL1 from the had disc of the personal computer PC to the flash memory card FMC(B). Upon this movement, the personal computer PC reads the apparatus number 200 of the flash memory card FMC(B) and a mark data 10, and after creating a file FL2 incorporating these data, delivers it to the flash memory card FMC(B). Since different flash memory cards have different values of the mark data, the personal computer creates the new file FL2 in compliance with the unique number of the mark data. Due to the movement, the data of the file FL1 heretofore stored on the hard disc of the personal computer PC is erased. Through these operations, the file FL1 in the flash memory card FMC(A) for the apparatus number 100 can be moved as a file FL2 to the flash memory card FMC(B) for the apparatus number 200.

With reference FIG. 24, explanation is made below about the reason of the irreversible count-up of the mark data of the flash memory card FMC(A).

Assume that the end user previously made a backup copy of the file FL1 of the literary work in the flash memory card FMC(A) into a personal computer, for example, in some form prior to movement thereof to the personal computer PC, as shown in FIG. 24. Since the backup file FL3 in this case is just the backup copy, the file FL3 still includes the apparatus number 100 and the mark data 5.

Next assume that the end user moved the file FL1 in the flash memory card FMC (A) to the flash memory card FMC (B) according to the procedure explained above. Then, the flash memory card FMC(A) changes to a flash memory card storing no file therein, having the apparatus number 100 and the mark data 6.

Further assume that the backup file FL3 is copied as another backup copy onto the blank flash memory card FMC (A). However, the mark data of the flash memory card FMC (A) has already changed to 6 as explained above. On the other hand, in the backup file FL3 returned back to the flash memory card FMC(A), the mark data 5 still remains. And, the mark data value of the flash memory card FMC (A) cannot be returned from 6 to 5. Therefore, the backup file FL3 is not usable on the flash memory card FMC(A).

In this manner, by irreversibly counting up the mark data value of the flash memory card FMC when the file is moved, it is possible to prevent illicit copy of the file of the literary work.

Next explained is a specific embodiment of the flash memory for realizing the setup for copyright protection.

Figure 25:
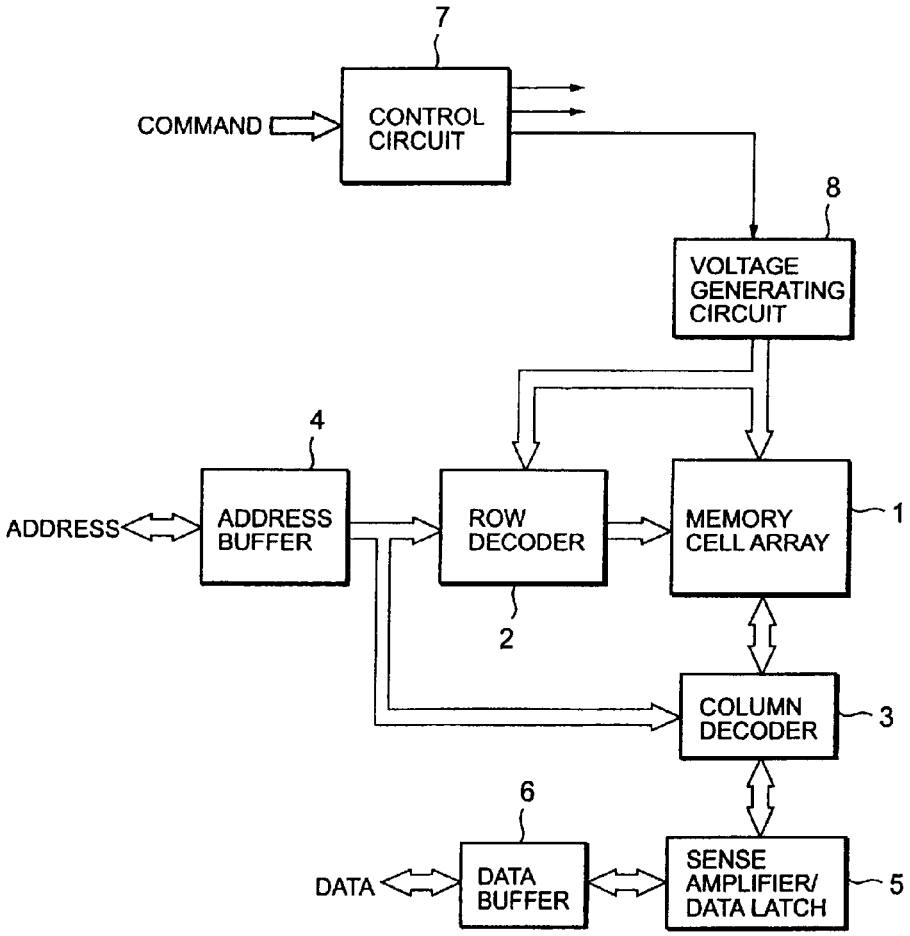
FIG. 25 is a diagram showing the structure of NAND EEPROM flash memory used in the twelfth embodiment of the invention.
Figure 26:
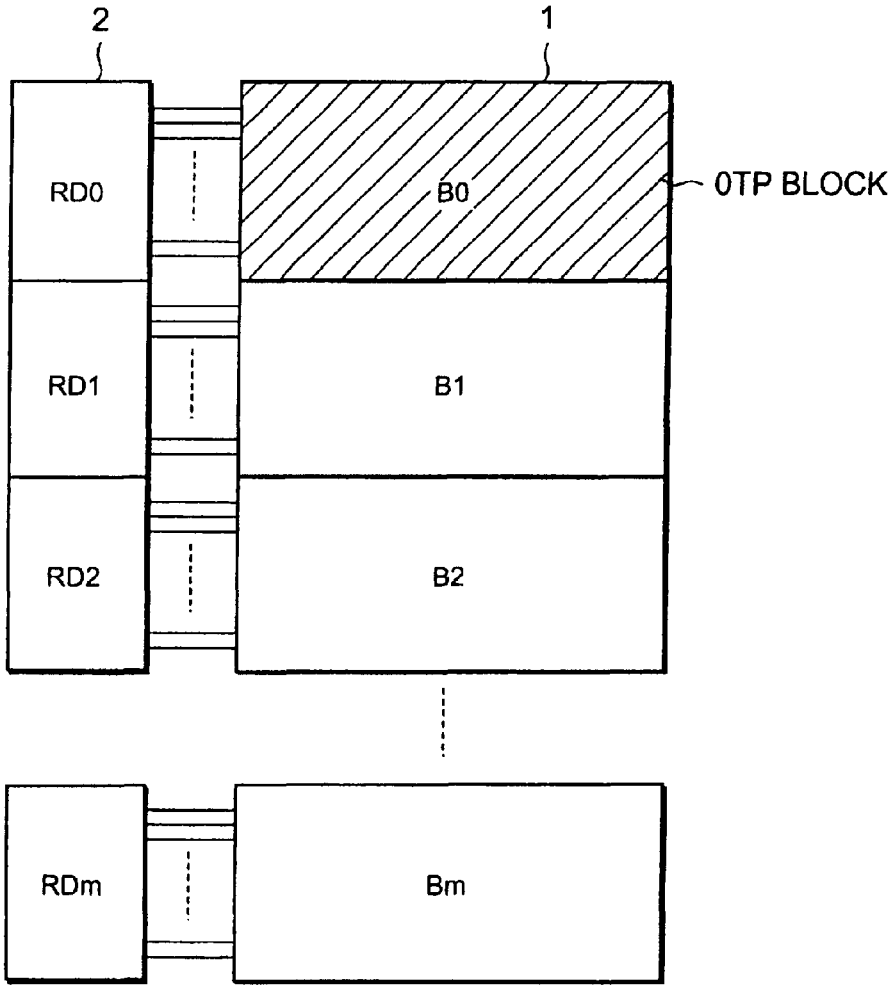
FIG. 26 is a diagram showing a block structure of a memory cell array in the same flash memory.
Figure 27:
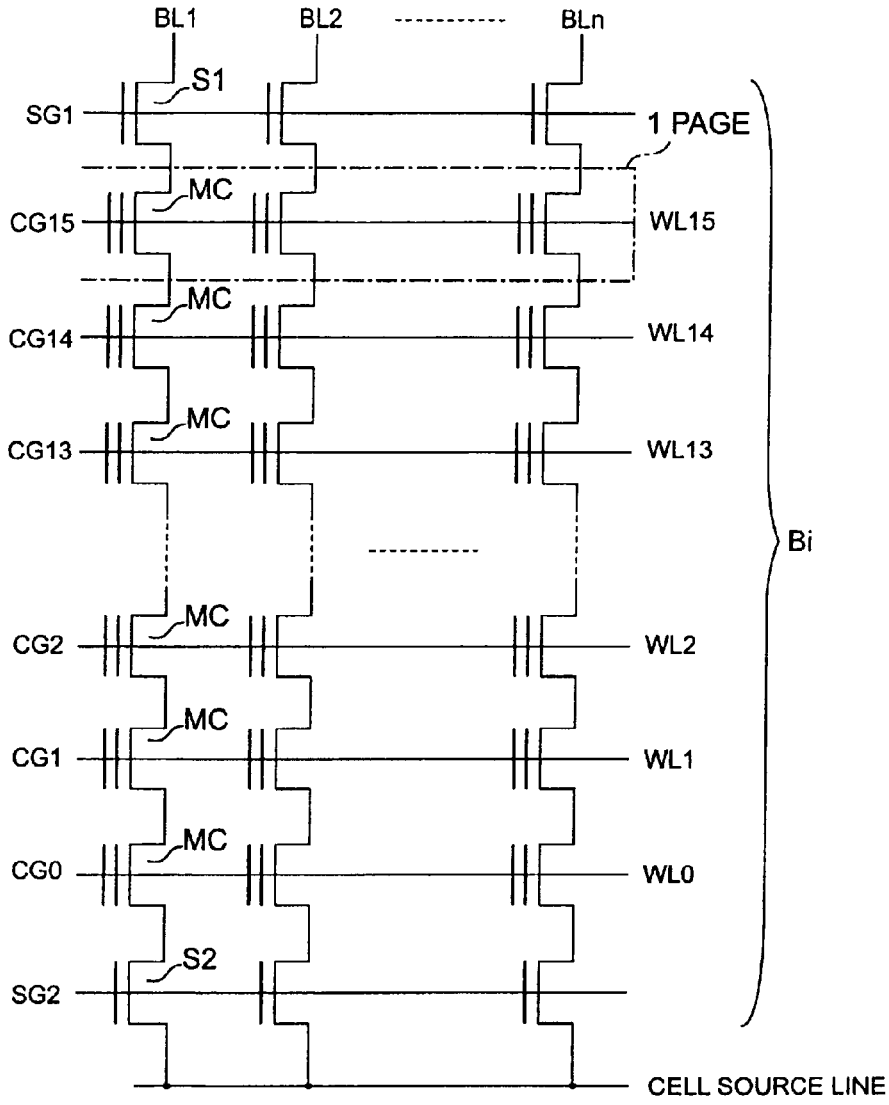
FIG. 27 is a diagram showing a specific structure of a block in the same flash memory.

FIG. 25 shows the entire structure of NAND EEPROM flash memory according to the embodiment, FIG. 26 shows the structure of blocks of its memory cell array 1, and FIG. 27 shows the structure of a single block Bi.

As shown in FIG. 27, each memory transistor (memory cell) MC of the NAND EEPROM flash memory has a FET-MOS structure made by stacking a floating gate in which a floating gate (charge storage layer) and a control gate are stacked on a semiconductor substrate via an insulating film. Then, a plurality of memory transistors are serially connected, with a source and a drain commonly used by every two adjacent memory transistors, to form a single-unit NAND cell, and the NAND cell is connected to a bit line. A number of such NAND cells in a matrix arrangement form a memory array shown in FIG. 1. The memory cell array 1 is integrated on a p-type substrate or a p-type well.

As shown in FIG. 27, drains at one end of NAND cells aligned in row directions of the memory cell array 1 are connected to bit lines BL via selection gate transistors S1, and sources at the other end are connected to a common source line via selection gate transistors S2. Control gates of memory transistors MC and selection gate transistors S1, S2 are connected commonly connected as control gate lines CG0 through CG15 and selection gate lines SG1 and SG2 in column directions of the memory cell array 1. Control gate lines CG0 through CG15 normally form word lines WL0 through WL15.

In FIG. 27, 16 memory transistors MC form a 16-stage NAND. This NAND cell executes data write, erase and read operations by controlling voltages of the bit line BL, control gate lines CG and selection gate lines SG. All of a plurality of NAND cells in FIG. 27 commonly share a control gate. A group of these NAND cells sharing a control gate is normally called a block, and this one block is the minimum unit of data erasure. Typically, hundreds to thousands of blocks are arranged in the memory cell array 1. Each area in the clock selected by a single control gate line is one page, and this one page is the area enabling collective write or read operation.

As shown in FIG. 25, an address is acquired by an address buffer 4 and decoded by a row decoder 2 and a column decoder 3. Thereby, selection of a control gate line CG and selection of a bit line BL in the memory cell array 1 are executed. A sense amplifier/data latch 5 detects selected data of the memory cell array 1, and latches write data introduced from outside through a data buffer 6.

A control circuit 7 receives a command, thereby generates various control signals such as data erase control signal, and controls a voltage generating circuit 8 the voltage generating circuit 8 generates a step-up voltage, negative voltage, and so on, necessary for data write and erase operations.

This NAND EEPROM operates as explained below. For data write operation, a high voltage Vpgm (approximately 20V) is applied to the control gate of selected memory cells, an intermediate potential Vpass (approximately 10V) is applied to control gates of the other memory cells, and 0V or source voltage Vcc (approximately 3 to 5V) is applied to the bit lines, depending upon the data. When 0V is applied to the bit lines, the potential is transmitted up to the drain of the selected memory cell and the channel portion, and electrons are injected from the drain to the floating gate. As a result, the threshold value of the selected memory cells shifts toward the positive direction. Let this status be "0", for example. When the source voltage Vcc is applied to the bit line, injection of electrons does not occur. Therefore, the threshold value does not change but remains negative. This status is the initial status of memory, and "1". Details of write operation and its principle are explained later.

Data erasure occurs simultaneously in all memory cells within the selected NAND cell block. That is, in the selected cell block, all control gate lines are changed to 0V, and a high voltage of approximately 20V is applied to the bit lines, source lines p-type well (or p-type substrate), control gate lines CG in unselected NAND cell blocks and all selection gate lines SG. As a result, in all memory cells in the selected NAND cell block, electrons in the floating gates are released to the p-type well (or p-type substrate), the threshold voltage shifts toward the negative direction, and data "1" is established.

Data read operation is executed by applying 0V to the control gate of selected memory cells, applying the source voltage Vcc to the control gates of the other memory cells and selection gates, and detecting whether a current flows or not in the selected memory cells.

In the embodiment shown here, among a plurality of NAND cell blocks Bi of the memory cell array 1, one block B0 shown by crosshatching in FIG. 26, for example, is determined as an OTP block which is a state change storage field permitting only once data writing, that is, a field in which data erasure is impossible. In this OTP block, it is necessary to store a mark data indicating an irreversible change of state while preventing erroneous writing, and a control method for this purpose is important. A specific control method will be explained later.

Figure 28:
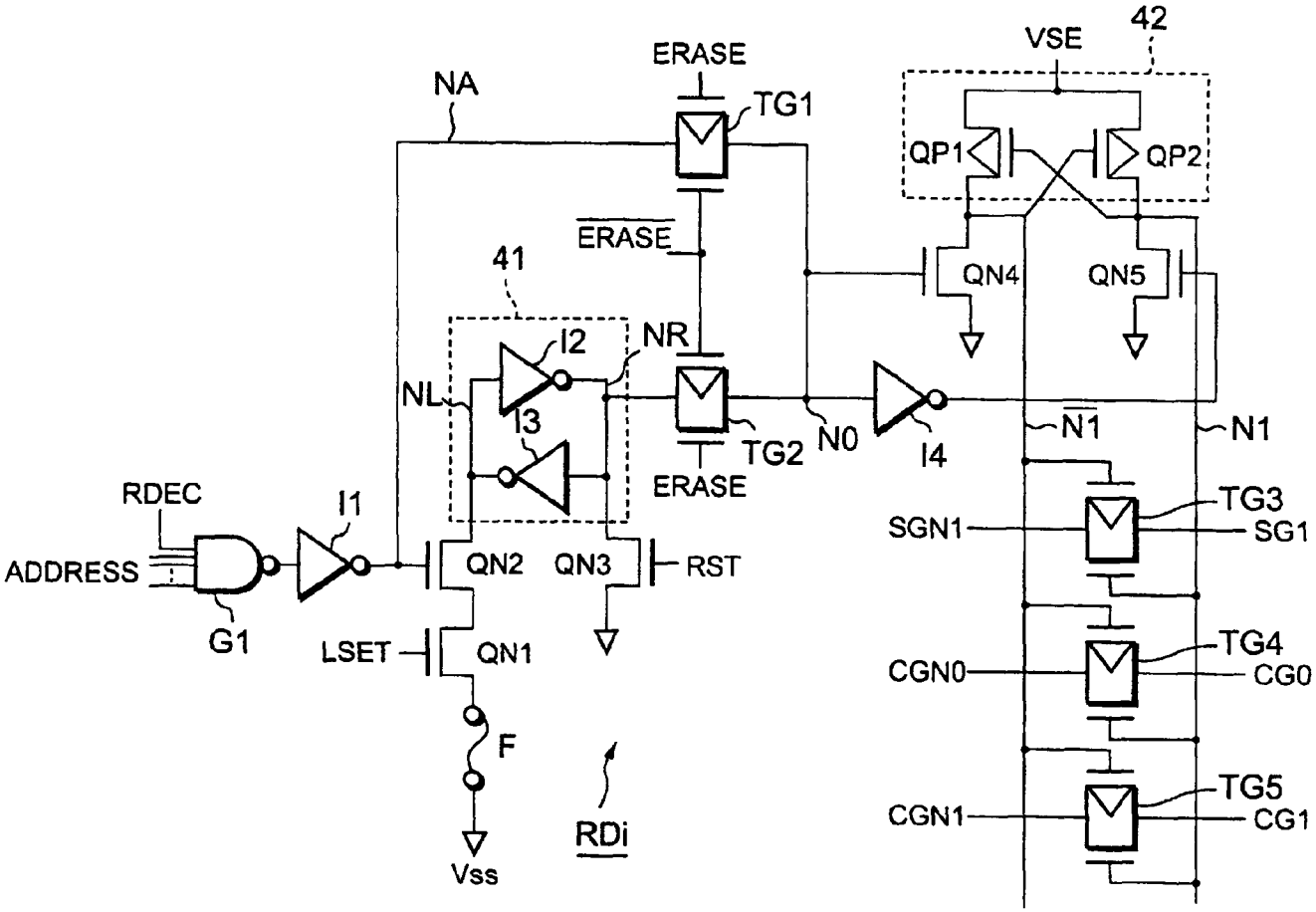
FIG. 28 is a diagram showing the structure of a row decoder in the same flash memory.

In order to prohibit data erasure of the OTP block, a fuse circuit is added in each block decode portion in the row decoder. FIG. 28 shows an example of the structure of a decode portion RDi corresponding to the block Bi in the row decoder 2. The row decoder 2 takes the role of selecting a block according to an address input into the chip and transferring a voltage generated in the peripheral circuit to the control gate, selection, etc., and effectuates data write, data erase and data read operations.

Signal RDEC is the start signal of the row decoder 2, and becomes "H" for write, erase and read operations. Signal ADDRESS is a block address. Solely in a block whose address is selected, all of a plurality of address signals become "H", and output nodes NA of decode gates each made up of a NAND gate G1 and an inverter I1 become "H". That is, the nodes NA become "H" only in the selected block and "L" in the other blocks.

Status of the node NA is inverted through an NMOS transistor QN2 and transferred to a node NL in a latch circuit. The latch circuit 41 is provided to hold an erase select flag indicating that the block is under selection during erasure of data. That is, for the selected block, the latch circuit 41 holds the node NL in "L" and the node NR2 in "H". However, the NMOS transistor QN2 is grounded via the NMOS transistor QN1 and through the fuse F. Whether the fuse is cut or not determines whether the block should be changed to OTP, and it is programmed in the wafer stage.

More specifically, in the block with its fuse F being cut, the NMOS transistor QN2 is not grounded, and the latch circuit 41 cannot hold the erase select flag (NL="L", NR="H") even when the block is selected. As a result, the block in which the fuse F is cut is changed to an OTP block prohibiting data erasure therein.

Data on the node NA and data on the node NR of the latch circuit 41 are selectively transferred to the node N0 by transfer gates TG1 and TG2 which are controlled by an erase control signal ERASE generated from a control circuit 7. That is, during data write or read operation, ERASE is "L", transfer gates TG1 is ON, TG2 is OFF, and therefore, data on the node NA is transferred to the node NO. During data erasure, transfer gate TG1 is OFF, TG2 is ON, and data on the node NR in the latch circuit 41 is transferred to the node N0.

In response to the data on the node NO, output voltage VSE from a voltage generating circuit 8 (or Vcc) is transferred to signal lines N1 and /N1 as a complement signal voltage by a transfer switch 42. That is, in the selected block with N0="H", PMOS transistor QP1 of the transfer switch 42 is OFF, QP" is ON, N1=VPP (high voltage for effectuating write, erase and read operations, for example), and /N1=0V. These signal lines N1 and /N1 controls transfer gates TG3, TG4, . . . to turn ON, a drive voltage from a bus line of a peripheral circuit propagates to the control gate lines CG and the selection gate lines SG of the memory cell array. As a result, data write and read operations are executed. In unselected blocks, N1=0V, /N1=VPP, and control gate lines and selection gate lines are under disconnection from the bus line of the peripheral circuit.

Remarking the row decoder of FIG. 28, data erase operation is explained in detail. Before the erase operation starts, a reset signal RST is "H", NMOS transistor QN3 is ON, and in the latch circuit 41, node NL and node NR are "H" and "L", respectively. When the erase operation starts, the reset signal RST changes to "L", the address signal ADDRESS is determined according to the address input into the chip, and signal LSET becomes "H" for a predetermined time. In the selected block, node NA is "H". Under the situation, if the fuse F still remains uncut, node NL is connected to 0V through the fuse F. Therefore, nodes NL and NR become "L" and "H", respectively. On the other hand, in a block in which the fuse is already cut, regardless of the block being selected or unselected, nodes NL and NR remain "H" and "L", respectively. Subsequently, the erase control signal ERASE becomes "H", and the status of node NR of the latch circuit 41 is transmitted to the node NO through the transfer get TG2. That is, data erasure is executed solely in the block in which the node NR is in the "H" level.

Figure 29:
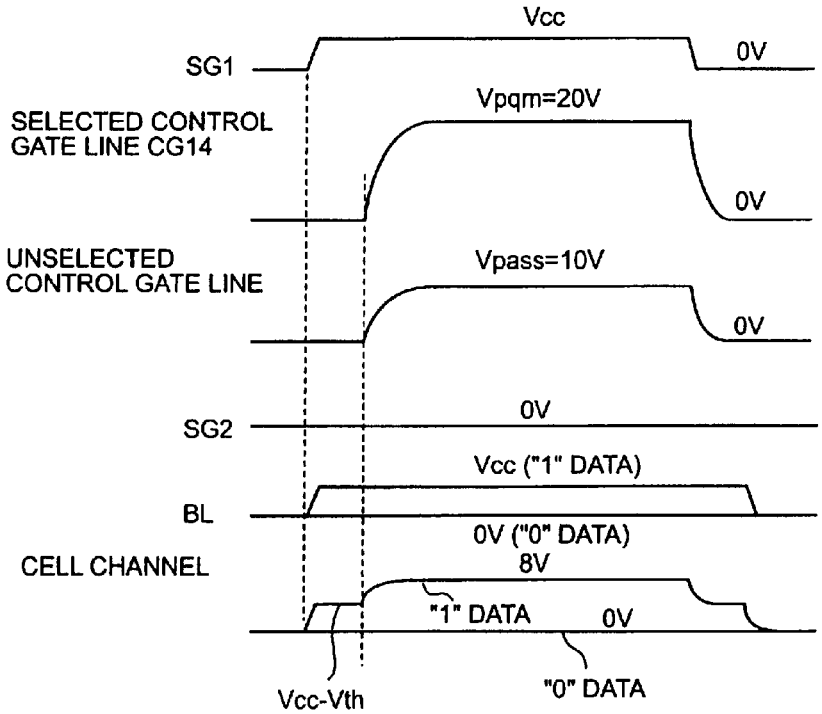
FIG. 29 is a diagram showing data write operation timing in the same flash memory.
Figure 30:
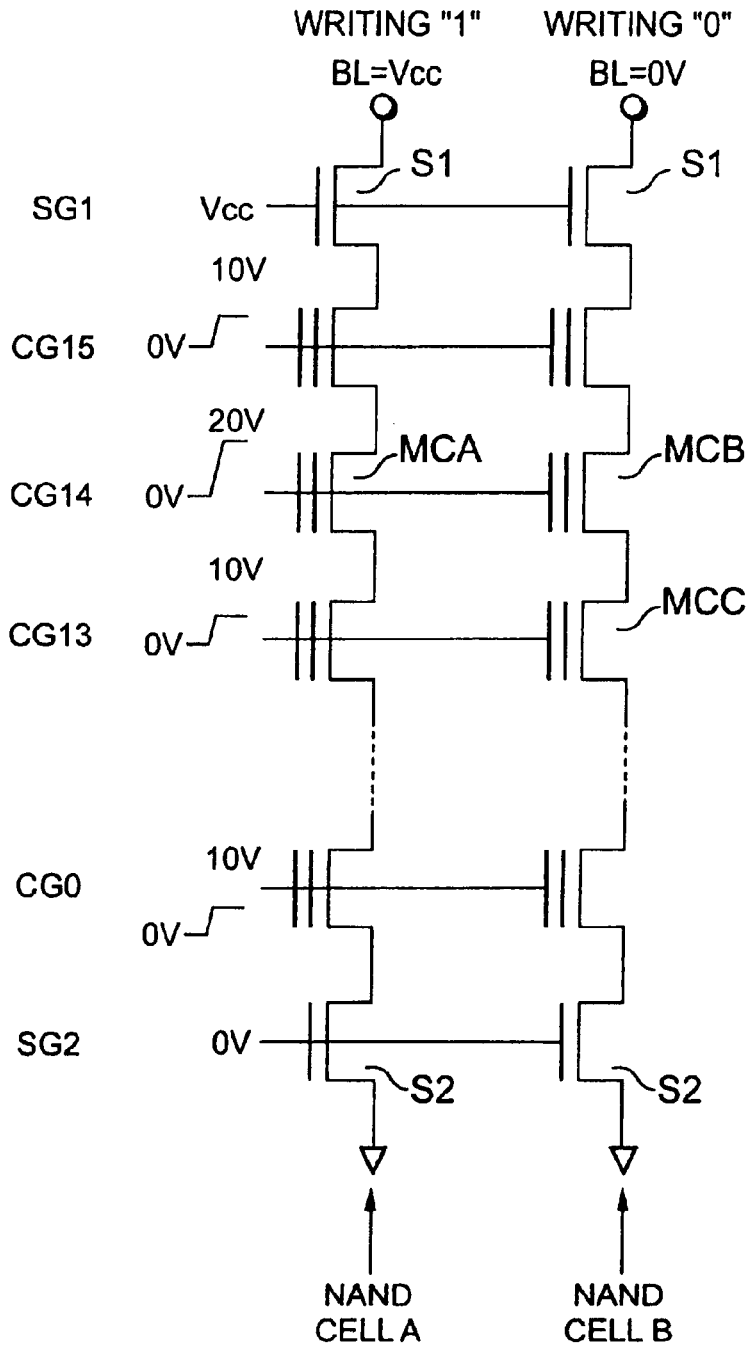
FIG. 30 is a diagram showing bias conditions for data write in the same flash memory.

FIG. 29 is a diagram which shows timing of the data write operation, and FIG. 30 is a diagram showing the corresponding bias condition. The timing diagram of FIG. 29 corresponds to the operation in the case where CG14 is selected among 16 control gate lines (word lines) in the selected block. When the write operation starts, the bit lines BL are charged to 0V or Vcc, depending upon the data to be written, and the selection gate line SG1 is charged to Vcc. At that time, in the NAND cell for writing "0" therein (NAND cell B in FIG. 30), 0V is transferred to the channel portion of the memory transistor MCB through the selection gate transistor S1 driven by the selection gate line SG1. On the other hand, in the NAND cell for writing "1" therein (that is, prohibiting to write "0") (NAND cell A in FIG. 30), the selection gate transistor S1 turns OFF after transferring voltage up to Vcc-Vt (Vt is the threshold voltage of the selection gate transistor S1) therefore, the channel portion of the memory transistor MCA changes to a floating state of a level higher than the NAND cell B on the part for writing "0".

After that, the selected control gate line CG14 changes from 0V to Vpgm=20V, and the unselected control gate lines CG0 through CG13 and CG15 change from 0V to Vpass=10V. As a result, in the NAND cell B for writing data therein, since the channel portion of the selected memory transistor MCB is fixed to 0V, a high voltage is applied to the control gate line CG2, a potential difference as large as 20V is produced between the control gate and the channel portion. Therefore, electrons in the channel portion are injected into the floating gate by tunneling. Thus, the threshold value voltage of the memory transistor MCB shifts toward the positive direction. That is, data "0" is written.

Still in the NAND cell B for writing "0" therein, in an unselected memory transistor, MCC, for example, since the potential different between the control gate and the channel portion is 10V, not so large, electron injection to the floating gate does not occur, and the threshold voltage of the memory transistor does not change. In the NAND cell A for writing "1", however, since the channel portion of the memory transistor MCA is currently under floating, even when the control gate voltage increases, such as 0V620V, the potential of the channel portion also increases to Vboost (−8V) because of capacitance coupling. Therefore, the potential difference between the control gate and the channel portion is approximately 12V, and electron injection to the floating gate is difficult to occur, and the threshold voltage of the memory transistor MCA does not change so much. Also in memory transistors driven by the other unselected control gate lines supplied with the pass voltage Vpass, writing does not occur.

Figure 31:
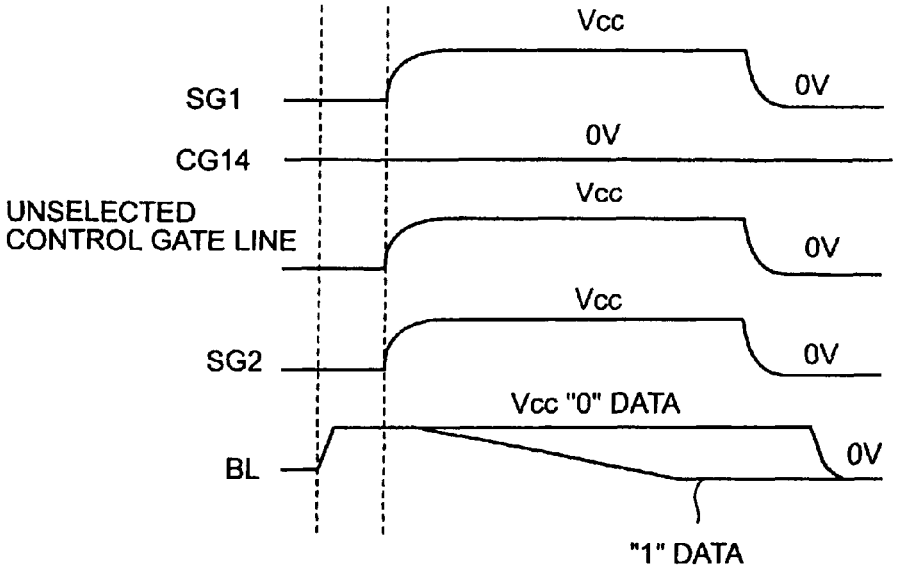
FIG. 31 is a diagram showing data read operation timing in the same flash memory.

FIG. 31 shows a diagram showing the timing of data read operation. The bit line BL is pre-charged to Vcc. Then, Vcc is applied to the selection gate lines SG1, SG2, the same Vcc is simultaneously applied also to the unselected control gate line CG0 through CG13 and CG15, and the selected control gate line CG14 is held in 0V. As a result, depending on "0" or "1" of the selected memory transistor, a current flows or does not flow in the bit line BL, and "0" and "1" can be detected, respectively.

In the embodiment shown here, the OTP block exhibits all "1" in the initial status, and mark data as many as possible are written here. As explained later more specifically, by sequentially writing mark data of all "0" in unit of one byte, for example, changes of the status are stored. Therefore, the OTP block is divided in the row and column directions, and only write operation is repeated in respective unit areas. Therefore, erroneous writing is liable to occur with a large possibility. Because of this reason, for writing mark data in the OTP block, it is desirable to employ a method minimizing erroneous writing. For this purpose, it is necessary to know which conditions are liable to cause erroneous writing.

Under the bias condition for data write shown in FIG. 30, since there is a difference in condition of voltages between the memory transistor MCA supplied with a high voltage to its control gate within the NAND cell given with data "1" and the unselected memory transistor MCC in the NAND cell B given with data "0", there is a difference also in liability of erroneous writing. In this case, erroneous writing is more liable to occur in the former because, in the above-explained example of operation, the potential difference between the control gate and the channel portion of the selected memory transistor MCA for writing data "1" is 12V, and it is larger than the potential difference 10V between the control gate and the channel portion of the unselected memory transistor MCC in the NAND cell B for writing data "0".

On the other hand, in the data read operation as shown in FIG. 31, since the potential difference between the control gate and the channel portion is normally about Vcc maximum, almost no erroneous write phenomenon occurs during read operation.

Therefore, in order to erroneous writing, there are two key points, namely, minimizing the potential difference between the control gate and the channel portion of the selected memory transistor for writing data "1" (increase the voltage of the channel portion as high as possible), and minimizing the frequency of writing data "1".

Additionally, from the viewpoint of the sequence of data write in a single NAND cell, the probability of erroneous write phenomenon can be reduced by progressing writing in sequence from the memory transistor closest to the cell source line. This is explained with reference to FIG. 32 and FIG. 33. As explained above, the voltage of the channel portion of the selected memory transistor for writing data "1" increases to the floating level, with Vcc-Vt pre-charged from the bit line BL, and upon an increase of the voltage of the control gate line, it increases by capacitance coupling. It is apparent that the higher the voltage at the start of the voltage rise due to capacitance coupling (the inter-channel voltage under 0V in all control gates), the higher the final arrival voltage of the channel portion (maximum voltage value of the channel portion).

Figure 32:
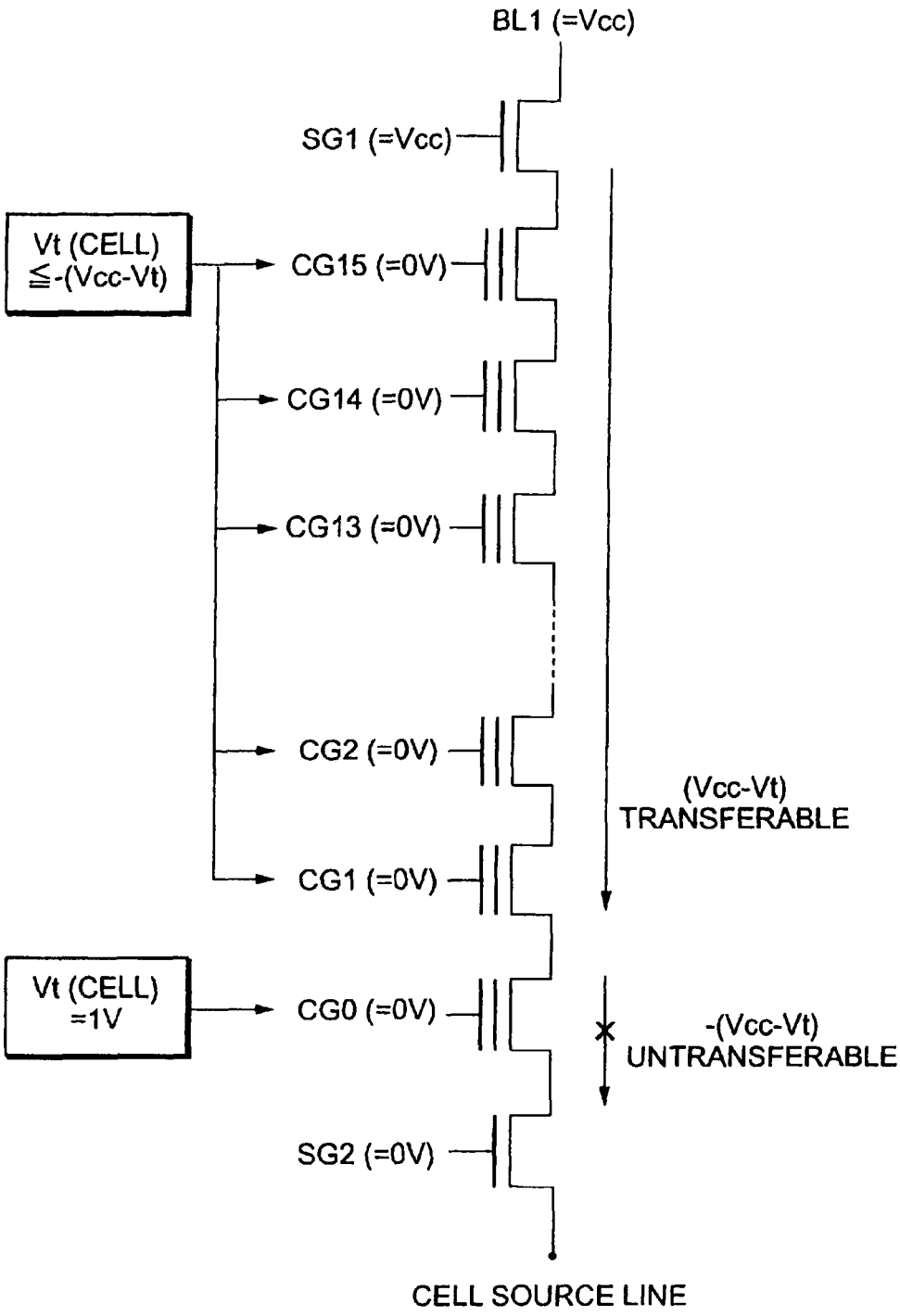
FIG. 32 is a diagram for explaining a preferable example of data write sequence within NAND cell in the same flash memory.
Figure 33:
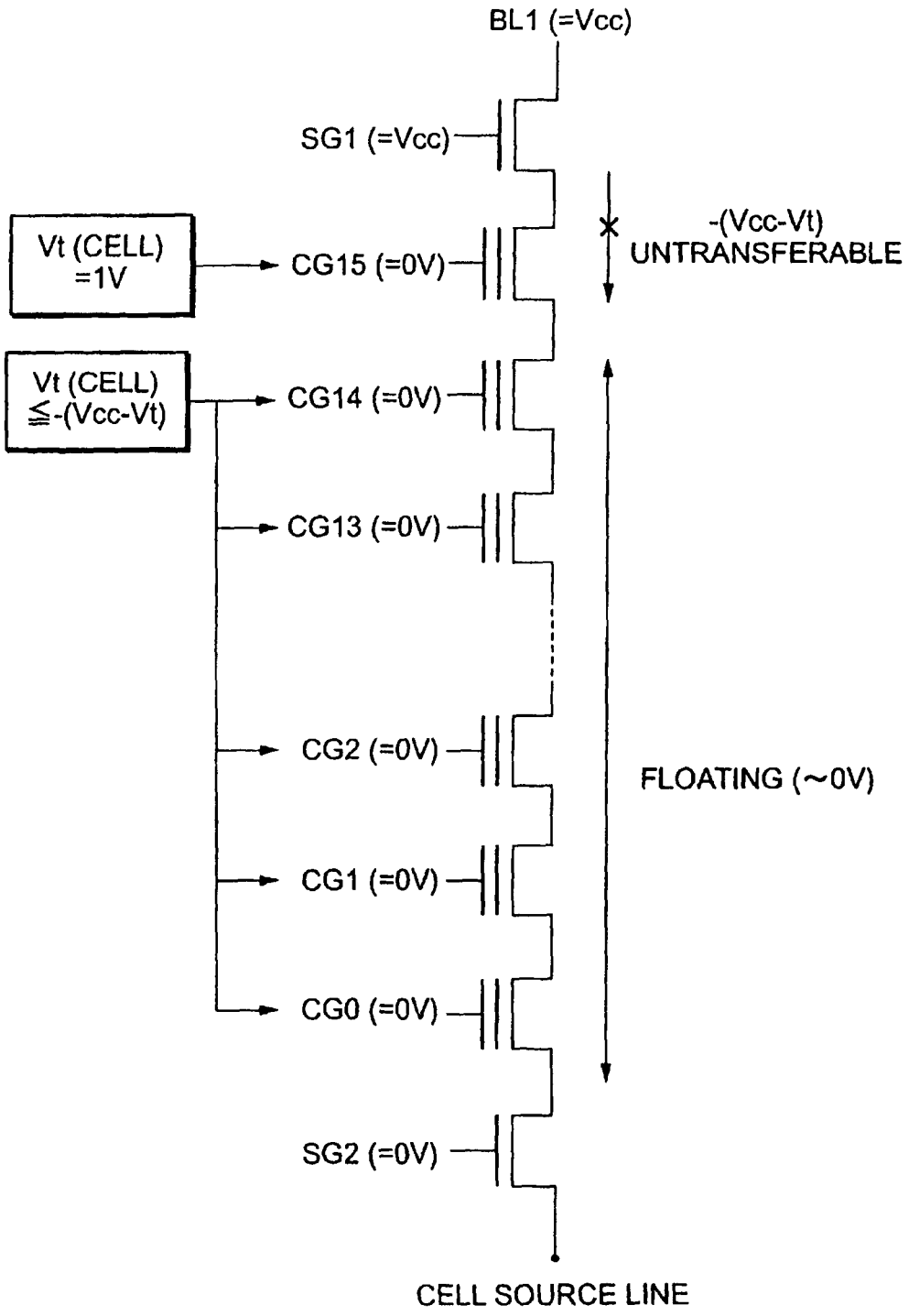
FIG. 33 is a diagram for explaining an undesirable example of data write sequence within a NAND cell in the same flash memory.

FIG. 32 shows the aspect in which, in the status with data "0" being written in the memory transistor closest to the cell source line in the NAND cell, Vcc is applied to the selection gate line SG1 nearest to the bit line, 0V is applied to all control gates, and Vcc applied to the bit line BL is transferred to the channel of the NAND cell. FIG. 33 shows the aspect in which, in the status with data "0" being written in the memory transistor closest to the bit line in the NAND cell, Vcc is applied to the selection gate SG1 line nearest to the bit line, 0V is applied to all control gates, and Vcc applied to the bit line BL is transferred to the channel of the NAND cell.

As shown in FIG. 32, in the case where "0" (Vt(cell)=1V) is written in the memory transistor on the control gate line CG0 nearest to the cell source line, if all of the threshold values Vt(cell) in the remainder memory cells nearer to the bit line are in the state of "1" in the negative side (≦+(Vcc-Vt)), the potential Vcc-Vt can be transferred to the channels of the remainder memory transistors from the bit line BL. On the other hand, assuming that data "0" is written in the memory transistor nearest to the bit line BL, shown in FIG. 33, even by applying Vcc to the bit line BL, the channel regions of the memory transistors nearer to the source line than the memory transistor already written with data "0" cannot be pre-charged due to disturbance by the threshold value 1V of the memory transistor with data "0", and they get into a floating state of approximately 0V.

In this manner, if "0" is written earlier in a memory transistor nearer to the bit line, channels of memory transistors farther from the bit line cannot be pre-charged sufficiently. This can be a cause of erroneous writing. Therefore, it is important for preventing avoidable erroneous writing to progress data write successively from one nearest to the cell source line so as to always hold the unwritten status ("1") in memory transistors nearer to the bit line from than the memory transistor for writing.

Figure 34:
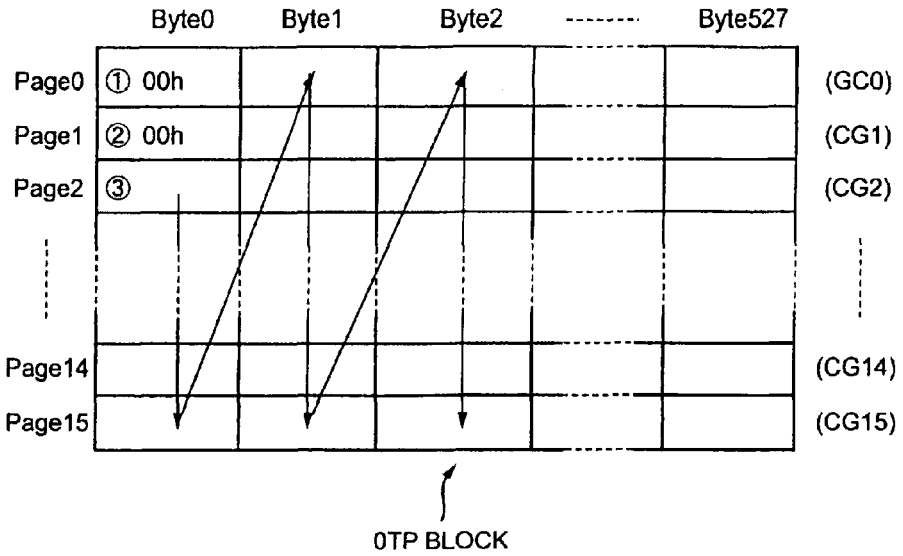
FIG. 34 is a diagram showing a sequence of mark data write into OTP blocks in the same embodiment.

FIG. 34 shows a method for writing mark data in the OTP block in this embodiment, taking account of the viewpoint of preventing erroneous writing. In the embodiment shown here, the OTP block is one block which is the minimum unit of data erasure, and it includes 16 pages Page 0 through Page 15 each being the area belonging to one control gate line CG. One page is made up of 528 bytes, and the OTP block is sectioned into unit areas for writing mark data, in the unit of one byte in the column direction as illustrated. Then, as mark data storing changes in state, "00h" which is all "0" is successively written in the unit of one byte. In the OTP block, once the data "0" is written, the data cannot be returned to "1". Therefore, In the embodiment shown here, since 528 bytes×16 pages=8000 approximately, irreversible changes of state can be stored approximately 8000 times.

Writing of mark data "00h" in the unit of one byte into each area of the OTP block is progressed, as indicated by arrows in FIG. 34, in the order from (Page 0, Byte 0) to (Page 1, Byte 0), (Page 2, Byte 0), (Page 2, Byte 1), . . . by switching the row address every one byte (changing the page). When the writing progresses to (Page 15, Byte 0), the process returns to Page 0, and progresses writing of mark data "00h" while incrementing the address in the row direction like (Page 0, Byte 1), (Page 1, Byte 1), (Page 2, Byte 1), et. seq.

Regarding the writing sequence of the mark data, it is essentially possible to increment the address in the column direction like Byte 0, Byte 1, . . . in Page 0 and to move to the next page Page 1 after the mark data is written in all bytes of Page 0. However, in this method, there is a high probability that erroneous writing occurs often before a number of changes in state are stored. This can be explained as follows, remarking (Page 0, Byte 527).

Until the mark data is written in (Page 0, Byte 527), operation for writing data "1" under application of a high voltage to the control gate is repeated 527 times in the very memory transistor. This condition is the same whether the address is incremented in the row direction or in the column direction. However, when it is incremented in the column direction, operation of even one page is not finished, until writing of mark data progresses to (Page 0, Byte 527). In contrast, in the method according to the embodiment configured to increment the address in the row direction, 526×16 changes of state are already stored until the same stress is applied in the same position (Page 0, Page 527).

Therefore, according to the embodiment shown here, it is possible to write much of the mark data on condition that the memory transistor not yet written in the OTP block does not receive a useless stress.

According to the embodiment shown here, page 0 corresponds to the control gate line CG0 nearest to the cell source line in the OTP block, and data write is executed from the position nearest to the cell source line within the NAND cell in the OTP block. This also contributes to decreasing the probability of erroneous writing.

Figure 35:
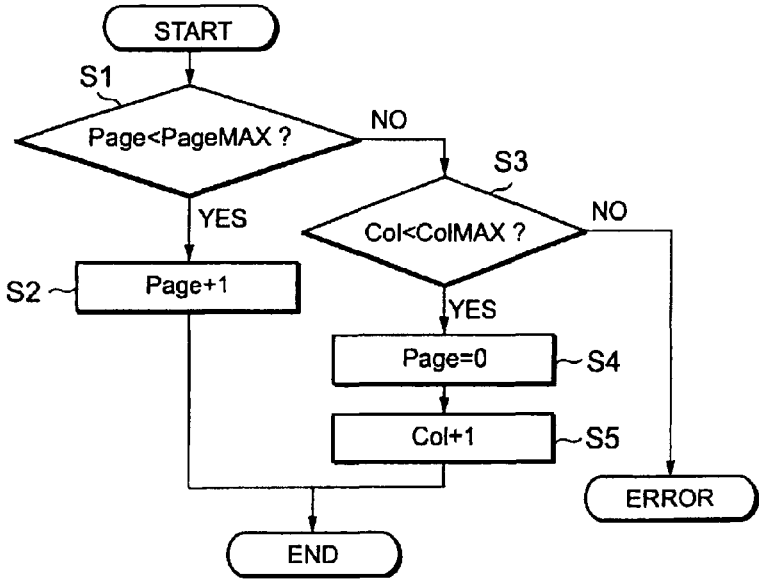
FIG. 35 is a diagram showing an address increment flow for writing the mark data in the same embodiment.

FIG. 35 shows a flow chart of the operation of incrementing the address for writing mark data in the OTP block. In step S1, page address Page and the maximum page address PageMAX in the OTP block are compared. If the current page address is not the maximum page address (PageMAX=15 in the example of FIG. 34), the page address is imply incremented (Step S2). If the current page address is judged to be the maximum page address in step S1, the procedure jumps to the routine of step S3, and by confirming the column address Col is not larger than the maximum column address ColMAX, resets the page to 0 (returns to the first page) (step S4) and increments the column address (step S5). In step S3, if the column address is the maximum column address (Byte 527 in the example of FIG. 34), since the address cannot be incremented any more either in the row direction or in the column direction, the procedure finishes in Error.

Next explained is an algorithm for improving the reliability of mark data write operation in the OTP block. As already explained, there is a possibility of erroneous writing in which data "1" transforms to data "0", due to the stress against data write of "1", that is, the stress applied to the remainder memory transistors while the mark data "0" is written in a certain byte, and it is desirable to deal with the matter. This routine, however, will not be necessary, depending on the reliability level required in the system or the reliability level of the memory transistors themselves.

Here is provided a measure in the process of judgement whether a byte is one written with mark data "00h" or not for realization of irreversible changes of state. That is, this is judged from the "0" bit number in one byte. More specifically, in the embodiment shown here, at least six bits are "0" in one byte (8 bits), this byte is judged to be one written with the mark data. Next explained are reasons of improvement in reliability by such judgement.

In the present invention, it is important where is the boundary between bytes with the mark data "00h" and bytes without it. If this boundary is vague, reliability decreases so much. For example, assume that a certain bit is undesirably written with "0" in a byte in which writing of the mark data is not yet executed due to a stress. In this case, even though "0" has been written in one bit, the "0" bit number in this byte is still 1 and has not yet reached 6. Therefore, this byte is never judged as being an already written byte.

Flash memory, in general, has a data holding property. This is the phenomenon in which data "0", certainly written once, returns to "1" due to a progress of time after writing the data, for example. In general, flash memory holds data by injecting electrons into an area called floating gate encircled by an insulator by a tunneling current or by hod electron injection. If the insulator encircling the floating gate has a bad quality, electrons once confined may externally leak with time, and this may results in returning the bit from the "0" status to the original "1" status. Also for the defective mode, the operation of counting the "0" bit number is effective.

For example, let one bit have returned to "1" in a certain byte in which the mark data "00h" had been written. In this case, if the judgement simply relies on whether the byte is "00h" or not, this byte is misjudged as an unwritten byte. However, by using a means for counting the "0" bit number, even after the "0" bit number has been reduced from 8 to 7, this number of "0" bits still satisfies the condition "not less than six bits", and the byte is therefore properly judged as a byte already written with the mark data. In this manner, the method of judging the boundary between unwritten areas and written areas by counting the "0" bit number in each byte can provide a margin against both the problem of transformation of data "1" to data "0" due to a stress in an unwritten area of the OTP block and the problem of transformation of data "0" to data "1" in areas already written with the mark data due to the data holding property of the flash memory, and therefore improves the reliability remarkably.

Figure 36:
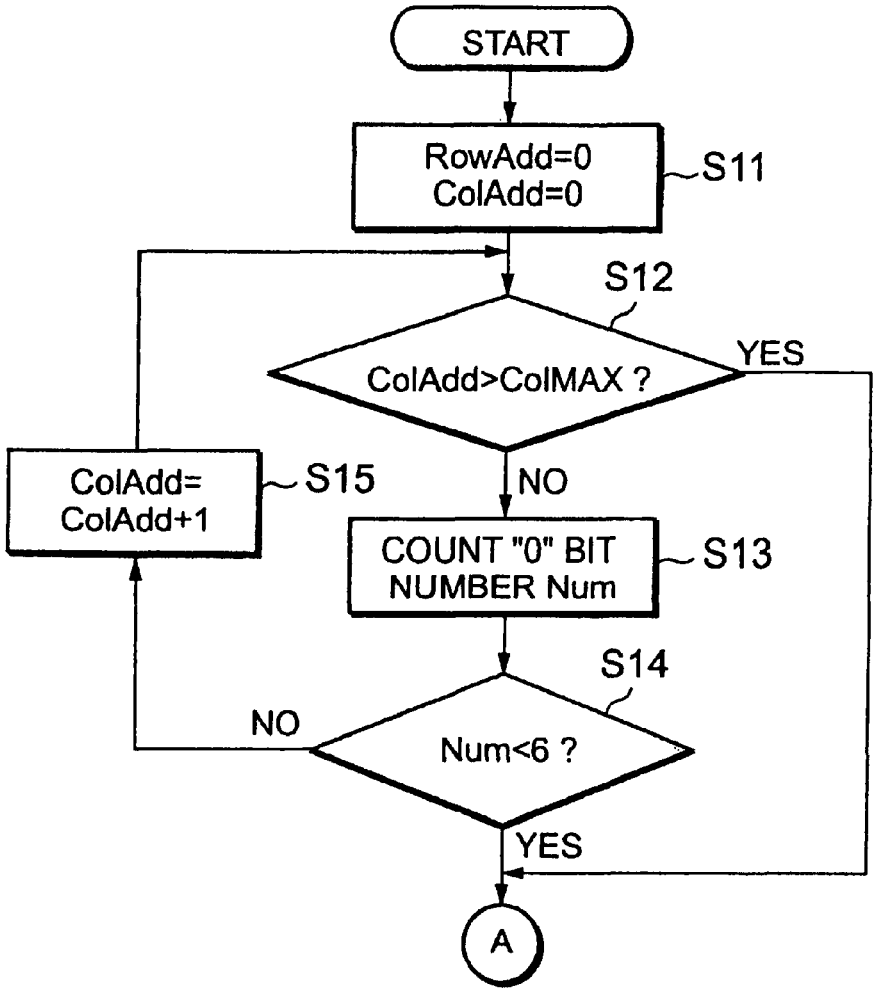
FIG. 36 is a diagram showing a control flow (first half) for searching out a space area in OTP blocks in the same embodiment.
Figure 37:
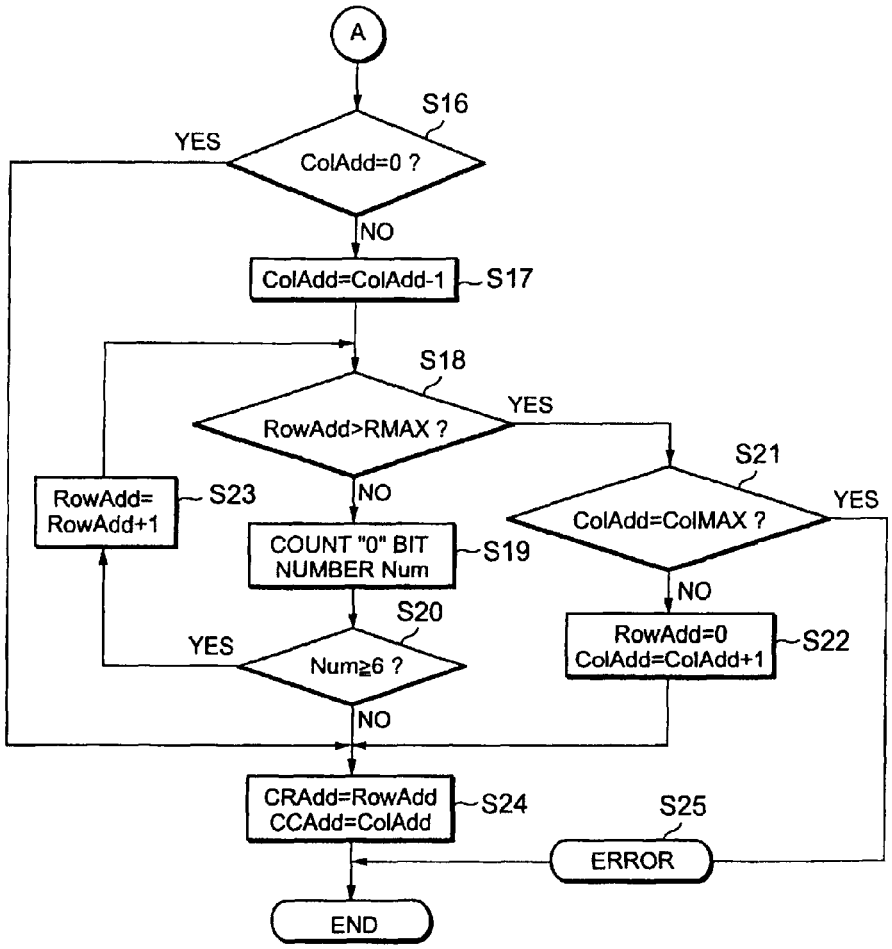
FIG. 37 is a diagram showing a control flow (second half) for searching out a space area in OTP blocks in the same embodiment.

FIG. 36 and FIG. 37 are flow charts which show a control flow for searching the boundary between the area written with the mark data and the unwritten area in the OTP block, that is, for searching whether an area is blank or not. Initializing the row address RowAdd and the column address ColAdd, the search is started from (Page 0, Byte 0) (step S11). Instep S12, it is judged whether it exceeds the maximum column address ColMAX or not. Since the maximum address in the column direction is Byte 527, it is not necessary to search a blank address in excess of it. In step S13, it is confirmed whether the "0" bit number Num is 6 or larger, or not. If the "0" bit number is 6 or larger, the column address is incremented by one address to search into the next column (step S15). This operation to count the n bit number is repeated.

In step S14, if any byte having "0" bits less than 6 is found, the procedure moves to step S16 in FIG. 37. Here is judged whether the column address of the byte found to be not written with "00h" is the first column (Byte 0) or not, and if it is other than the first column address, the procedure returns to the address younger by one than the column address (step S17) to start the search in the row direction. If the column address of the byte found to be not written with "00h" is the first column (Byte 0) or not, since it is an area having never been written with "00h", the current address is (Page 0, Byte 0). In step S18 et seq., the procedure proceeds to the search in the row direction. It is first judged whether the row address RowAdd is smaller than or equal to the maximum row address RMAX or not, and if it is smaller than or equal to the maximum row address, namely, smaller than or equal to Page 15, the "0" bit number is counted in step S19. Then, by judging whether the "0" bit number Num is at least 6 or not (S20), and if YES, the row address is incremented (step S23), and the procedure returns to step S18 to repeat these steps.

If any byte having "0" bits less than 6 is found in step S20, the byte is determined to be the current row address CRAdd and column address CCAdd (the byte indicating from which the data is not written) in step S24. If no byte with "0" bits less than 6 is found even after searching up to the final page (Page 15 in this example) in response to judgement in step S18, the procedure moves to processing of step S21. In this step, if the address in the column direction is the maximum column address ColMAX (Byte 527 in this example), since it indicates that all bytes in this block are filled with the mark data "00h" and hence means that the OTP has no byte defined as the first address not written with the data, and the procedure finishes as Error (S25). If the column address is not the maximum column address ColMAX, it means that the mark data "00h" has been written up to just the final page of a certain column. Therefore, in step S22, the value returned to the original address by adding one address to that once taken by subtracting one address from the original address is determined as the current column address CCAdd.

Although the foregoing explanation is directed to the method for searching the first one of addresses in which the mark data has not been written currently, its procedure is not limited to this example. It is also possible to simply progress the search from Page 0 to Page 15 of the first column and then increment one address so as to continue the search from Page 0 to Page 15 of the next byte Byte 1. Furthermore, any method may be employed provided that it ensures judgement of the boundary between an address written with the mark data "00h" and another without the data.

Next explained is a technique for writing mark data with a high reliability, in combination with the technique for searching the boundary area for wring the mark data in the OTP block by counting the "0" bit number. Following the above-explained example, here is taken the case in which the existence of six or more "0" bits in one byte is determined to indicate that the data is written in the byte. Assume here that, if "0" is erroneously written in five bits among eight bits by the above-mentioned stress. Such case is rare, but this byte is judged to be not written with the data from the above-explained standard of judgement. However, this number of erroneously written "0" bits is different by only one bit from six bits as the critical value for judgement. Therefore, the byte is in an unstable status, whenever it may fall in the status with six or more "0" bits and be judged as being already written with the data. From the viewpoint of reliability, it is a serious problem to leave such unstable bytes not yet written with the data.

To overcome this problem, the embodiment shown here is configured not to leave any unstable areas not yet written with the data by the technique explained below. That is, just after writing the mark data in a certain byte, the byte for next writing the data is investigated. If it has "0" data in four or more bits, for example, the mark is written also in this byte precedently. Therefore, no byte having "0" bits less than or equal to three in its initial status remains in the area for next writing the data. Since the OTP block merely undergoes write operation before the next write operation, there is a very little possibility that a byte suddenly changes from the status having three or less "0" bits to the status having six or more bits. In this manner, upon writing the mark data, by precedently judge the status of the area to be next written with the mark data so as to remove unstable areas to be next written with the data, a system with a high reliability can be realized.

Taking the above-mentioned point into consideration, next explained is a preferable method for writing the mark data in the OTP block. Essentially, the mark data "00H" is written in the current address, that is, the first address among those not yet written with the data. However, the embodiment shown here employs a technique for improving the reliability. First explained is the basic concept of the method for writing the mark data with reference to FIG. 38.

As explained heretofore, an important feature of the invention lies in that the boundary address between a address already written with the mark data and an address without it. Definition of the address already written with the data is the existence of six or more "0" bits. However, assume here that there is a byte having five or more "0" bits due to a stress even though the mark data has not been executed. In this case, if the "0" bit number changes to 6 occasionally, the most important current address will be lost.

Figure 38:
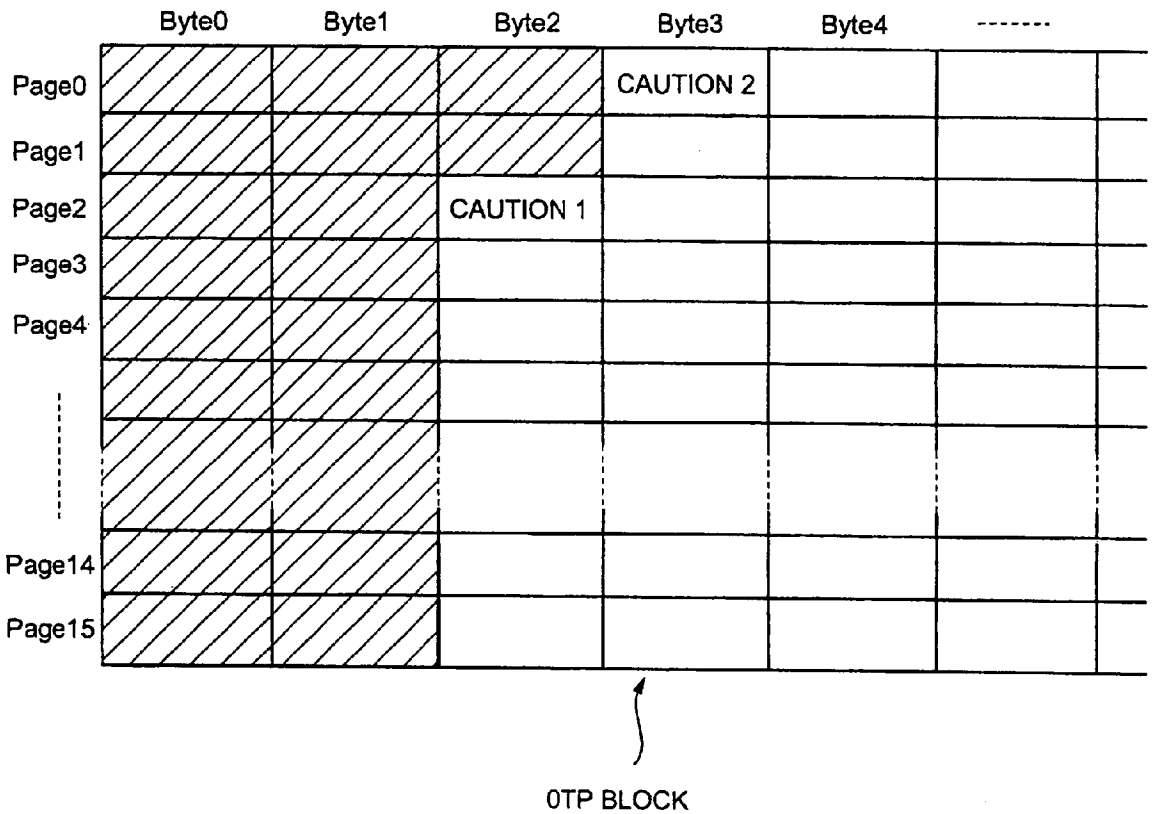
FIG. 38 is a diagram for explaining a specific procedure for writing mark data into an OTP block in the same embodiment.

This is explained more specifically with reference to FIG. 38. In FIG. 8, write operation of the mark data "00h" has progressed to (Byte 2, Page 1) in the OTP block as shown by crosshatching. In order to keep the boundary condition, status of the byte labeled with "caution 1" and "caution 2" is important. If the status of the byte marked "caution 1" is unstable (for example, it has six "0" bits), the boundary may move. The byte marked "caution 2" also involves the same anxiety. When t searching the current address, the above-explained embodiment is configured to conduct the search first in the column direction. However, if the byte marked "caution 2" is unstable (liable to change to a byte written with "0"), the boundary may move. Therefore, the status of two locations, namely, the next row address (corresponding to the byte marked "caution 1") and the next column (corresponding to the byte marked "caution 2") has a significant meaning for a certain current address.

Therefore, the embodiment shown here employs the technique explained below. That is, after the mark data is written in a certain address, if the next row address in the same column (corresponding to the byte marked "caution 1") and the first row address in the next column (corresponding to the byte marked "caution 2") are unstable, the mark data is simultaneously written also in these bytes. The boundary of the unstable status is defined to have four or more "0" bits for the time being. Therefore, if a byte has 0, 1, 2, or 3 "0" bits, it is maintained as an area for next writing the data, and if it has four or more "0" bits, the mark data is written therein before the "0" bit number changes to 6 or more and the boundary becomes vague.

Figure 39:
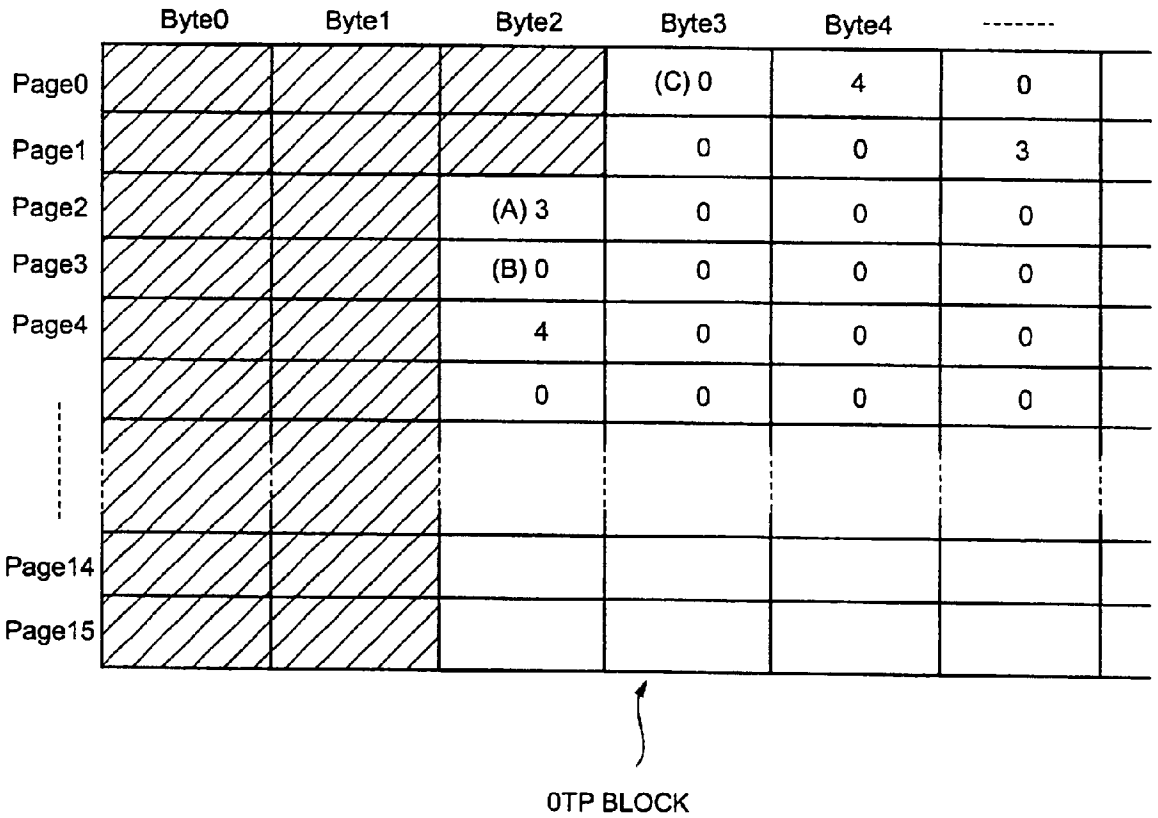
FIG. 39 is a diagram for explaining an example in which a stable boundary area is maintained upon mark data write into OTP blocks in the same embodiment.
Figure 40:
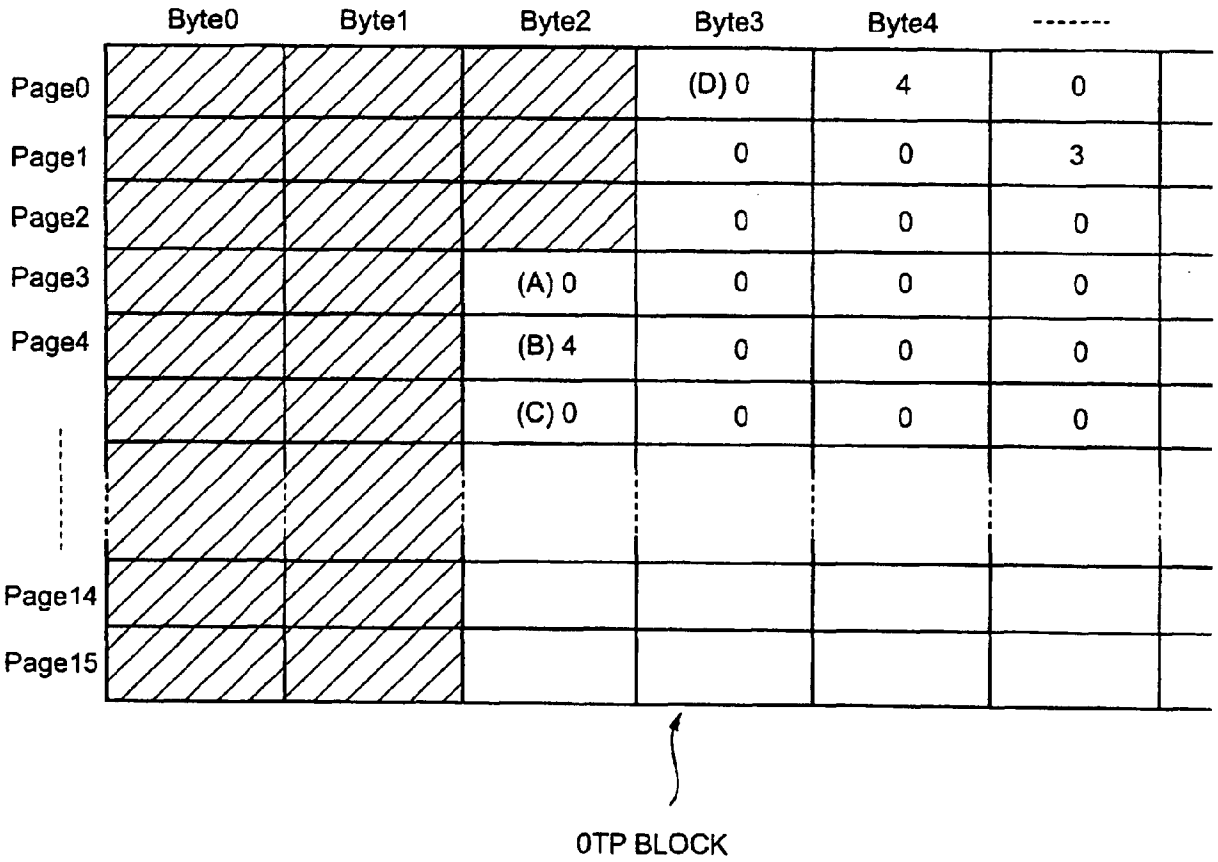
FIG. 40 is a diagram for explaining an example in which a unstable boundary area is removed upon mark data write into OTP blocks in the same embodiment.
Figure 41:
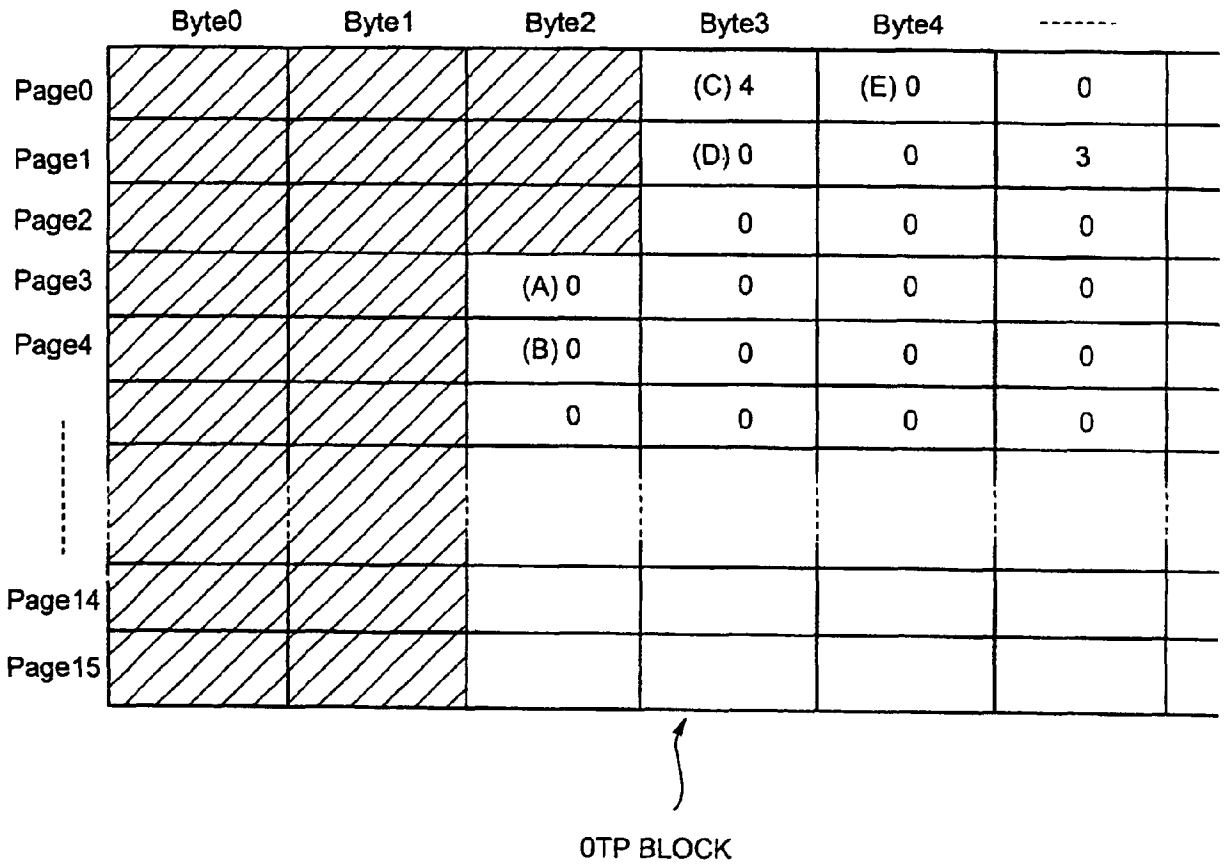
FIG. 41 is a diagram for explaining another example in which a unstable boundary area is removed upon mark data write into OTP blocks in the same embodiment.

With reference to FIGS. 39 through 41, a more specific technique for writing the mark data is explained. Numerals in blank areas without crosshatching in these drawings (areas not yet written with the data) show how many "0" bits currently exist there. In case of FIG. 39, assume that writing of the mark data "00h" has been executed in the byte marked(A). The area for next writing is the byte marked (B). The "0" bit number of this byte is 0. Also in the position (C) which is the first page in the next column, the "0" bit number is 0, and its status is considered sufficiently stable. Therefore, in this status, the process of writing the mark data is finished.

Next discussed is the case of FIG. 40. Assume that writing of the mark data "00h" is executed in the byte marked (A). The area for next writing is the byte marked (B). The "0" bit number of this byte is 4, and its status is considered unstable. Therefore, simultaneously with writing the mark data in (a), writing of the mark data is executed also in the location marked (B). The "0" bit number is 0 in the byte marked (C), and its status is stable. Therefore, this area (C) is determined as the area for next writing. Since the area marked (D) at the first page of the next column is also normal, the process of writing the mark data terminates here.

Next explained is the case of FIG. 41. Assume that the mark has been written in the area (A). The byte as the area (B) for the next writing is normal. However, since the area (C) at the first page in the next column is unstable, the mark data is written simultaneously also in the area (C). Since the area (D) as the next writing area subsequent to the area (C) and the area (E) at the first page in the next column are also stable, the process of writing the mark data terminates here.

When the mark data is written in the region (C), the mark data may be written also in areas from (Byte 2, Page 3) through (Byte 2, Page 15).

Figure 42:
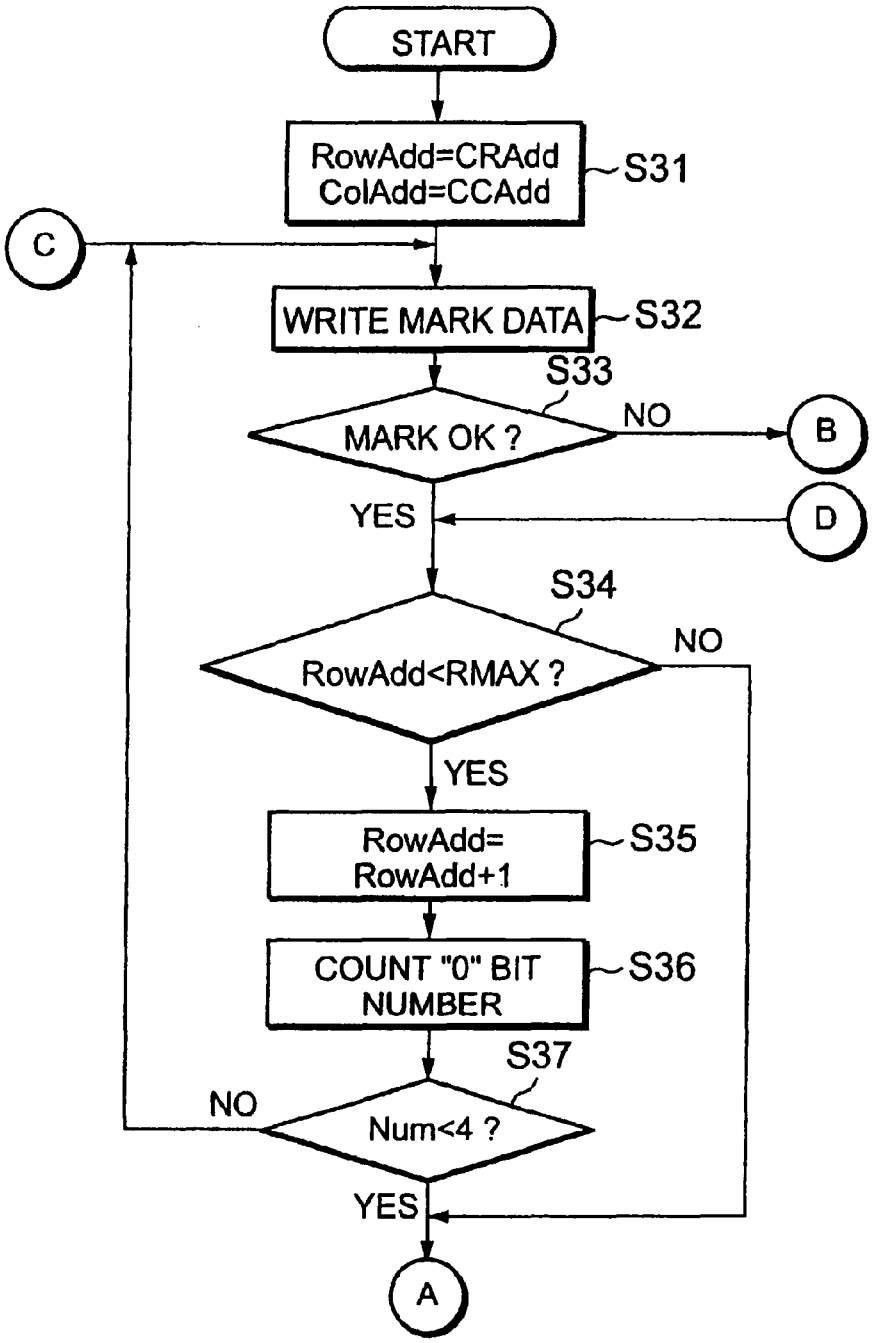
FIG. 42 is a diagram showing a control flow (first half) for writing mark data into OTP blocks in the same embodiment.
Figure 43:
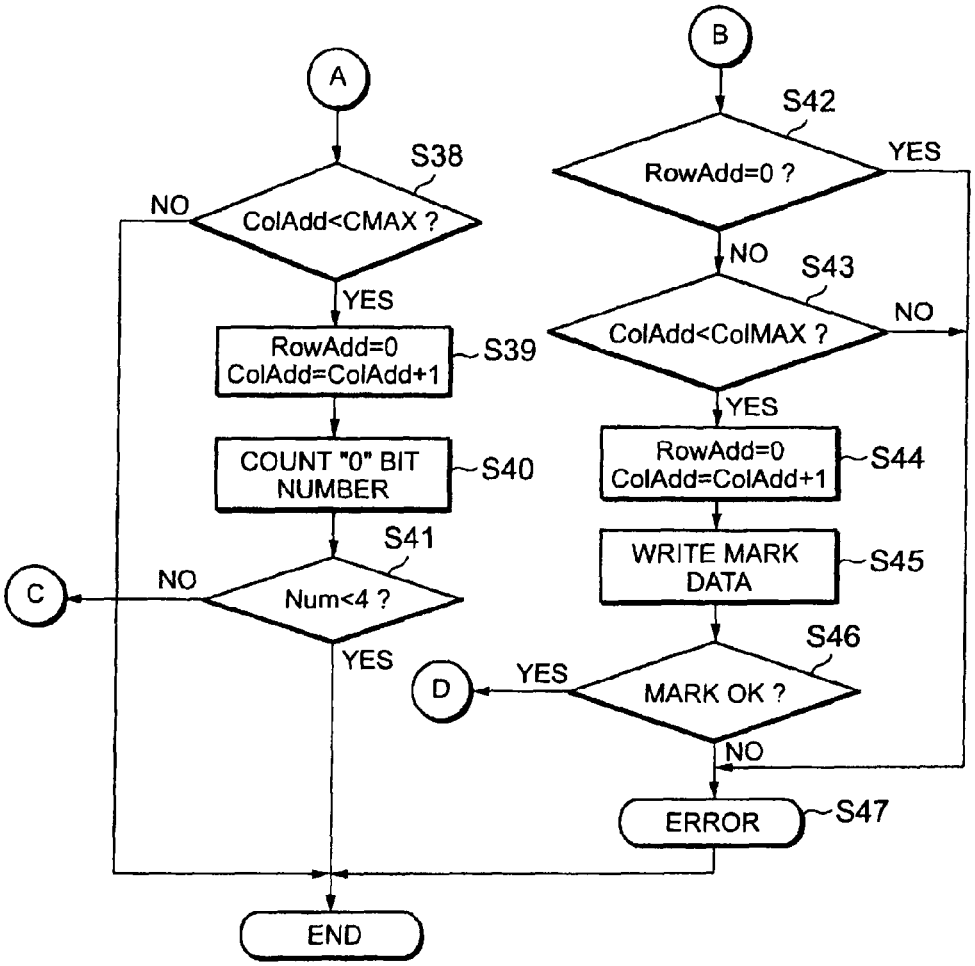
FIG. 43 is a diagram showing a control flow (second half) for writing mark data into OTP blocks in the same embodiment.

A detailed control flow of the process of writing the mark data as explained with reference to FIGS. 38 through 41 is shown in FIGS. 42 and 43, and its control operation is explained. In step S31, the address of a byte to be next written with the data is set as the current row and column addresses CRAdd and CCAdd. Then, in step S32, writing of the mark data "00h" is executed in the current address. In this step, writing of the mark data may be executed solely in the byte or may be executed simultaneously also in areas already written with the mark data. In step S33, it is confirmed whether the writing of the mark data has been executed normally or not.

If the writing did not finish normally, the procedure moves to step S42 in FIG. 43. In step S42, it is judged whether the byte having failed in writing is the first page or not. If the writing failed in the first page, the procedure ends as error (step S47). If the byte having failed in writing is not the first page, the procedure moves to step S43. In this step, it is judged whether the column address has reached the maximum column address ColMAX or not, and if it is not less than it, the procedure ends as error (S47). If the column address is less than the maximum column address, the procedure moves to step S44. In this step, the column address is incremented, and the row address is returned to the first page. Subsequently, writing of the mark data is executed in step S45. This process means that, even when writing in a byte fails, only if the mark data is successfully written in the first address in the next column, the byte in which writing resulted in fail may be disregarded.

In step S46, it is judged whether the mark data was written in the first page or not. If it resulted in fail, the procedure ends as error (S47). If the writing was successful, the procedure moves to the routine for judging whether the next write area and the first page address in the next column are unstable or not, that is, step S34 in FIG. 42. In this step, it is judged whether the current row address RowAdd is less than the maximum row address RMAX or not, and if so, after incrementing the row address RowAdd in step S35, the "0" bit number is counted in step S36. Then, in step S37, it is judged whether the "0" bit number Num is less than four bits or not. If so, since it means its stable status, the procedure moves to the routine for confirming whether the first page in the next column is stable or not, that is, step S38 in FIG. 43. If it is unstable, the procedure returns to step S32, and by writing the mark data in that address, its unstable status is removed.

In step S38, it is judged whether the current column address ColAdd is less than the maximum column address ColMAX or not. If the current position is the maximum column address ColMAX, the step of confirming the first page in the next column is not necessary, and the procedure ends. If it is less than maximum column address ColMAX, the column address CoLAdd is incremented in step S39, the row address RowAdd is returned to the first page, and the "0" bit number in the byte is counted in step S40. Then, in step S41, it is judged whether the "0" bit number is less than 4 or not, and if YES, the process is finished by judging its state being stable. If it is in an unstable status with four or more "0" bits, the procedure again returns to step S32 to remove the unstable status, and the same process is repeated.

As explained above, according to the embodiment shown here, it is possible to create a number of irreversible changes in status by writing the mark data into the OTP block without largely changing the structure of the NAND flash memory.

Figure 44:
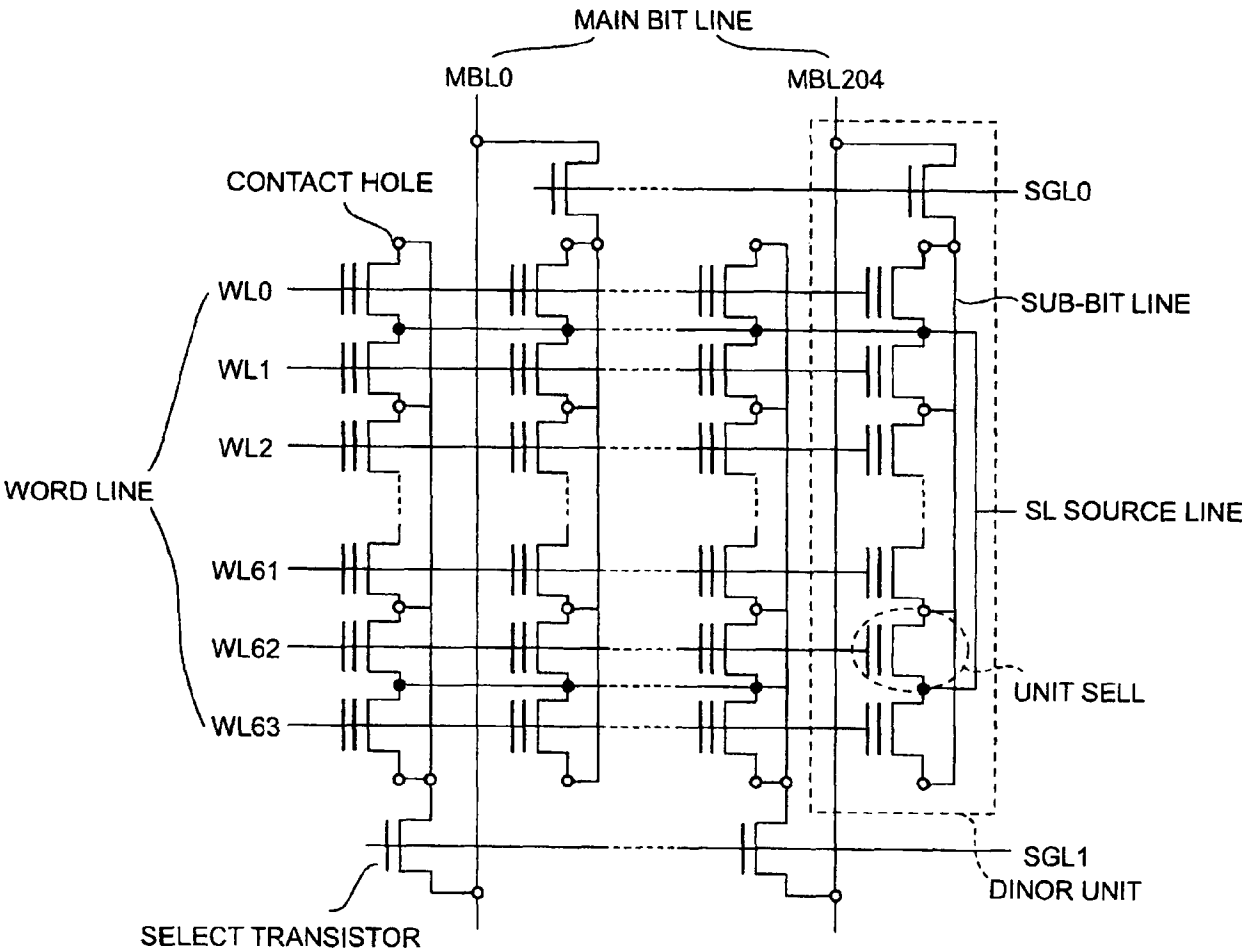
FIG. 44 is a diagram showing the circuit structure of AND flash memory applied present invention, particularly the twelfth embodiment.
Figure 45:
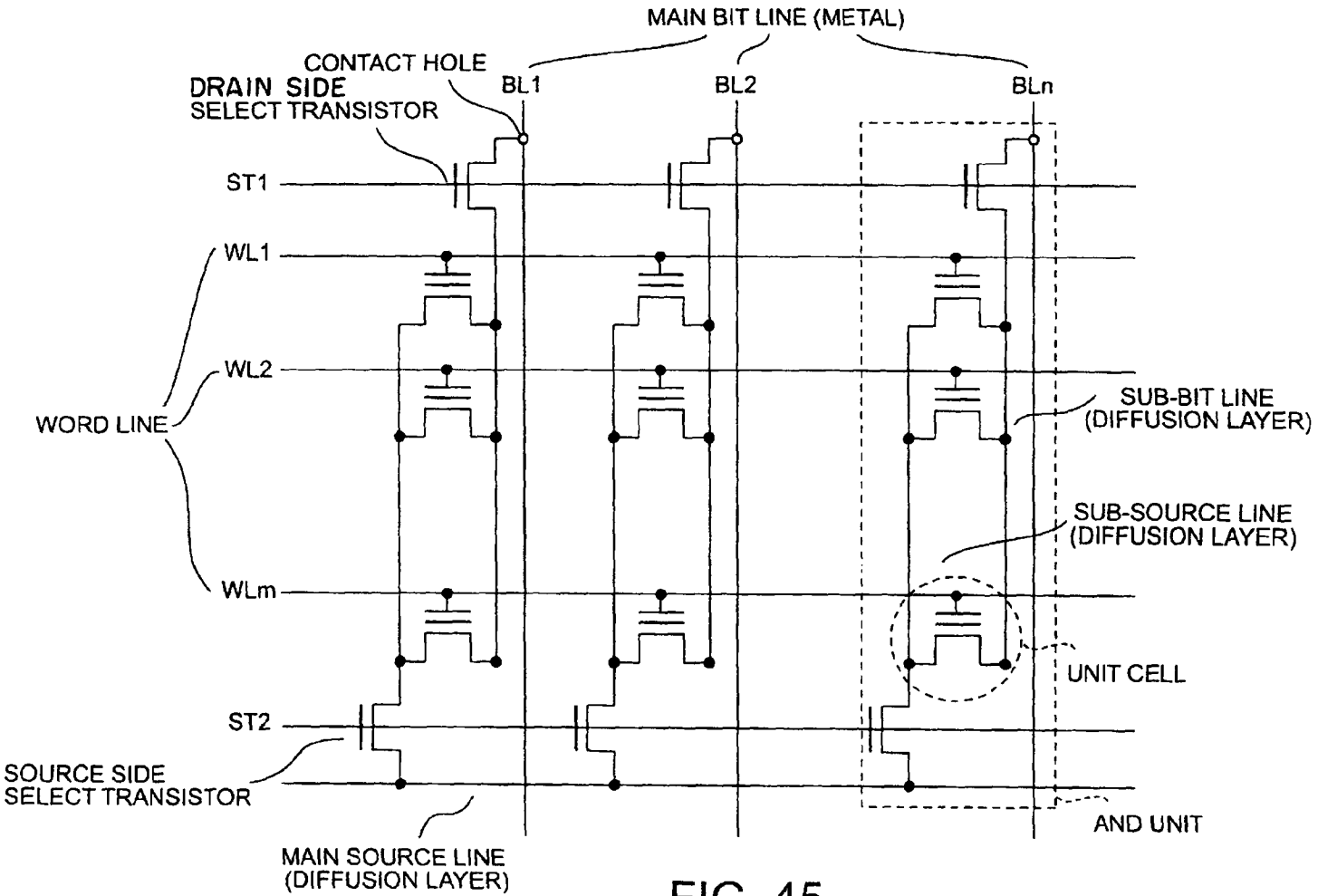
FIG. 45 is a diagram showing the circuit structure of DINOR flash memory applied present invention, particularly the twelfth embodiment.

The invention is not limited to the above-explained embodiment. Although the embodiment has been explained, taking NAND flash memory as an example, the type of flash memory is not limited to it, the same technique is applicable also to other types of flash memory having the page-writing mode, such as AND flash memory (see FIG. 44)and DINOR flash memory (see FIG. 45), for example. Additionally, the invention is not limited to EEPROM flash memory, but the nonvolatile semiconductor memory in the present invention should be construed to involve any other memory similarly capable of storing data by its non-volatility and permitting electrical rewrite of data, such ferroelectric memory (FRAM), for example.

Moreover, the embodiment has been explained as the size of the OTP field being 1 block which is the minimum unit of data erasure. However, the OTP field may a plurality pages in one block or a plurality of blocks. Furthermore, the unit area for writing the mark data in the OTP field need not be one byte, but any plurality of bits may be determined as the unit area. In this case, in order to provide a margin in judgement of the boundary area (judgement of the bland area), it is preferable that the number of bits is relatively large. However, in case of flash memory excellent in data hold property and free from the boundary area instability, the mark data may be one bit.

Furthermore, the embodiment has been explained as setting the OTP field in EEPROM by providing a fuse circuit in the row decoder portion and by programming the fuse circuit. However, in lieu of the fuse circuit, PROM, EPROM, EEPROM, etc. permitting programming in their wafer stage can be used. Alternatively, it may be nonvolatile semiconductor memory setting the OTP field in the wafer process.

Additionally, the memory system to which the invention is applicable includes memory cards, etc. equipped with a controller, such as ATA card, compact flash, multimedia card, etc., and the invention is effective also when creating irreversible changes of status as the entirety of the card by using irreversible changes in status of built-in flash memory, flash memory in the controller, etc. More specifically, if NAND flash memory is mounded as the built-in flash memory, irreversible changes of state can be realized by the method explained in the embodiment. In ATA cards or compact flash, irreversible changes of status are created or read by using a vender-unique command not regulated by the ATA standard protocol. The vender-unique command may be one for reading only the address corresponding to the current address in the embodiment, one for incrementing the address, or a command system permitting the OTP block in the embodiment to directly read and write. Furthermore, the same effect is expected also when these ATA cards, compact flash and multimedia cards are not perfectly irreversible for example, even when an area corresponding to the current address in the embodiment, for example, is made of random numbers, etc.

As explained above, according to the invention, it is possible to provide a nonvolatile semiconductor memory control method for nonvolatile semiconductor memory having a part of the memory field changed into OTP, which makes it possible to store a number of irreversible changes of status while writing the mark data in the OTP field without erroneous writing, etc. and clearly defining the boundary between areas written with the mark data and areas without the data.

Although some embodiments have been disclosed for easier understanding of the invention, the invention can be realized in other various modes without departing from its concept therefore, the invention should be construed to involve all possible modes and those recited in claims not departing from the concept of the invention.

What is claimed is:

[1. A memory system comprising:

a recording medium storing a data file and identifying information for restricting the condition for using said data file; and a system apparatus permitting said recording medium to be removably set therein and requiring said identifying information when reading and using thereon said data file stored in said recording medium;

wherein said recording medium includes an ordinary field for storing said data file, and a redundancy field for storing said identifying information.]

[2. The memory system according to claim 1 wherein said system apparatus approves the use of said data file stored in said recording medium when a predetermined relation is established between expected information said system apparatus expects and said identifying information read from said recording medium, and does not approve the use of said data file when said predetermined relation is not established.]

[3. The memory system according to claim 1 wherein said recording medium is approved the use of said data file stored in said recording medium when a predetermined relation is established between expected information said system apparatus expects and said identifying information stored in said recording medium, and is disapproved the use of said data file when said predetermined relation is not established.]

[4. The memory system according to claim 1 wherein said identifying information or information related to said identifying information is incorporated into said data file stored in said recording medium, and said recording medium is approved the use of said data file when a predetermined relation is established between said identifying information stored in said recording medium and said identifying information or said information related to said identifying information incorporated into said data file stored in said recording medium, and is disapproved the use of said data file when said relation is not established.]

[5. The memory system according to claim 1 wherein all or part of said data file is ciphered on the basis of said identifying information.]

[6. The memory system according to claim 1 wherein a pseudo defective mark indicating that data in storage is not normal is intentionally recorded to at least a part of a field thereof in which said data file is stored, and said system apparatus can recognize that said pseudo defective mark has been intentionally recorded and said data file is normal.]

[7. The memory system according to claim 1 wherein said redundancy field of said recording medium is configured to restrict that data therein is rewritten.]

[8. The memory system according to claim 7 wherein data stored in said redundancy field is changeable in a bit thereof from a first status to a second status but not changeable from said second status to said first status, and said redundancy region storing said identifying information and complement information which is a complement made from said identifying information.]

[9. The memory system according to claim 1 wherein said identifying information or information related to said identifying information is incorporated into said data file stored in said recording medium, and said system apparatus reads out said identifying information and said data filed from said recording medium, said system apparatus being configured to approve the use of said data file when a predetermined relation is established between said identifying information or said information related to said identifying information, and not to approve the use of said data file when said predetermined relation is not established.]

[10. The memory system according to claim 9 wherein said data file stored in said recording medium is a file downloaded onto said recording medium by using a terminal device.]

[11. The memory system according to claim 10 wherein said recording medium is capable of holding a plurality of pieces of said identifying information.]

[12. The memory system according to claim 9 wherein said identifying information is stored in a special field of said recording medium which is impossible to access or impossible to rewrite data therein with publicly disclosed information even if it is accessed.]

[13. The memory system according to claim 12 wherein said special field is a field from which said information can be read out when said system apparatus enters a read command into said recording medium for reading out the specification of said recording medium.]

[14. The memory system according to claim 12 wherein said special field in said recording medium is made up of a state hold circuit having a fuse.]

[15. A memory system comprising:

a recording medium storing a data file acquired by download from a distribution center together with identifying information incorporated into said data file for restricting the condition for using said data file; and a system apparatus permit said recording medium to be removably set therein and requiring said identifying information when reading and using thereon said data file stored in said recording medium;

wherein said identifying information is personal identifying information for identifying an individual person, and said system apparatus approves the use of said data file when a predetermined relation is established between said identifying information incorporated into said data file and said personal identifying information, but does not approve the use of said data file when said predetermined relation is not established.]

[16. A memory system comprising:

a recording medium storing a data file acquired by download from a distribution center together with identifying information incorporated into said data file for restricting the condition for using said data file; and a system apparatus permitting said recording medium to be removably set therein and requiring said identifying information when reading and using thereon said data file stored in said recording medium;

wherein said identifying information is personal identifying information for identifying an individual person, and said recording medium is approved the use of said data file when a predetermined relation is established between said identifying information incorporated into said data filed stored in said recording medium and said personal identifying information, but is disapproved the use of said data file when said predetermined relation is not established.]

[17. A recording medium which can be set in a system apparatus and can be removed from the system apparatus, comprising:

a data storage filed for storing a data file; and an identifying information storage field for storing identifying information for restricting the condition for using said data file, said identifying information required when said system apparatus reads and uses said data file;

wherein said identifying information storage field stores at least one pair of said identifying information and complement information which is a complement created from said identifying information.]

[18. The recording medium according to claim 17 wherein said identifying information in said identifying information storage field is stored therein a mode disabling electrical rewrite thereof or in a mode enabling detection of a rewritten status thereof.]

[19. The recording medium according to claim 17 wherein said identifying information is unique identifying information exclusively assigned to said recording medium.]

[20. The recording medium according to claim 17 wherein at least a part of said identifying information is created by using random numbers.]

[21. The recording medium according to claim 17 wherein said data storage field includes memory cell units each including a plurality of electrically rewritable memory cells connected to each other, and a plurality of said memory cell units are connected to form a memory block.]

[22. The recording medium according to claim 21 wherein said memory cell unit is connected to at least one of a bit line and a source line via a select gate.]

[23. The recording medium according to claim 21 wherein said memory cell unit has a NAND cell structure in which a plurality of memory cells are connected in series.]

[24. The recording medium according to claim 21 wherein said data storage region can be erased for each memory block.]

[25. The recording medium according to claim 21 wherein said data storage field includes pages each including a plurality of electrically rewritable memory cells connected to each other, each said page forming the unit for writing data, and a plurality of said pages being connected to form a memory block.]

[26. The recording medium according to claim 25 wherein said data storage field permits erasure for each said memory block.]

[27. A system apparatus in which a recording medium is set and used, and said recording medium once set is removed, characterized in:

said recording medium storing a data file and identifying information for restricting the condition for using said data file; and said system apparatus requiring said identifying information when reading and using said data file stored in said recording medium;

wherein said recording medium includes an ordinary field for storing said data file, and a redundancy field for storing said identifying information.]

[28. The system apparatus according to claim 27 comprising:

an identifying information hold portion which holds identifying information for identifying said system apparatus as expected information; and a judge portion which approves the use of said data file stored in said recording medium when a predetermined relation is established between said expected information expected by said system apparatus and said identifying information read out from said recording medium but does not approve the use of said data file when said predetermined relation is not established.]

[29. The system apparatus according to claim 27 wherein a pseudo defective mark indicating that data in storage is not normal is intentionally recorded to at least a part of a field thereof in which said data file is stored, and said system apparatus can recognize that said pseudo defective mark has been intentionally recorded and said data file is normal.]

[30. The system apparatus according to claim 27 wherein said redundancy field of said recording medium is configured to restrict that data therein is rewritten.]

[31. The system apparatus according to claim 30 wherein data stored in said redundancy field is changeable in a bit thereof from a first status to a second status but not changeable from said second status to said first status, and said redundancy region storing said identifying information and complement information which is a complement made from said identifying information.]

[32. The system apparatus according to claim 27 wherein said identifying information, or information related to said identifying information, is incorporated into said data file stored in said recording medium, and said system apparatus reads said identifying information and said data file from said recording medium and approves the use of said data file when a predetermined relation is established between said identifying information and said information or information related to said information incorporated into said data file, but does not approve the use of said data file when said predetermined relation is not established.]

[33. The system apparatus according to claim 32 wherein all or part of said data file is ciphered on the basis of said identifying information.]

[34. The system apparatus according to claim 32 wherein said data file stored in said recording medium is a file downloaded onto said recording medium by using terminal device.]

[35. The system apparatus according to claim 34 wherein said recording medium can hold a plurality of pieces of said identifying information.]

[36. The system apparatus according to claim 32 wherein said identifying information is stored in a special field of said recording medium which is impossible to access or impossible to rewrite data therein with publicly disclosed information even if it is accessed.]

[37. The system apparatus according to claim 36 wherein said special field is a field from which said information can be read out when said system apparatus enters a read command into said recording medium for reading out the specification of said recording medium.]

[38. The system apparatus according to claim 36 wherein said special field in said recording medium is made up of a state hold circuit having a false.]

[39. A recording medium which can be set in a system apparatus and can be removed from the system apparatus, comprising:

a data storage filed for storing a data file; and an identifying information storage field for storing identifying information for restricting the condition for using said data file, said identifying information required when said system apparatus reads and uses said data file;

wherein said data storage field includes pages each including a plurality of electrically rewritable memory cells connected to each other, each said page for the unit for writing data, and a plurality of said pages being connected to form a memory block;

wherein said redundancy field of said recording medium is configured to restrict that data therein is rewritten; and wherein said identifying information the apparatus number of said system apparatus.]

[40. A recording medium which can be set in a system apparatus and can be removed from the system apparatus, comprising:

a data storage filed for storing a data file; and an identifying information storage field for storing identifying information for restricting the condition for using said data file, said identifying information required when said system apparatus reads and uses said data file;

wherein said data storage field includes pages each including a plurality of electrically rewritable memory cells connected to each other, each said page forming the unit for writing data, and a plurality of said pages being connected to form a memory block;

wherein said redundancy field of said recording medium is configured to restrict that data therein is rewritten; and wherein said identifying information is personal identifying information for identifying an individual person.]

[41. A control method for controlling nonvolatile semiconductor memory having a memory cell array made of an arrangement of electrically rewritable nonvolatile memory cells, a part of said memory cell array forming a state change storage field permitting data to be written only once, said state change storage field including a plurality of pages each divided into a plurality of unit areas, comprising:

a first step for detecting that said nonvolatile semiconductor memory experienced a predetermined operation causing a change of state thereof, a second step for writing a mark data in one of said unit areas in said state change storage field when said predetermined change of state is detected; and a third step for sequentially searching said plurality of unit areas in said state change storage field to find out a final unit area in which said mark data was written last;

wherein said unit area in said state change storage field is made up of a plurality of bits, and said second step changes all of said plurality of bits in said unit area into a second state when said mark data is written in one of said unit areas.]

[42. The control method according to claim 41 wherein said second step writing said mark data in the unit area at an address subsequent to said final unit area.]

[43. The control method according to claim 41 wherein, upon sequentially searching said plurality of unit areas, said third step counts the number of bits taking said second state in each unit area, and when the count value exceeds a certain value, it judges that said mark data was already written in said unit area.]

[44. The control method according to claim 41 wherein, in said memory cell array, a region of an arrangement of memory transistors aligned along a single control gate line constitutes one page, and a region of a plurality of said pages including a plurality of memory transistors selected by different control gate lines and connected in series to form a NAND cell form one block which is the minimum unit for data erasure.]

[45. The control method according to claim 41 further comprising:

a fourth step for judging the stability of data in said unit area not yet written with said mark data at an address adjacent to said unit area written with said mark data in said second step, and for precedently writing said mark data in said unit area not yet written with said mark data and judged to be unstable.]

[46. The control method according to claim 45 wherein judgement of the stability of data in said unit area not yet written with said mark data in said fourth step is to count the number of bits taking said second state and to judge said unit area to be unstable when the count value exceeds a certain value.]

[47. The control method according to claim 41 wherein, in said memory cell array, memory transistors each having a floating gate and a control gate are arranged to form a matrix, a range including a plurality of said memory transistors aligned in a column direction along a single control gate line commonly connecting said control gates form one page, and a range of a plurality of pages including a plurality of said memory transistor selected by different control gate lines and aligned in a row direction and then connected to a bit line through a selection gate to form a NAND cell form one block which is the minimum unit of data erasure.]

[48. The control method according to claim 47 wherein a bit line is connected to one end of said NAND cell and a source line is connected to the other end, said plurality of unit areas in said state change storage field are assigned with addresses in an incremental sequence from one nearest to said source line toward one nearest to said bit line with respect to the row direction, and assigned in an incremental sequence from one end toward the other end with respect to the column direction.]

*49. A memory device, comprising:*

*a data storage area configured to be capable of storing at least one encrypted data file, the data storage area being required to be readable and writable from outside of the memory device; and*

*an identifying information storage area configured to store identifying information for using the at least one encrypted data file, the identifying information storage area being prohibited from being accessed from outside of the memory device, wherein*

*the memory device includes a plurality of blocks, each of the plurality of the blocks is a unit of data erasing, and at least one of the plurality of blocks is allocated to the data storage area and the identifying information storage area, respectively; and*

*the identifying information is based on a chip ID of the memory device and is unique to the memory device.*

*50. A memory card, comprising:*

*a memory device including a plurality of blocks, each of the plurality of the blocks being a unit of data erasing and including a plurality of pages, each of the plurality of pages including a plurality of electrically rewritable memory cells where the memory cells share a word line extending over the memory cells; and*

*a controller including a buffer and coupled with the memory device,*

*wherein the memory device includes:*

*an identifying information storage area storing identifying information based on a chip ID of the memory device, the identifying information storage area being prohibited from being accessed from outside of the memory device; and*

*a data storage area being capable of storing an encrypted data file which is associated with the identifying information, the data storage area being required to be readable and writable from outside of the memory device.*

*51. The memory device according to claim 49, wherein the identifying information is stored with an error correction code.*

*52. The memory device according to claim 49, wherein the identifying information is stored with a parity code.*

*53. The memory device according to claim 49, wherein the identifying information is duplicated in the identifying information storage area.*

* * * * *